United States Patent
Young et al.

(10) Patent No.: US 12,545,657 B2
(45) Date of Patent: Feb. 10, 2026

(54) SMALL-MOLECULE MODULATORS OF THE ORPHAN NUCLEAR RECEPTOR TLX

(71) Applicant: Baylor College of Medicine, Houston, TX (US)

(72) Inventors: Damian Winston Young, Houston, TX (US); Mirjana Maletic-Savatic, Houston, TX (US); Prasanna Kandel, Houston, TX (US); Fatih Semerci, Houston, TX (US); Srinivas Chamakuri, Houston, TX (US)

(73) Assignee: BAYLOR COLLEGE OF MEDICINE, Houston, TX (US)

( * ) Notice: Subject to any disclaimer, the term of this patent is extended or adjusted under 35 U.S.C. 154(b) by 411 days.

(21) Appl. No.: 18/268,753

(22) PCT Filed: Dec. 22, 2021

(86) PCT No.: PCT/US2021/065021
§ 371 (c)(1),
(2) Date: Jun. 21, 2023

(87) PCT Pub. No.: WO2022/140643
PCT Pub. Date: Jun. 30, 2022

(65) Prior Publication Data
US 2024/0067625 A1   Feb. 29, 2024

Related U.S. Application Data

(60) Provisional application No. 63/130,219, filed on Dec. 23, 2020.

(51) Int. Cl.
   C07D 401/06   (2006.01)
   A61P 25/00    (2006.01)
   C07D 241/04   (2006.01)

(52) U.S. Cl.
   CPC .......... C07D 401/06 (2013.01); A61P 25/00 (2018.01); C07D 241/04 (2013.01)

(58) Field of Classification Search
   CPC ................................................. C07D 401/06
   See application file for complete search history.

(56) References Cited

U.S. PATENT DOCUMENTS 7,560,553 B1   7/2009   Kelleher-Andersson et al.

FOREIGN PATENT DOCUMENTS

WO   2011028548 A1   3/2011

OTHER PUBLICATIONS

Benod, et al., "The Human Orphan Nuclear Receptor Tailless (TLX, NR2E1) Is Druggable", PLoS One, Jun. 17, 2014, vol. 9, No. 6, 13 pages.
Benod, et al., "TLX: An elusive receptor", The Journal of Steroid Biochemistry and Molecular Biology, Mar. 2016, vol. 157, pp. 41-47.
Chamakuri, et al. "Synthesis of Enantiomerically Pure 6-Substituted-Piperazine-2-Acetic Acid Esters as Intermediates for Library Production", The Journal of Organic Chemistry, 2018, vol. 83, No. 12, pp. 6541-6555.
Cramer, et al., "ApoE-Directed Therapeutics Rapidly Clear β-Amyloid and Reverse Deficits in AD Mouse Models", Science, Feb. 9, 2012, vol. 335, No. 6075, pp. 1503-1506.
Cui, et al., "Downregulation of TLX induces TET3 expression and inhibits glioblastoma stem cell self-renewal and tumorigenesis", Nature Communications, Feb. 3, 2016, vol. 7, Art. 10637.
Dueva, et al., "Computer-Aided Discovery of Small Molecule Inhibitors of Transcriptional Activity of TLX (NR2E1) Nuclear Receptor", Molecules, Nov. 14, 2018, vol. 23, No. 11, pp. 1-10.
Encinas, et al., "Chapter 11: Identifying and Quantitating Neural Stem and Progenitor Cells in the Adult Brain", Methods in Cell Biology, 2008, vol. 85, pp. 243-272.
Guduru, et al., "Synthesis of Enantiomerically Pure 3-Substituted-Piperazine-2-Acetic Acid Esters as Intermediates for Library Production", The Journal of Organic Chemistry, Sep. 5, 2018, vol. 83, No. 19, pp. 11777-11793.
Jia, et al., "Potential Therapeutic Strategies for Alzheimer's Disease Targeting or Beyond β-Amyloid: Insights from Clinical Trials", BioMed Research International, Jul. 17, 2014. vol. 2014, Article ID 837157, 22 pages.

(Continued)

Primary Examiner — Yong S. Chong
(74) Attorney, Agent, or Firm — Kilpatrick Townsend & Stockton LLP

(57) ABSTRACT

Small molecules acting through the ligand binding domain of nuclear receptor TLX (NR2E1) are disclosed, as well as the use thereof for promoting neurogenesis and treating disorders associated with nuclear receptor TLX, including neurological disorders such as Alzheimer's disease. In certain embodiments, the invention provides compounds according to Formula II as described herein, and pharmaceutically acceptable salts or isomers thereof.

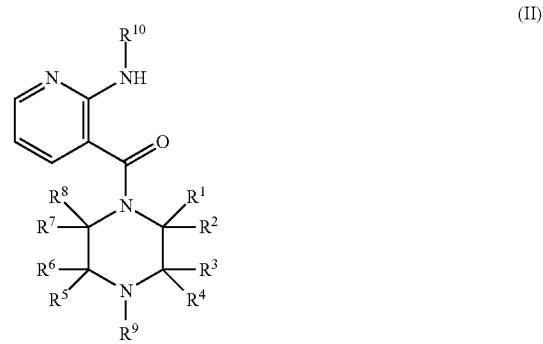

(II)

16 Claims, 12 Drawing Sheets

(56) References Cited

OTHER PUBLICATIONS

Jia, et al., "Orphan nuclear receptor TLX contributes to androgen insensitivity in castration-resistant prostate cancer via its repression of androgen receptor transcription", Oncogene, Mar. 20, 2018, vol. 37, pp. 3340-3355.
Lee, et al., "Developing Therapeutic Approaches to Tau, Selected Kinases, and Related Neuronal Protein Targets", Cold Spring Harbor Perspectives in Medicine, 2011, 21 pages.
Li, et al., "Nuclear Receptor TLX Regulates Cell Cycle Progression in Neural Stem Cells of the Developing Brain", Molecular Endocrinology, Jan. 1, 2008, vol. 22, No. 1, pp. 56-64.
Liu, et al., "Apolipoprotein E and Alzheimer disease: risk, mechanisms and therapy", Nature Reviews Neurology, Jan. 8, 2013, vol. 9, No. 2, pp. 106-118.
Liu , et al., "Enhancement of synaptic plasticity and reversal of impairments in motor and cognitive functions in a mouse model of Angelman Syndrome by a small neurogenic molecule, NSI-189", Neuropharmacology, Jun. 2019, vol. 144 , pp. 337-344.
Mcintyre , et al. , "The neurogenic compound, NSI-189 phosphate: a novel multi-domain treatment capable of pro-cognitive and antidepressant effects" , Expert Opinion on Investigational Drugs, May 8, 2017, vol. 26, No. 6 , pp. 767-770.
PCT/US2021/065021 , "International Search Report and Written Opinion" mailed Mar. 31, 2022, 16 pages.
PCT/US2021/065021 , "International Preliminary Report on Patentability" mailed Jul. 6, 2023, 11 pages.
Semerci, et al., "Lunatic fringe-mediated Notch signaling regulates adult hippocampal neural stem cell maintenance", eLife, Jul. 12, 2017, vol. 6, No. e24660, pp. 1-28.
Shi et al., "Expression and function of orphan nuclear receptor TLX in adult neural stem cells," Nature, Jan. 1, 2004, vol. 427, No. 6969, pp. 78-83.
Wu, et al. "Orphan nuclear receptor TLX functions as a potent suppressor of oncogene induced senescence in prostate cancer via its transcriptional co-regulation of the CDKN1A ($p21^{WAF1/CIP1}$) and SIRT1 genes", The Journal of Pathology, Jan. 2, 2015, vol. 236, No. 1, pp. 103-115.
Zhang, et al., "A role for adult TLX-positive neural stem cells in learning and behaviour", Nature, Jan. 30, 2008, vol. 451, No. 7181, pp. 1004-1007.
Zhong, et al., "Synthesis of Substituted Morpholines Using Stereodivergent Aza-Michael Reactions Catalyzed by Brønsted Acids", ACS Catalysis, Feb. 19, 2013, vol. 3, No. 4, pp. 643-646.
Zhong, et al., "Diastereoselective Control of Intramolecular Aza-Michael Reactions Using Achiral Catalysts", Organic Letters, Sep. 4, 2011, vol. 13, No. 20, pp. 5556-5559.

49 compounds per scaffold

$N_1$, $N_4$ Reductive methylation (all cases)

$N_1$, $N_4$ Acetylation/Benzoylation (all cases)

$N_1$, $N_4$ Reductive Benzylation (2,3 and 2,5)
$N_4$ Reductive Benzylation (2,6)

2,3 and 2,5
2,6

2,3 and 2,5

2,3 and 2,5
2,6

2,3 and 2,5

$N_1$ Benzylation by Alkylation (2,6)

cis/trans cis/trans

$N_1$, $N_4$ Phenylation (all cases)

*N₁, N₄* Protection/Diversification/Deprotection (all cases)

SMALL-MOLECULE MODULATORS OF THE ORPHAN NUCLEAR RECEPTOR TLX

CROSS-REFERENCE TO RELATED APPLICATION

The present application claims priority to U.S. Provisional Pat. Appl. No. 63/130,219, filed on Dec. 23, 2020, which application is incorporated herein by reference in its entirety.

STATEMENT AS TO RIGHTS TO INVENTIONS MADE UNDER FEDERALLY SPONSORED RESEARCH AND DEVELOPMENT

This invention was made with government support under Grant No. R01GM120033 awarded by the National Institutes of Health. The government has certain rights in the invention.

BACKGROUND OF THE INVENTION

Nuclear receptors are a family of transcription factors that regulate development, maintain homeostasis, and cause human disease. These receptors change gene expression in response to binding certain steroids, other lipophilic signaling molecules, and small molecule ligands that target them. Nuclear receptor TLX, also known as NR2E1, is an orphan nuclear receptor, meaning it has no identified natural or synthetic ligand It is primarily expressed in the forebrain of vertebrates. Located in the nucleus, TLX (NR2E1) can engage in transcriptional regulation and act as a transcriptional repressor in some instances. TLX plays an essential role in adult neural stem cell proliferation, self-renewal, and differentiation. See, e.g., Shi, Y., et al. *Nature* 2004, 427 (6969): 78-83; Li, W. et al. *Mol. Endocrinol.* 2008, 22(1): 56-64; and Zhang, C. L., et al. *Nature* 2008, 451(7181): 1004-1007.

Although TLX (NR2E1) has been primarily studied in the context of neurogenesis, recent findings have also associated it with a range of cancers, including forms of prostate cancer and gliomas. Specifically, TLX is upregulated in treatment resistant prostate cancer and has been shown to suppress oncogene-induced senescence. See, Wu, D. et al. *J. Pathol.* 2015, 236(1): 103-115. Knockdown of TLX has been shown to enhance sensitivity to therapy in prostate cancer. See, Jia. L. et al. *Oncogene* 2018, 37: 3340-3355. TLX overexpression has also been implicated in self-renewal and tumorigenesis of glioblastoma stem cells (GSC) and TLX knockdown inhibits growth of GSCs. See, Cui, Q. et al. *Nat. Commun.* 2016, 7(10637): 1-15.

BRIEF SUMMARY OF THE INVENTION

Provided herein are compounds according to Formula I:

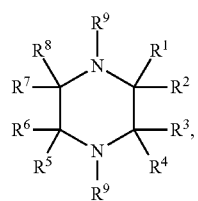

(I)

and pharmaceutically acceptable salts or isomers thereof, wherein:

$R^1$, $R^2$, $R^3$, $R^4$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, $-(L^1)_n N(R^a)_2$, $-(L^1)_n NR^a C(=O)R^b$, $-(L^1)_n NR^a S(=O)_2 R^b$, $-(L^1)_n NR^a C(=O)OR^c$, $-(L^1)_n NR^a C(=O)NR^d R^e$, $-(L^1)_n NR^a C(=S)NR^d R^e$, $-(L^1)_n OC(=O)R^b$, $-(L^1)_n OC(=O)OR^c$, $-(L^1)_n OC(=O)NR^d R^e$, $-(L^1)_n C(=O)R^b$, $-(L^1)_n C(=O)OR^c$, $-(L^1)_n C(=O)NR^d R^e$, $-(L^1)_n C(=S)NR^d R^e$, $-(L^1)_n S(=O)_2 R^a$, and $-(L^1)_n S(=O)_2 NR^d R^e$, wherein each subscript n is independently 0 or 1, each $R^9$ is independently selected from the group consisting of hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl. $-(L^1)_n N(R^a)_2$, $-(L^1)_n NR^a C(=O)R^b$, $-(L^1)_n NR^a S(=O)_2 R^b$, $-(L^1)_n NR^a C(=O)OR^c$, $-(L^1)_n NR^a C(=O)NR^d R^e$, $-(L^1)_n NR^a C(=S)NR^d R^e$, $-(L^1)_n OC(=O)R^b$, $-(L^1)_n OC(=O)OR^c$, $-(L^1)_n OC(=O)NR^d R^e$, $-(L^1)_n C(=O)R^b$, $-(L^1)_n C(=O)OR^c$, $-(L^1)_n C(=O)NR^d R^e$, $-(L^1)_n C(=S)NR^d R^e$, $-(L^1)_n S(=O)_2 R^a$, and $-(L^1)_n S(=O)_2 NR^d R^e$, wherein each subscript n is independently 0 or 1;

provided that when one $R^9$ is 2-(isopentylamino)pyridin-3-ylcarbonyl and the other $R^9$ is benzyl, at least one of $R^1$, $R^2$, $R^3$, $R^4$, $R^5$, $R^6$, $R^7$, and $R^8$ is other than hydrogen;

each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl; and each $L^1$ is independently selected from the group consisting of $C_1$-$C_{12}$ alkylene and 2- to 12-membered heteroalkylene.

Also provided herein are compounds according to Formula II:

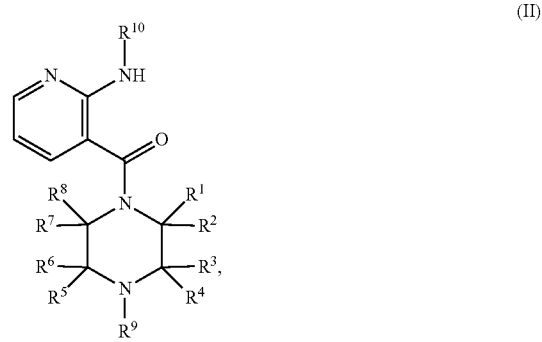

(II)

and pharmaceutically acceptable salts or isomers thereof, wherein:

$R^1$, $R^2$, $R^3$, $R^4$, $R^5$, $R^6$, and $R^7$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, ($C_6$-$C_{14}$ aryl)-($C_1$-$C_6$ alkyl), 5- to 12-membered heteroaryl, hydroxyl, -(L¹)ₙN(Rᵃ)₂, -(L¹)ₙNRᵃC(=O)Rᵇ, -(L¹)ₙ-NRᵃS(=O)₂Rᵇ, -(L¹)ₙNRᵃC(=O)ORᶜ, -(L¹)ₙNRᵃC(=O)NRᵈRᵉ, -(L¹)ₙNRᵃC(=S)NRᵈRᵉ, -(L)ₙOC(=O)Rᵇ, -(L¹)ₙOC(=O)ORᶜ, -(L¹)ₙOC(=O)NRᵈRᵉ, -(L¹)ₙC(=O)Rᵇ, -(L¹)ₙC(=O)ORᶜ, -(L¹)ₙC(=O)NRᵈRᵉ, -(L¹)ₙC(=S)NRᵈRᵉ, -(L¹)ₙS(=O)₂Rᵃ, and -(L¹)ₙS(=O)₂NRᵈRᵉ, wherein each subscript n is independently 0 or 1;

R⁸ is selected from the group consisting of ($C_6$-$C_{14}$ aryl)-($C_1$-$C_6$ alkyl), hydrogen, halogen, $C_1$-$C_{12}$ alkyl, $C_2$-$C_2$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -(L¹)ₙN(Rᵃ)₂, -(L¹)ₙNRᵃC(=O)Rᵇ, -(L¹)ₙNRᵃS(=O)₂Rᵇ, -(L¹)ₙNRᵃC(=O)ORᶜ, -(L¹)ₙNRᵃC(=O)NRᵈRᵉ, -(L¹)ₙNRᵃC(=S)NRᵈRᵉ, -(L¹)ₙOC(=O)Rᵇ, -(L¹)ₙOC(=O)ORᶜ, -(L¹)ₙOC(=O)NRᵈRᵉ, -(L¹)ₙC(=O)Rᵇ, (L¹)ₙC(=O)ORᶜ, -(L¹)ₙC(=O)NRᵈRᵉ, -(L¹)ₙC(=S)NRᵈRᵉ, -(L¹)ₙS(=O)₂Rᵃ, and -(L¹)ₙS(=O)₂NRᵈRᵉ, wherein each subscript n is independently 0 or 1;

at least one of R¹, R², R³, R⁴, R⁵, R⁶, R⁷, and R⁸ is other than hydrogen;

R⁹ is selected from the group consisting of ($C_6$-$C_{14}$ aryl)-($C_1$-$C_6$ alkyl), hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -(L¹)ₙN(Rᵃ)₂, -(L¹)ₙ NRᵃC(=O)Rᵇ, -(L¹)ₙNRᵃS(=O)₂Rᵇ, -(L¹)ₙNRᵃC(=O)ORᶜ, -(L¹)ₙNRᵃC(=O)NRᵈRᵉ, -(L¹)ₙNRᵃC(=S)NRᵈRᵉ, -(L¹)ₙOC(=O)Rᵇ, -(L¹)ₙOC(=O)ORᶜ, -(L¹)ₙOC(=O)NRᵈRᵉ, -(L¹)ₙC(=O)Rᵇ, -(L¹)ₙC(=O)ORᶜ, -(L¹)ₙC(=O)NRᵈRᵉ, -(L¹)ₙC(=S)NRᵈRᵉ, -(L¹)ₙS(=O)₂Rᵃ, and -(L¹)ₙS(=O)₂NRᵈRᵉ, wherein each subscript n is independently 0 or 1;

each Rᵃ, Rᵇ, Rᶜ, Rᵈ, and Rᵉ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl;

each aryl, heteroaryl, cycloalkyl in R¹-R⁹ is unsubstituted or is optionally and independently substituted with 1-5 substitutents independently selected from the group consisting of $C_1$-$C_{12}$ alkyl, $C_1$-$C_{12}$ alkoxy, —C(=O)Rᵇ, and —C(=O)ORᶜ;

each L¹ is independently selected from the group consisting of $C_1$-$C_{12}$ alkylene and 2- to 12-membered heteroalkylene; and R¹⁰ is selected from the group consisting of $C_5$-$C_{12}$ alkyl, $C_1$-$C_4$ alkyl, and $C_3$-$C_8$ cycloalkyl.

In some embodiments, the compound has a structure according to Formula IIa:

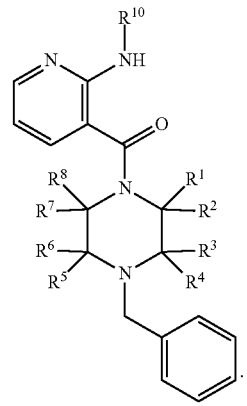

(IIa)

In another aspect, the present invention provides a pharmaceutical composition comprising a compound as described herein, or a pharmaceutically acceptable salt or isomer thereof, and a pharmaceutically acceptable excipient.

In another aspect, the present invention provides a method for promoting neurogenesis. The method includes contacting a neuron or neuronal cell with a compound as described herein, or a pharmaceutically acceptable salt or isomer thereof, or a composition as described herein, in an amount sufficient to promote neurogenesis.

In another aspect, the present invention provides a method for treating a disease or condition associated with nuclear receptor TLX (NR2E1). The method includes administering to a subject in need thereof a therapeutically effective amount of a compound as described herein, or a pharmaceutically acceptable salt or isomer thereof, or a therapeutically effective amount of a composition as described herein. In some embodiments, the disease or condition is selected from the group consisting of a neurological disorder, a metabolic disorder, and cancer.

DETAILED DESCRIPTION OF THE INVENTION

Figure 1:
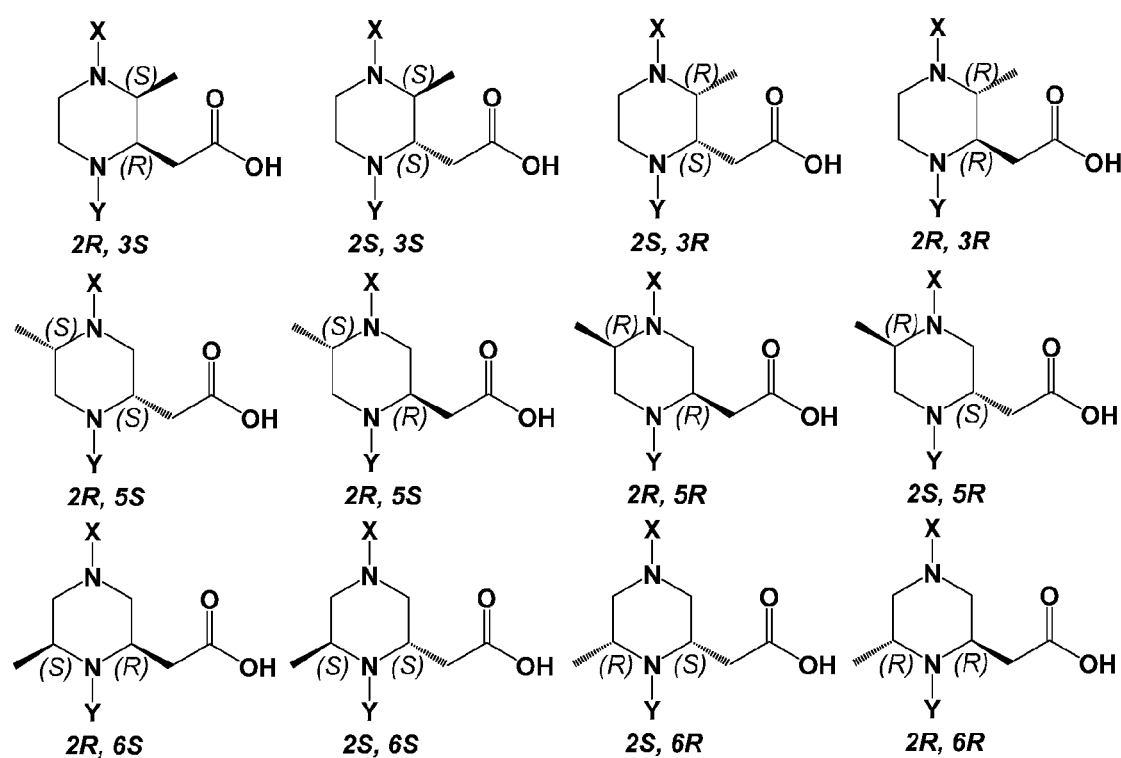
FIG. 1 shows twelve scaffold matrix of stereochemical isomers of Ala derived piperazine-2-acetic acids. X and Y represent various covalently bonded diversification groups.

The present invention provides compounds and compositions thereof for modulation of nuclear receptor TLX (NR2E1). The compounds can be used to promote neurogenesis and to treat diseases or conditions associated with nuclear receptor TLX, including neurological disorders (e.g., major depressive disorder (MDD), schizophrenia, Alzheimer's disease (AD), Parkinson's disease (PD), multiple sclerosis (MS), cognitive impairment, irradiation induced cognition, epilepsy, Angelman syndrome, ischemic stroke, diabetes induced neuropathy, etc.); metabolic disorders (e.g., diabetes, amyotrophic lateral sclerosis, etc.); and cancers (e.g., glioblastoma, neuroblastoma, retinoblastoma, breast cancer, prostate cancer, pancreatic cancers, etc.). The compounds of the present invention are small molecules that act through the TLX ligand binding domain and enhance coactivator binding. Synthetic modifications, systematic structure activity relationships, and testing series of these compounds lead to ligands that reduce coactivator binding, enhance corepressor binding, and/or decrease the stability of the nuclear receptor TLX.

I. DEFINITIONS

Unless specifically indicated otherwise, all technical and scientific terms used herein have the same meaning as commonly understood by those of ordinary skill in the art to which this invention belongs. For purposes of the present invention, the following terms are defined.

The terms "a," "an," or "the" as used herein not only include elements with one member, but also include elements with more than one member. For instance, the singular forms "a," "an," and "the" include plural referents unless the context clearly dictates otherwise. Thus, for example, reference to "a compound" includes a plurality of such compounds, and so forth.

As used herein, the terms "about" and "around," and the like, are used herein to modify a numerical value and indicate a defined range around that value. If "X" is the value, "about X" or "around X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

As used herein, the terms "comprising" and "comprises" are intended to mean that the compounds, compositions, methods, and respective components thereof include the recited elements, but do not exclude others. "Consisting essentially of" refers to those elements required for a given embodiment. The phrase permits the presence of additional elements that do not materially affect the basic and novel or functional characteristic(s) of the given embodiment (e.g., compounds, compositions, or methods). "Consisting of" refers to compounds, compositions, methods, and respective components thereof, as described herein, which are exclusive of any element not recited in that description of the embodiment. Embodiments defined by each of these transition terms are within the scope of this disclosure.

As used herein, the term "alkyl," by itself or as part of another substituent, refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{1-11}$, $C_{1-12}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Unless otherwise specified, alkyl groups can be substituted or unsubstituted. For example. "substituted alkyl" groups can be an alkyl group substituted with one or more groups selected from halo, hydroxy, amino, aminoalkyl, amido, and alkoxy.

As used herein, the term "alkenyl," by itself or as part of another substituent, refers to a straight or branched hydrocarbon having at least 2 carbon atoms and at least one double bond. Alkenyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-11}$, $C_{2-12}$, $C_3$, $C_{3-4}$, $C_{3-5}$, $C_{3-6}$, $C_4$, $C_{4-5}$, $C_{4-6}$, $C_5$, $C_{5-6}$, and $C_6$. Alkenyl groups can have any suitable number of double bonds, including, but not limited to, 1, 2, 3, 4, 5 or more. Examples of alkenyl groups include, but are not limited to, vinyl (ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Unless otherwise specified, alkenyl groups can be unsubstituted or substituted. For example, "substituted alkenyl" groups can be an alkenyl group substituted with one or more groups selected from halo, hydroxy, amino, aminoalkyl, amido, and alkoxy.

As used herein, the term "alkynyl," by itself or as part of another substituent, refers to a straight chain or branched hydrocarbon having at least 2 carbon atoms and at least one triple bond. Alkynyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-11}$, $C_{2-12}$, $C_3$, $C_{3-4}$, $C_{3-5}$, $C_{3-6}$, $C_4$, $C_{4-5}$, $C_{4-6}$, $C_5$, $C_{5-6}$, and $C_6$. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5- hexadiynyl, 2,4-hexadiynyl, or 1,3,5-hexatriynyl. Unless otherwise specified, alkynyl groups can be unsubstituted or substituted. For example, "substituted alkynyl" groups can be an alkynyl group substituted with one or more groups selected from halo, hydroxy, amino, aminoalkyl, amido, and alkoxy.

As used herein, the term "alkoxy," by itself or as part of another substituent, refers to a group having the formula —OR, wherein R is an alkyl group, as defined above.

As used herein, the term "cycloalkyl," by itself or as part of another substituent, refers to a saturated or partially unsaturated, monocyclic, spirocyclic, fused bicyclic or bridged polycyclic ring system containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, and $C_{3-12}$. Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2] bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Unless otherwise specified, cycloalkyl groups can be substituted or unsubstituted. For example, "substituted cycloalkyl" groups can be substituted with one or more groups selected from alkyl, halo, hydroxy, amino, alkylamino, amido, acyl, nitro, cyano, and alkoxy.

As used herein, the term "alkylene" refers to an alkyl group, as defined above, linking at least two other groups (i.e., a divalent alkyl radical). The two moieties linked to the alkylene group can be linked to the same carbon atom or different carbon atoms of the alkylene group.

As used herein, the term "heteroalkyl," by itself or as part of another substituent, refers to an alkyl group of any suitable length and having from 1 to 6, or more, heteroatoms such as N, O and S. For example, heteroalkyl can include ethers, thioethers and alkyl-amines. Additional heteroatoms can also be useful, including, but not limited to, B, Al, Si and P. The heteroatoms can be oxidized to form moieties such as, but not limited to, —S(O)— and —S(O)$_2$—. The heteroatom portion of the heteroalkyl can replace a hydrogen of the alkyl group to form a hydroxy, thio, or amino group. Alternatively, the heteroatom portion can be the connecting atom, or be inserted between two carbon atoms.

As used herein, the term "heteroalkylene" refers to a heteroalkyl group, as defined above, linking at least two other groups (i.e., a divalent heteroalkyl radical). The two moieties linked to the heteroalkylene group can be linked to the same atom or different atoms of the heteroalkylene group.

As used herein, the terms "halo" and "halogen," by themselves or as part of another substituent, refer to a fluorine, chlorine, bromine, or iodine atom.

As used herein, the term "haloalkyl," by itself or as part of another substituent, refers to an alkyl group where some or all of the hydrogen atoms are replaced with halogen atoms. As for alkyl groups, haloalkyl groups can have any suitable number of carbon atoms, such as $C_{1-8}$.

As used herein, the term "aryl," by itself or as part of another substituent, refers to an aromatic ring system having any suitable number of carbon ring atoms and any suitable number of rings. Aryl groups can include any suitable number of carbon ring atoms, such as $C_6$, $C_7$, $C_8$, $C_9$, $C_{10}$, $C_{11}$, $C_{12}$, $C_{13}$, $C_{14}$, $C_{15}$ or $C_{16}$, as well as $C_{6-10}$, $C_{6-12}$, or $C_{6-14}$. Aryl groups can be monocyclic, fused to form bicyclic (e.g., benzocyclohexyl) or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Unless otherwise specified, aryl groups can be substituted or unsubstituted. For example, "substituted aryl" groups can be substituted with one or more groups selected from alkyl, halo, hydroxy, amino, alkylamino, amido, acyl, nitro, cyano, and alkoxy.

As used herein, the term "heteroaryl," by itself or as part of another substituent, refers to a monocyclic or fused bicyclic or tricyclic aromatic ring assembly containing 5 to 16 ring atoms, where from 1 to 5 of the ring atoms are a heteroatom such as N, O or S. Additional heteroatoms can also be useful, including, but not limited to, B, Al, Si and P. The heteroatoms can be oxidized to form moieties such as, but not limited to, —S(O)— and —S(O)$_2$—. Heteroaryl groups can include any number of ring atoms, such as, 3 to 6, 4 to 6, 5 to 6, 3 to 8, 4 to 8, 5 to 8, 6 to 8, 3 to 9, 3 to 10, 3 to 11, or 3 to 12 ring members. Any suitable number of heteroatoms can be included in the heteroaryl groups, such as 1, 2, 3, 4, or 5; or 1 to 2, 1 to 3, 1 to 4, 1 to 5, 2 to 3, 2 to 4, 2 to 5, 3 to 4, or 3 to 5. For example, heteroaryl groups can be 5- to 8-membered heteroaryl and have from 1 to 4 heteroatoms; or 5- to 8-membered heteroaryl and have from 1 to 3 heteroatoms; or 5- to 6-membered heteroaryl and have from 1 to 4 heteroatoms; or 5- to 6-membered heteroaryl and have from 1 to 3 heteroatoms. The heteroaryl group can include groups such as pyrrole, pyridine, imidazole, pyrazole, triazole, tetrazole, pyrazine, pyrimidine, pyridazine, triazine (1,2,3-, 1,2,4- and 1,3,5-isomers), thiophene, furan, thiazole, isothiazole, oxazole, and isoxazole. The heteroaryl groups can also be fused to aromatic ring systems, such as a phenyl ring, to form members including, but not limited to, benzopyrroles such as indole and isoindole, benzopyridines such as quinoline and isoquinoline, benzopyrazine (quinoxaline), benzopyrimidine (quinazoline), benzopyridazines such as phthalazine and cinnoline, benzothiophene, and benzofuran. Other heteroaryl groups include heteroaryl rings linked by a bond, such as bipyridine. Unless otherwise specified, heteroaryl groups can be substituted or unsubstituted. For example, "substituted heteroaryl" groups can be substituted with one or more groups selected from alkyl, halo, hydroxy, amino, alkylamino, amido, acyl, nitro, cyano, and alkoxy.

The heteroaryl groups can be linked via any position on the ring. For example, pyrrole includes 1-, 2- and 3-pyrrole, pyridine includes 2-, 3- and 4-pyridine, imidazole includes 1-, 2-, 4- and 5-imidazole, pyrazole includes 1-, 3-, 4- and 5-pyrazole, triazole includes 1-, 4- and 5-triazole, tetrazole includes 1- and 5-tetrazole, pyrimidine includes 2-, 4-, 5- and 6-pyrimidine, pyridazine includes 3- and 4-pyridazine, 1,2,3-triazine includes 4- and 5-triazine, 1,2,4-triazine includes 3-, 5- and 6-triazine, 1,3,5-triazine includes 2-triazine, thiophene includes 2- and 3-thiophene, furan includes 2- and 3-furan, thiazole includes 2-, 4- and 5-thiazole, isothiazole includes 3-, 4- and 5-isothiazole, oxazole includes 2-, 4- and 5-oxazole, isoxazole includes 3-, 4- and 5-isoxazole, indole includes 1-, 2- and 3-indole, isoindole includes 1- and 2-isoindole, quinoline includes 2-, 3- and 4-quinoline, isoquinoline includes 1-, 3- and 4-isoquinoline, quinazoline includes 2- and 4-quinoazoline, cinnoline includes 3- and 4-cinnoline, benzothiophene includes 2- and 3-benzothiophene, and benzofuran includes 2- and 3-benzofuran.

Some heteroaryl groups include those having from 5 to 10 ring members and from 1 to 3 ring atoms including N, O or S, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, isoxazole, indole, isoindole, quinoline, isoquinoline, quinoxaline, quinazoline, phthalazine, cinnoline, benzothiophene, and benzofuran. Other heteroaryl groups include those having from 5 to 8 ring members and from 1 to 3 heteroatoms, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, and isoxazole. Some other heteroaryl groups include those having from 9 to 12 ring members and from 1 to 3 heteroatoms, such as indole, isoindole, quinoline, isoquinoline, quinoxaline, quinazoline, phthalazine, cinnoline, benzothiophene, benzofuran and bipyridine. Still other heteroaryl groups include those having from 5 to 6 ring members and from 1 to 2 ring atoms including N, O or S, such as pyrrole, pyridine, imidazole, pyrazole, pyrazine, pyrimidine, pyridazine, thiophene, furan, thiazole, isothiazole, oxazole, and isoxazole.

Some heteroaryl groups include from 5 to 10 ring members and only nitrogen heteroatoms, such as pyrrole, pyridine, imidazole, pyrazole, triazole, pyrazine, pyrimidine, pyridazine, triazine (1,2,3-, 1,2,4- and 1,3,5-isomers), indole, isoindole, quinoline, isoquinoline, quinoxaline, quinazoline, phthalazine, and cinnoline. Other heteroaryl groups include from 5 to 10 ring members and only oxygen heteroatoms, such as furan and benzofuran. Some other heteroaryl groups include from 5 to 10 ring members and only sulfur heteroatoms, such as thiophene and benzothiophene. Still other heteroaryl groups include from 5 to 10 ring members and at least two heteroatoms, such as imidazole, pyrazole, triazole, pyrazine, pyrimidine, pyridazine, triazine (1,2,3-, 1,2,4- and 1,3,5-isomers), thiazole, isothiazole, oxazole, isoxazole, quinoxaline, quinazoline, phthalazine, and cinnoline.

As used herein, the term "heterocycloalkyl,", by itself or as part of another substituent, refers to a saturated cycloalkyl ring system, as defined above, having from 3 to 12 ring members and from 1 to 6 heteroatoms of N, O and S. Additional heteroatoms can also be useful, including, but not limited to, B, Al, Si and P. The heteroatoms can be oxidized to form moieties such as, but not limited to, —S(O)— and —S(O)$_2$—. Heterocycloalkyl groups can include any number of ring atoms, such as, 3 to 6, 4 to 6, 5 to 6, 3 to 8, 4 to 8, 5 to 8, 6 to 8, 3 to 9, 3 to 10, 3 to 11, or 3 to 12 ring members. Any suitable number of heteroatoms can be included in the heterocycloalkyl groups, such as 1, 2, 3, or 4, or 1 to 2, 1 to 3, 1 to 4, 2 to 3, 2 to 4, or 3 to 4. The heterocycloalkyl group can include groups such as aziridine, azetidine, pyrrolidine, piperidine, azepane, azocane, quinuclidine, pyrazolidine, imidazolidine, piperazine (1,2-, 1,3- and 1,4-isomers), oxirane, oxetane, tetrahydrofuran, oxane (tetrahydropyran), oxepane, thiirane, thietane, thiolane (tetrahydrothiophene), thiane (tetrahydrothiopyran), oxazolidine, isoxazolidine, thiazolidine, isothiazolidine, dioxolane, dithiolane, morpholine, thiomorpholine, dioxane, or dithiane. The heterocycloalkyl groups can also be fused to aromatic or non-aromatic ring systems to form members including, but not limited to, indoline. Unless otherwise specified, heterocycloalkyl groups can be unsubstituted or substituted. For example, "substituted heterocycloalkyl" groups can be substituted with one or more groups selected from alkyl, halo, hydroxy, amino, oxo, alkylamino, amido, acyl, nitro, cyano, and alkoxy.

The heterocycloalkyl groups can be linked via any position on the ring. For example, aziridine can be 1- or 2-aziridine, azetidine can be 1- or 2-azetidine, pyrrolidine can be 1-, 2- or 3-pyrrolidine, piperidine can be 1-, 2-, 3- or 4-piperidine, pyrazolidine can be 1-, 2-, 3-, or 4-pyrazolidine, imidazolidine can be 1-, 2-, 3- or 4-imidazolidine, piperazine can be 1-, 2-, 3- or 4-piperazine, tetrahydrofuran can be 1- or 2-tetrahydrofuran, oxazolidine can be 2-, 3-, 4- or 5-oxazolidine, isoxazolidine can be 2-, 3-, 4- or 5-isoxazolidine, thiazolidine can be 2-, 3-, 4- or 5-thiazolidine, isothiazolidine can be 2-, 3-, 4- or 5-isothiazolidine, and morpholine can be 2-, 3- or 4-morpholine.

When heterocycloalkyl includes 3 to 8 ring members and 1 to 3 heteroatoms, representative members include, but are not limited to, pyrrolidine, piperidine, tetrahydrofuran, oxane, tetrahydrothiophene, thiane, pyrazolidine, imidazolidine, piperazine, oxazolidine, isoxazolidine, thiazolidine, isothiazolidine, morpholine, thiomorpholine, dioxane and dithiane. Heterocycloalkyl can also form a ring having 5 to 6 ring members and 1 to 2 heteroatoms, with representative members including, but not limited to, pyrrolidine, piperidine, tetrahydrofuran, tetrahydrothiophene, pyrazolidine, imidazolidine, piperazine, oxazolidine, isoxazolidine, thiazolidine, isothiazolidine, and morpholine.

As used herein, the terms "hydroxy" and "hydroxyl" refer to the moiety —OH.

As used herein, the term "amino" refers to a moiety —NR$_2$, wherein each R group is hydrogen, alkyl, alkenyl, alkynyl, cycloalkyl, heterocycloalkyl, aryl, or heteroaryl. The R groups can be the same or different. The amino groups can be primary (each R is hydrogen), secondary (one R is hydrogen) or tertiary (each R is other than hydrogen). An amino moiety can be ionized to form the corresponding ammonium cation. "Alkylamino" refers to a secondary amino moiety wherein one R group is alkyl or cycloalkyl.

As used herein, the term "aminoalkyl" refers to an alkyl group as defined herein, having one or more amino groups. The amino groups can be primary, secondary or tertiary. The aminoalkyl group can be further substituted with a hydroxy group to form an amino-hydroxy group. Non-limiting examples of aminoalkyl groups include, but are not limited to, aminoethyl, aminopropyl, and aminoisopropyl. The amino group can link the alkyl group to the point of attachment with the rest of the compound, be at the terminal position of the alkyl group, or link together at least two carbon atoms of the alkyl group. One of skill in the art will appreciate that other aminoalkyl groups are useful in the present invention.

As used herein, the term "amido" refers to a moiety —NRC(=O)R or —C(=O)NR$_2$, wherein each R group is hydrogen, alkyl, alkenyl, alkynl, cycloalkyl, heterocycloalkyl, aryl, or heteroaryl.

As used herein, the term "carboxy" refers to the moiety —C(=O)OR, wherein the R group is hydrogen or alkyl. A carboxy moiety can be ionized to form the corresponding carboxylate anion.

As used herein, the term "oxo" refers to an oxygen atom that is double-bonded to a carbon atom (i.e., O=).

As used herein, the term "sulfonyl" refers to a moiety —S(=O)$_2$R, wherein the R group is alkyl, haloalkyl, or aryl. "Alkylsulfonyl" refers to an amino moiety wherein the R group is alkyl.

As used herein, the term "pharmaceutically acceptable excipient" refers to a substance that aids the administration of an active agent to a subject. By "pharmaceutically acceptable," it is meant that the excipient is compatible with the other ingredients of the formulation and is not deleterious to the recipient thereof. Useful pharmaceutical excipients include, but are not limited to, binders, fillers, disintegrants, lubricants, glidants, coatings, sweeteners, flavors and colors.

The compounds of the present invention can be in salt form, such as acid or base salts of the compounds of the present invention. "Pharmaceutically acceptable salt" refers to salts of active compounds that are prepared with acids or bases, depending upon the particular substituents found on the compounds described herein. Acid salts of basic compounds include, but are not limited to, mineral acid salts (e.g., salts formed using hydrochloric acid, hydrobromic acid, phosphoric acid, and the like), organic acid salts (e.g., salts formed using acetic acid, propionic acid, glutamic acid, citric acid, and the like) salts, and quaternary ammonium salts (e.g., salts formed using methyl iodide, ethyl iodide, and the like). Acidic compounds may be contacted with bases to provide base salts such as alkali and alkaline earth metal salts (e.g., sodium, lithium, potassium, calcium, and magnesium salts), as well as ammonium salts (e.g., ammonium, trimethyl-ammonium, diethylammonium, and tris-(hydroxymethyl)-methyl-ammonium salts). In some embodiments, the neutral forms of a compound may be regenerated by contacting the salt with a base or acid and isolating the parent compound in the conventional manner if desired. In some embodiments, the parent form of a compound may differ from various salt forms in certain physical properties, such as solubility in polar solvents, but otherwise the parent form of the compound may be equivalent to the salt forms. It is understood that the pharmaceutically acceptable salts are non-toxic. Additional information on suitable pharmaceutically acceptable salts can be found in *Remington's Pharmaceutical Sciences,* 17th Edition, Mack Publishing Company, Easton, Pa., 1985, which is incorporated herein by reference.

The compounds of the present invention can exist in unsolvated forms, or anhydrous forms, as well as solvated forms, including hydrated forms. Hydrates, as the name infers, refer to complexation of molecules of water with each molecule of this invention. Solvates refer to complexation with an organic solvent such as methanol, ethanol, and isopropanol, and the like. In general, the solvated forms are equivalent to unsolvated forms and are intended to be encompassed within the scope of the present invention. Certain compounds of the present invention may exist in multiple crystalline or amorphous forms. In general, all physical forms (e.g., anhydrates, solvates and hydrates) are equivalent for the uses contemplated by the present invention and are intended to be within the scope of the present invention.

As used herein, the term "neurogenesis" refers to the process by which neurons are created. Neurogenesis encompasses proliferation of neural stem and progenitor cells, differentiation of these cells into new neural cell types, as well as migration and survival of the new cells, including neurogenesis (or regeneration of neural cells) that occurs following disease, damage or therapeutic intervention.

As used herein the term "nuclear receptor TLX," also known as NR2E1 (nuclear receptor subfamily 2, group E, member 1), refers to a tailless nuclear receptor, an important group of ligand-dependent transcriptional factors, which is expressed exclusively in the brain. Based on sequence homology analysis, TLX possesses a canonical DNA binding domain, a hinge region, and a Ligand Binding Domain (LBD), and lacks an N-terminal domain containing the ligand-independent activation function. See, e.g., Benod, C., et al. *PLoS ONE,* 2014, 9(6): e99440. Orphan nuclear receptor TLX is linked to neurogenesis (e.g., neural stem cell proliferation, self-renewal, and/or differentiation) as well as neurological disorders, metabolic disorders, and/or cancers.

As used herein the term "modulator" refers to the ability of a compound of the instant invention to directly (e.g., by binding to the TLX receptor within the ligand binding domain) or indirectly (e.g., by binding to or interacting with receptor sites other than the TLX ligand binding domain) induce a biological response of the nuclear receptor TLX and/or influence the expression of gene(s) involved in neurogenesis (e.g., neural stem cell proliferation, self-renewal, and/or differentiation), neurological disorders, metabolic disorders, and/or cancers. The compounds of the instant invention can modulate TLX activity as TLX agonists or TLX antagonists.

As used herein, the term "agonist" refers to a compound that activates, enhances/increases, or up-regulates the expression of TLX or increases the activity of TLX (e.g., activates, enhances/increases, or up-regulates expression of gene(s) involved in neurogenesis). An agonist may be directly or indirectly active on TLX, as described above, or it may be active on one or more constituents in a pathway that leads to enhanced or increased activity of TLX (e.g., recruitment of a range of positive regulatory proteins (co-activators)). In some cases, treating a disease or condition associated with nuclear receptor TLX (e.g., neurological disorders, metabolic disorders, and/or cancers, as described above) can result from the promotion of neurogenesis caused by the increased TLX activity via TLX agonists.

As used herein, the phrase "amount sufficient to promote neurogenesis" refers to amount of the compound or TLX modulator described herein that is sufficient to achieve a statistically significant promotion of neurogenesis compared to the absence of the compound. Neurogenesis (e.g., proliferation of neural stem and progenitor cells, differentiation of these cells into new neural cell types, and migration and survival of the new cells) can be readily assessed using in vitro or in vivo assays well known to those skilled in the art. For example, an amount sufficient to promote neurogenesis will result in the increase of neural stem and progenitor cell proliferation by at least 1.5-fold, at least 15-fold, or at least 25-fold, or more, compared to the absence of the compound.

As used herein, the terms "treat," "treatment," and "treating" refer to any indicia of success in the treatment or amelioration of an injury, pathology, condition, or symptom (e.g., cognitive impairment), including any objective or subjective parameter such as abatement; remission; diminishing of symptoms or making the symptom, injury, pathology or condition more tolerable to the patient: reduction in the rate of symptom progression; decreasing the frequency or duration of the symptom or condition; or, in some situations, preventing the onset of the symptom. The treatment or amelioration of symptoms can be based on any objective or subjective parameter, including, e.g., the result of a physical examination.

As used herein, the terms "effective amount" and "therapeutically effective amount" refer to a dose of a compound such as a small molecule that modulate the nuclear receptor TLX by acting through the TLX ligand binding domain to enhance coactivator binding and/or to produce therapeutic effects for which it is administered. The exact dose will depend on the purpose of the treatment, and will be ascertainable by one skilled in the art using known techniques (see, e.g., Lieberman, *Pharmaceutical Dosage Forms* (vols. 1-3, 1992); Lloyd, *The Art, Science and Technology of Pharmaceutical Compounding* (1999); Pickar, *Dosage Calculations* (1999); *Goodman & Gilman's The Pharmacological Basis of Therapeutics*, 11th Edition, 2006, Brunton, Ed., McGraw-Hill; and *Remington: The Science and Practice of Pharmacy*, 21st Edition, 2005, Hendrickson, Ed., Lippincott, Williams & Wilkins).

As used herein, the terms "contacting" or "contact" refer to the process of allowing at least two distinct species (e.g. chemical compounds, ligand binding domain of nuclear receptor TLX, or cells) to become sufficiently proximal to react, interact, or physically touch.

As used herein, the term "subject" refers to animals such as mammals, including, but not limited to, primates (e.g. humans), cows, sheep, goats, horses, dogs, cats, rabbits, rats, mice and the like.

II. TLX MODULATORS

Provided herein are compounds according to Formula I:

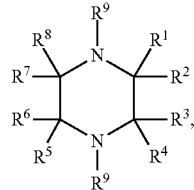

(I)

and pharmaceutically acceptable salts and isomers thereof, wherein:

$R^1$, $R^2$, $R^3$, $R^4$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, $-(L^1)_n N(R^a)_2$, $-(L^1)_n NR^a C(=O)R^b$, $-(L^1)_n NR^a S(=O)_2 R^b$, $-(L^1)_n NR^a C(=O)OR^c$, $-(L^1)_n NR^a C(=O)NR^d R^e$, $-(L^1)_n NR^a C(=S)NR^d R^e$, $-(L^1)_n OC(=O)R^b$, $-(L^1)_n OC(=O)OR^c$, $-(L^1)_n OC(=O)NR^d R^e$, $-(L^1)_n C(=O)R^b$, $-(L^1)_n C(=O)OR^c$, $-(L^1)_n C(=O)NR^d R^e$, $-(L^1)_n C(=S)NR^d R^e$, $-(L^1)_n S(=O)_2 R^a$, and $-(L^1)_n S(=O)_2 NR^d R^e$, wherein each subscript n is independently 0 or 1, each $R^9$ is independently selected from the group consisting of hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, $-(L^1)_n N(R^a)_2$, $-(L^1)_n NR^a C(=O)R^b$, $-(L^1)_n NR^a S(=O)_2 R^b$, $-(L^1)_n NR^a C(=O)OR^c$, $-(L^1)_n NR^a C(=O)NR^d R^e$, $-(L^1)_n NR^a C(=S)NR^d R^e$, $-(L^1)_n OC(=O)R^b$, $-(L^1)_n OC(=O)OR^c$, $-(L^1)_n OC(=O)NR^d R^e$,
$-(L^1)_n C(=O)R^b$, $-(L^1)_n C(=O)OR^c$, $-(L^1)_n C(=O)NR^d R^e$, $-(L^1)_n C(=S)NR^d R^e$, $-(L^1)_n S(=O)_2 R^a$, and $-(L^1)_n S(=O)_2 NR^d R^e$, wherein each subscript n is independently 0 or 1;

provided that when one $R^9$ is 2-(isopentylamino)pyridin-3-ylcarbonyl and the other $R^9$ is benzyl, at least one of $R^1$, $R^2$, $R^3$, $R^4$, $R^5$, $R^6$, $R^7$, and $R^8$ is other than hydrogen;

each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl; and each $L^1$ is independently selected from the group consisting of $C_1$-$C_{12}$ alkylene and 2- to 12-membered heteroalkylene.

In some embodiments, compounds of Formula I are provided, and pharmaceutically acceptable salts thereof, as described above, wherein at least one of $R^1$, $R^2$, $R^3$, $R^4$, $R^5$, $R^6$, $R^7$, and $R^8$ is other than hydrogen.

In some embodiments, compounds having a structure according to Formula Ia are provided:

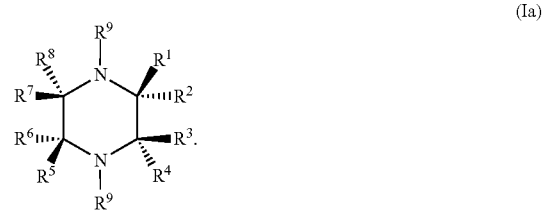

(Ia)

In some embodiments, compounds having a structure according to Formula Ib are provided:

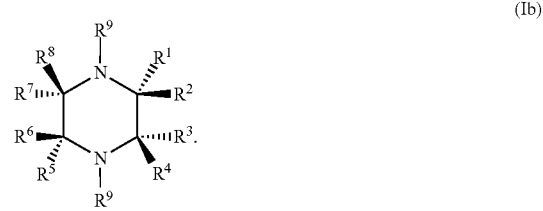

(Ib)

In some embodiments, compounds of Formula I, Formula Ia, and/or Formula Ib, and pharmaceutically acceptable salts and isomers thereof, are provided wherein:

$R^1$, $R^2$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, $-(L^1)_n N(R^a)_2$, $-(L^1)_n NR^a C(=O)R^b$, $-(L^1)_n NR^a S(=O)_2 R^b$, $-(L^1)_n NR^a C(=O)OR^c$, $-(L^1)_n NR^a C(=O)NR^d R^e$, $-(L^1)_n NR^a C(=S)NR^d R^e$, $-(L^1)_n OC(=O)R^b$, $-(L^1)_n OC(=O)OR^c$, $-(L^1)_n OC(=O)NR^d R^e$, $-(L^1)_n C(=O)R^b$, $-(L^1)_n C(=O)OR^c$, $-(L^1)_n C(=O)NR^d R^e$, $-(L^1)_n C(=S)NR^d R^e$, $-(L^1)_n S(=O)_2 R^a$, and $-(L^1)_n S(=O)_2 NR^d R^e$, wherein each subscript n is independently 0 or 1;

$R^3$ is hydrogen; and $R^4$ is selected from the group consisting of halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L)_n$S(=O)$_2$NR$^d$R$^e$, wherein each subscript n is independently 0 or 1.

In some embodiments, compounds of Formula I, Formula Ia, and/or Formula Ib, and pharmaceutically acceptable salts and isomers thereof, are provided wherein:

$R^1$, $R^2$, $R^5$, $R^6$, $R^7$, and $R^8$ are independently selected from the group consisting of hydrogen, halogen, $C_1$-$C_6$ alkyl, $C_2$-$C_6$ alkenyl, $C_2$-$C_6$ alkynyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)$~NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;

at least one of $R^1$, $R^2$, $R^5$, $R^6$, $R^7$, and $R^8$ is other than hydrogen;

$R^3$ is hydrogen; and $R^4$ is selected from the group consisting of halogen, $C_1$-$C_6$ alkyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, -$(L^1)_n$N$(R^a)_2$, -$(L^1)_n$NR$^a$C(=O)R$^b$, -$(L^1)_n$NR$^a$C(=O)OR$^c$, -$(L^1)_n$NR$^a$C(=O)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, and -$(L^1)_n$C(=O)NR$^d$R$^e$, wherein each subscript n is independently 0 or 1.

In some embodiments, the compounds of Formula I, Formula Ia, and/or Formula Ib, and pharmaceutically acceptable salts and isomers thereof, can be prepared using α,β-unsaturated carboxylic acids, or esters thereof, as described in more detail below. In some such instances, $R^4$ in intermediates and/or products is -$(L^1)_n$C(=O)OR$^c$. The moiety -$(L^1)_n$C(=O)OR$^c$ may optionally be converted to other groups, e.g., $C_1$-$C_6$ alkyl, -$(L^1)_n$N$(R^a)_2$, -$(L^1)_n$C(=O)R$^b$, and -$(L^1)_n$C(=O)NR$^d$R$^e$. One of skill in the art will appreciate that other synthetic routes may be employed for preparation of products/intermediates wherein -$(L^1)_n$C(=O)OR$^c$. Accordingly, in some embodiments, compounds of Formula I, Formula Ia, and/or Formula Ib, and pharmaceutically acceptable salts and isomers thereof, are provided wherein $R^4$ is selected from the group consisting of $C_1$-$C_6$ alkyl, -$(L^1)_n$N$(R^a)_2$, -$(L^1)_n$C(=O)R$^b$, -$(L^1)_n$C(=O)OR$^c$, and -$(L^1)_n$C(=O)NR$^d$R$^e$, wherein each subscript n is independently 0 or 1.

In some embodiments, $R^4$ in compounds of Formula I, Formula Ia, and/or Formula Ib, and pharmaceutically acceptable salts and isomers thereof, is -$(L^1)_n$C(=O)OR$^c$. In some such embodiments, subscript n is 0. In some such embodiments, subscript n is 1. In some embodiments, $L^1$ is $C_1$-$C_6$ alkylene. For example, $L^1$ may be selected from the group consisting of methylene, ethylene, propylene, butylene, and propylene. In some such embodiments, $L^1$ is methylene. In some embodiments $R^c$ is hydrogen. In some embodiments $R^c$ is $C_1$-$C_6$ alkyl. For example, $R^c$ may be selected from the group consisting of methyl, ethyl, n-propyl, isopropyl, n-butyl, sec-butyl, isobutyl, tert-butyl, n-pentyl, branched pentyl, n-hexyl, and branched hexyl. In some such embodiments, $R^1$-$R^3$ and $R^5$-$R^8$ are independently selected from H and alkyl, wherein at least one of $R^1$-$R^2$ and $R^5$-$R^8$ is $C_1$-$C_6$ alkyl. For example, at least one of $R^1$-$R^2$ and $R^5$-$R^8$ may be selected from the group consisting of methyl, ethyl, n-propyl, isopropyl, n-butyl, sec-butyl, isobutyl, tert-butyl, n-pentyl, branched pentyl, n-hexyl, and branched hexyl. In some embodiments, $R^1$-$R^3$ and $R^5$-$R^8$ are independently selected from hydrogen and $C_1$-$C_6$ alkyl, wherein at least one of $R^1$-$R^2$ and $R^5$-$R^8$ is methyl, ethyl, n-propyl, or isopropyl. In some embodiments, $R^1$-$R^2$ and $R^5$-$R^8$ are independently selected from H and $C_1$-$C_6$ alkyl, wherein at least one of $R^1$-$R^3$ and $R^5$-$R^8$ is methyl. Accordingly, in some such embodiments, $R^4$ is -$(L^1)_n$C(=O)OR$^c$, $R^1$ is $C_1$-$C_6$ alkyl, and $R^2$, $R^3$, $R^5$, $R^6$, $R^7$, and $R^8$ are hydrogen. In some embodiments, $R^4$ is -$(L^1)_n$C(=O)OR$^c$, $R^2$ is $C_1$-$C_6$ alkyl, and $R^1$, $R^3$, $R^5$, $R^6$, $R^7$, and $R^8$ are hydrogen. In some embodiments, $R^4$ is -$(L^1)_n$C(=O)OR$^c$, $R^6$ is $C_1$-$C_6$ alkyl, and $R^1$, $R^2$, $R^3$, $R^6$, $R^7$, and $R^8$ are hydrogen. In some embodiments, $R^4$ is -$(L^1)_n$C(=O)OR$^c$, $R^6$ is $C_1$-$C_6$ alkyl, and $R^1$, $R^2$, $R^3$, $R^5$, $R^7$, and $R^8$ are hydrogen. In some embodiments, $R^4$ is -$(L^1)_n$C(=O)OR$^c$, $R^7$ is $C_1$-$C_6$ alkyl, and $R^1$, $R^2$, $R^3$, $R^5$, $R^6$, and $R^8$ are hydrogen. In some embodiments. $R^4$ is -$(L^1)_n$C(=O)OR$^c$, $R^8$ is $C_1$-$C_6$ alkyl, and $R^1$, $R^2$, $R^3$, $R^5$, $R^6$, and $R^7$ are hydrogen.

In some embodiments, $R^4$ in compounds of Formula I, Formula Ia, and/or Formula Ib, and pharmaceutically acceptable salts and isomers thereof, is $C_1$-$C_6$ alkyl. $R^4$ may be, for example, selected from the group consisting of methyl, ethyl, n-propyl, isopropyl, n-butyl, sec-butyl, isobutyl, tert-butyl, n-pentyl, branched pentyl, n-hexyl, and branched hexyl. In some such embodiments, $R^1$-$R^3$ and $R^5$-$R^8$ are independently selected from hydrogen and alkyl, wherein at least one of $R^1$-$R^2$ and $R^5$-$R^8$ is $C_1$-$C_6$ alkyl, as described above.

In some embodiments, $R^4$ in compounds of Formula I, Formula Ia, and/or Formula Ib, and pharmaceutically acceptable salts and isomers thereof, is -$(L^1)_n$N$(R^a)_2$. In some such embodiments, subscript n is 0. In some such embodiments, subscript n is 1. In some embodiments, $L^1$ is $C_1$-$C_6$ alkylene, e.g., methylene, ethylene, propylene, butylene, and propylene, as described above. In some embodiments each $R^8$ is independently selected from the group consisting of hydrogen and $C_1$-$C_6$ alkyl. For example, each $R^a$ may be independently selected from the group consisting of hydrogen, methyl, ethyl, n-propyl, isopropyl, n-butyl, sec-butyl, isobutyl, tert-butyl, n-pentyl, branched pentyl, n-hexyl, and branched hexyl. In some such embodiments, $R^1$-$R^3$ and $R^5$-$R^8$ are independently selected from H and alkyl, wherein at least one of $R^1$-$R^2$ and $R^5$-$R^8$ is $C_1$-$C_6$ alkyl, as described above.

In some embodiments. $R^4$ in compounds of Formula I, Formula Ia, and/or Formula Ib, and pharmaceutically acceptable salts and isomers thereof, is -$(L^1)_n$C(=O)R$^b$. In some such embodiments, subscript n is 0. In some such embodiments, subscript n is 1. In some embodiments. $L^1$ is $C_1$-$C_6$ alkylene, as described above. In some embodiments $R^b$ is hydrogen. In some embodiments $R^b$ is $C_1$-$C_6$ alkyl, as described above. In some such embodiments, $R^1$-$R^3$ and $R^5$-$R^8$ are independently selected from H and alkyl, wherein at least one of $R^1$-$R^2$ and $R^5$-$R^8$ is $C_1$-$C_6$ alkyl, as described above.

In some embodiments, $R^4$ in compounds of Formula I, Formula Ia, and/or Formula Ib, and pharmaceutically acceptable salts and isomers thereof, is -(L$^1$)$_n$C(=O)NR$^d$R$^e$. In some such embodiments, subscript n is 0. In some such embodiments, subscript n is 1. In some embodiments, L$^1$ is C$_1$-C$_6$ alkylene, as described above. In some embodiments, R$^d$ and R$^e$ are independently selected from hydrogen and C$_1$-C$_6$ alkyl, as described above. In some such embodiments, R$^1$-R$^3$ and R$^5$-R$^8$ are independently selected from H and alkyl, wherein at least one of R$^1$-R$^2$ and R$^5$-R$^8$ is C$_1$-C$_6$ alkyl, as described above.

In some embodiments, compounds of Formula I, Formula Ia, and/or Formula Ib, and pharmaceutically acceptable salts and isomers thereof, are provided wherein each R$^9$ is independently selected from the group consisting of C$_1$-C$_8$ alkyl, C$_6$-C$_{14}$ aryl, 5- to 12-membered heteroaryl, -(L$^1$)$_n$S(=O)$_2$R$^a$, and -(L$^1$)$_n$C(=O)R$^b$, wherein each subscript n is independently 0 or 1. In some embodiments, R$^a$ and R$^b$ are independently selected from the group consisting of hydrogen, C$_1$-C$_8$ alkyl, C$_6$-C$_{14}$ aryl, and 5- to 12-membered heteroaryl. In some embodiments, the moieties C$_1$-C$_8$ alkyl, C$_6$-C$_{14}$ aryl, 5- to 12-membered heteroaryl of each R$^9$, R$^a$, and R$^b$ may be optionally substituted with one or more (e.g. 1, 2, 3, 4 or 5) groups independently selected from halo, hydroxy, C$_1$-C$_6$ alkyl, C$_3$-C$_6$ cycloalkyl, 3- to 6-membered heterocycloalkyl, C$_6$-C$_{14}$ aryl, 5- to 12-membered heteroaryl, amino, alkylamino, amido, acyl, nitro, cyano, and alkoxy.

In some embodiments, R$^9$ in compounds of Formula I, Formula Ia, and/or Formula Ib, and pharmaceutically acceptable salts and isomers thereof, is C$_1$-C$_8$ alkyl. R$^9$ may be, for example, selected from the group consisting of methyl, ethyl, n-propyl, isopropyl, n-butyl, sec-butyl, isobutyl, tert-butyl, n-pentyl, branched pentyl, n-hexyl, branched hexyl, n-heptyl, branched heptyl, n-octyl, and branched octyl. In some such embodiments, R$^9$ is selected from the group consisting of methyl, ethyl, and n-propyl, wherein each methyl, ethyl, and n-propyl group is optionally substituted with hydroxy, C$_1$-C$_6$ alkyl, C$_3$-C$_6$ cycloalkyl, 3- to 6-membered heterocycloalkyl, C$_6$-C$_{14}$, aryl, 5- to 12-membered heteroaryl, amino, and alkoxy. In some embodiments, R$^9$ is C$_6$-C$_{14}$ aryl. For example, R$^9$ may be selected from the group consisting of phenyl, naphthyl and biphenyl. In some embodiments, R$^9$ is 5- to 12-membered heteroaryl. For example, R$^9$ may be selected from the group consisting of pyrrole, pyridine, imidazole, pyrazole, triazole, tetrazole, pyrazine, pyrimidine, pyridazine, triazine, thiophene, furan, thiazole, isothiazole, oxazole, isoxazole, indole, quinoline, isoquinoline, benzothiophene, and benzofuran.

In some embodiments. R$^9$ is -(L)$_n$C(=O)R$^b$. In some such embodiments, subscript n is 0. In some such embodiments, subscript n is 1. In some embodiments, L$^1$ is C$_1$-C$_6$ alkylene, as described above. In some embodiments, L$^1$ is methylene. In some embodiments R$^b$ is hydrogen. In some embodiments R$^b$ is C$_1$-C$_8$ alkyl, as described above for R$^9$. In some embodiments R$^b$ is C$_6$-C$_{14}$ aryl, as described above for R$^9$. In some embodiments R$^b$ is 5- to 12-membered heteroaryl, as described above for R$^9$. In some embodiments, R$^b$ is C$_6$-C$_{14}$ aryl or 5- to 12-membered heteroaryl, wherein each C$_6$-C$_{14}$ aryl or 5- to 12-membered heteroaryl group is optionally substituted with one to three groups independently selected from halo, hydroxy, C$_1$-C$_6$ alkyl, amino, alkylamino, amido, acyl, nitro, cyano, and alkoxy.

In some embodiments, compounds of Formula I, Formula Ia, and/or Formula Ib, and pharmaceutically acceptable salts and isomers thereof, are provided wherein each R$^9$ is independently selected from the group consisting of acetyl, phenyl, benzyl, and benzoyl. In some embodiments, each R$^9$ is independently selected from the group consisting of acetyl, phenyl, benzyl, and benzoyl, wherein each R$^9$ are different.

In some embodiments, compounds of Formula I, Formula Ia, and/or Formula Ib, and pharmaceutically acceptable salts and isomers thereof, are provided w % herein:

R$^1$, R$^2$, R$^5$, R$^6$, R$^7$, and R$^8$ are independently selected from the group consisting of hydrogen, C$_1$-C$_6$ alkyl, C$_2$-C$_6$ alkenyl, C$_2$-C$_6$ alkynyl, 2- to 6-membered heteroalkyl, C$_3$-C$_6$ cycloalkyl, 3- to 6-membered heterocycloalkyl, C$_6$-C$_{14}$ aryl, 5- to 6-membered heteroaryl, hydroxyl, -(L$^1$)$_n$N(R$^a$)$_2$, -(L$^1$)$_n$C(=O)R$^b$, (L$^1$)$_n$C(=O)OR$^c$, and -(L$^1$)$_n$C(=O)NR$^d$R$^e$, wherein each subscript n is independently 0 or 1;

at least one of R$^1$, R$^2$, R$^5$, R$^6$, R$^7$, and R$^8$ is other than hydrogen;

R$^3$ is hydrogen;

R$^4$ is selected from the group consisting of C$_1$-C$_6$ alkyl, -(L$^1$)$_n$N(R$^a$), -(L$^1$)$_n$C(=O)R$^b$, -(L$^1$)$_n$C(=O)OR$^c$, and -(L$^1$)$_n$C(=O)NR$^d$R$^e$, wherein each subscript n is independently 0 or 1;

each R$^9$ is independently selected from the group consisting of acetyl, phenyl, benzyl, and benzoyl; and each L$^1$ is C$_1$-C$_6$ alkylene.

In some embodiments, compounds of Formula I, Formula Ia, and/or Formula Ib, and pharmaceutically acceptable salts and isomers thereof, are provided wherein R$^1$, R$^2$, R$^5$, R$^6$, R$^7$, and R$^8$ are independently selected from the group consisting of hydrogen, C$_1$-C$_6$ alkyl, C$_2$-C$_6$ alkenyl, C$_2$-C$_6$ alkynyl, 2- to 6-membered heteroalkyl, -(L$^1$)$_n$N(R$^a$)$_2$, -(L$^1$)$_n$C(=O)R$^b$, -(L)$_n$C(=O)OR$^c$, and -(L$^1$)$_n$C(=O)NR$^d$R$^e$, wherein each subscript n is independently 0 or 1, as described above; at least one of R$^1$, R$^2$, R$^5$, R$^6$, R$^7$, and R$^8$ is other than hydrogen, as described above; R$^3$ is hydrogen; R$^4$ is selected from the group consisting of C$_1$-C$_6$ alkyl, -(L$^1$)$_n$N(R$^a$)$_2$, -(L$^1$)$_n$C(=O)R$^b$, -(L$^1$)$_n$C(=O)OR$^c$, and -(L$^1$)$_n$C(=O)NR$^d$R$^e$, wherein each subscript n is independently 0 or 1, as described above; each R$^9$ is independently selected from the group consisting of acetyl, phenyl, benzyl, and benzoyl, as described above; and each L$^1$ is C$_1$-C$_6$ alkylene, as described above.

In some embodiments, compounds of Formula I, Formula Ia, and/or Formula Ib, and pharmaceutically acceptable salts and isomers thereof, are provided wherein R$^1$, R$^2$, R$^5$, R$^6$, R$^7$, and R$^8$ are independently selected from the group consisting of hydrogen and C$_1$-C$_6$ alkyl; at least one of R$^1$, R$^2$, R$^5$, R$^6$, R$^7$, and R$^8$ is other than hydrogen, as described above; R$^3$ is hydrogen; R$^4$ is selected from the group consisting of C$_1$-C$_6$ alkyl, -(L$^1$)$_n$N(R$^a$)$_2$, -(L$^1$)$_n$C(=O)R$^b$, -(L$^1$)$_n$C(=O)OR$^c$, and -(L$^1$)$_n$C(=O)NR$^d$R$^e$, wherein each subscript n is independently 0 or 1, as described above; each R$^9$ is independently selected from the group consisting of acetyl, phenyl, benzyl, and benzoyl, as described above; and each L$^1$ is C$_1$-C$_6$ alkylene, as described above.

In some embodiments, the invention provides compounds of Formula I, Formula Ia, and/or Formula Ib, and pharmaceutically acceptable salts and isomers thereof, wherein the compound is:

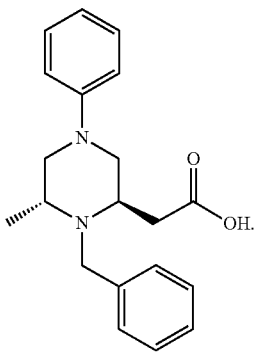 [SMILES: C[C@@H]1CN(c2ccccc2)C[C@@H](CC(=O)O)N1Cc1ccccc1]

In some embodiments, the invention provides a compound, and pharmaceutically acceptable salts and isomers thereof, having a structure according to Formula II:

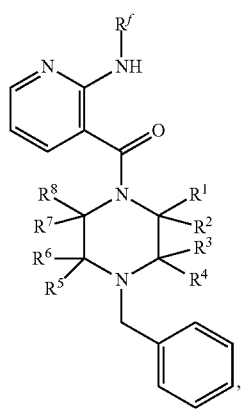

(II)

wherein:
$R^1$, $R^2$, $R^3$, $R^4$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;
at least one of $R^1$, $R^2$, $R^3$, $R^4$, $R^5$, $R^6$, $R^7$, and $R^8$ is other than hydrogen;
each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl;
each $L^1$ is independently selected from the group consisting of $C_1$-$C_{12}$ alkylene and 2- to 12-membered heteroalkylene; and
$R^{10}$ is $C_1$-$C_{12}$ alkyl.

In some embodiments, the invention provides a compound, and pharmaceutically acceptable salts thereof, having a structure according to Formula IIb:

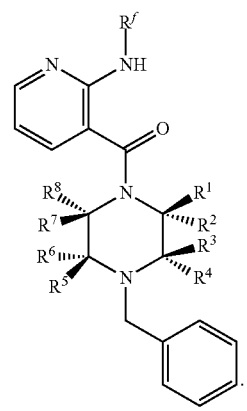

(IIb)

In some embodiments, the invention provides a compound, and pharmaceutically acceptable salts thereof, having a structure according to Formula IIc:

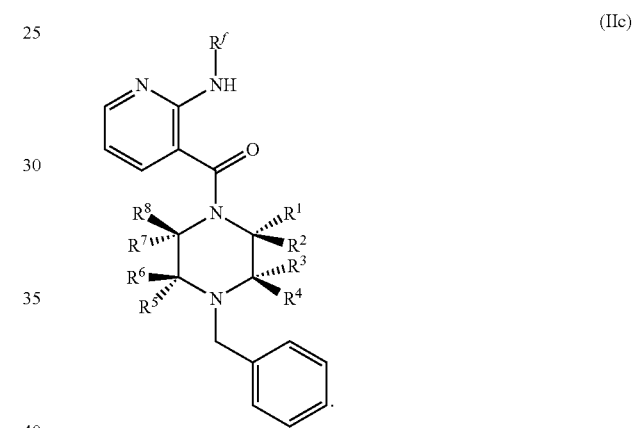

(IIc)

In some embodiments, the invention provides compounds of Formula II, Formula IIa, Formula IIb, and/or Formula IIc, and pharmaceutically acceptable salts and isomers thereof, wherein:
$R^1$, $R^2$, $R^3$, $R^4$, $R^5$, $R^6$, $R^7$, and $R^8$ are independently selected from the group consisting of hydrogen, halogen, $C_1$-$C_6$ alkyl, $C_2$-$C_6$ alkenyl, $C_2$-$C_6$ alkynyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;
at least one of $R^1$, $R^2$, $R^3$, $R^4$, $R^5$, $R^6$, $R^7$, and $R^8$ is other than hydrogen;
each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl;
each $L^1$ is $C_1$-$C_6$ alkylene; and
$R^{10}$ is $C_1$-$C_8$ alkyl.

In some embodiments, $R^{10}$ in compounds of Formula II, Formula IIa, Formula IIb, and/or Formula IIc, and pharmaceutically acceptable salts and isomers thereof, is selected from the group consisting of methyl, ethyl, n-propyl, isopropyl, n-butyl, sec-butyl, isobutyl tert-butyl, n-pentyl, branched pentyl, n-hexyl, branched hexyl, n-heptyl, branched heptyl, n-octyl, and branched octyl. In some embodiments, $R^{10}$ is $C_1$-$C_8$ alkyl, as described above, which may be optionally substituted with one or more (e.g, 1, 2, 3, 4 or 5) groups selected from halo, hydroxy, $C_1$-$C_6$ alkyl, $C_6$-$C_{14}$ aryl, 5- to 6-membered heteroaryl, amino, alkylamino, amido, acyl, nitro, cyano, and alkoxy.

In some embodiments, the invention provides compounds of Formula II, Formula IIa, Formula IIb, and/or Formula IIc, and pharmaceutically acceptable salts and isomers thereof, wherein $R^1$ is $C_1$-$C_6$ alkyl, and $R^2$, $R^3$, $R^4$, $R^5$, $R^6$, $R^7$, and $R^8$ are hydrogen. In some embodiments, the invention provides compounds of Formula II, Formula IIa, Formula IIb, and/or Formula IIc, and pharmaceutically acceptable salts and isomers thereof, wherein $R^2$ is $C_1$-$C_6$ alkyl, and $R^1$, $R^3$, $R^4$, $R^5$, $R^6$, $R^7$, and $R^8$ are hydrogen. In some embodiments, the invention provides compounds of Formula II, Formula IIa, Formula IIb, and/or Formula IIc, and pharmaceutically acceptable salts and isomers thereof, wherein $R^3$ is $C_1$-$C_6$ alkyl, and $R^1$, $R^2$, $R^4$, $R^5$, $R^6$, $R^7$, and $R^8$ are hydrogen. In some embodiments, the invention provides compounds of Formula II, Formula IIa, Formula IIb, and/or Formula IIc, and pharmaceutically acceptable salts and isomers thereof, wherein $R^4$ is $C_1$-$C_6$ alkyl, and $R^1$, $R^2$, $R^3$, $R^5$, $R^6$, $R^7$, and $R^8$ are hydrogen. In some embodiments, the invention provides compounds of Formula II, Formula IIa, Formula IIb, and/or Formula IIc, and pharmaceutically acceptable salts and isomers thereof, wherein $R^6$ is $C_1$-$C_6$ alkyl, and $R^1$, $R^2$, $R^3$, $R^4$, $R^6$, $R^7$, and $R^8$ are hydrogen. In some embodiments, the invention provides compounds of Formula II, Formula IIa, Formula IIb, and/or Formula IIc, and pharmaceutically acceptable salts and isomers thereof, wherein $R^6$ is $C_1$-$C_6$ alkyl, and $R^1$, $R^2$, $R^3$, $R^4$, $R^5$, $R^6$, and $R^8$ are hydrogen. In some embodiments, the invention provides compounds of Formula II, Formula IIa, Formula IIb, and/or Formula IIc, and pharmaceutically acceptable salts and isomers thereof, wherein $R^7$ is $C_1$-$C_6$ alkyl, and $R^1$, $R^2$, $R^3$, $R^4$, $R^5$, $R^6$, and $R^8$ are hydrogen. In some embodiments, the invention provides compounds of Formula II, Formula IIa, Formula IIb, and/or Formula IIc, and pharmaceutically acceptable salts and isomers thereof, wherein $R^8$ is $C_1$-$C_6$ alkyl, and $R^1$, $R^2$, $R^3$, $R^4$, $R^5$, $R^6$, and $R^7$ are hydrogen.

In some embodiments, the invention provides compounds of Formula II, Formula IIa, Formula IIb, and/or Formula IIc, and pharmaceutically acceptable salts and isomers thereof, wherein the compound is selected from the group consisting of:

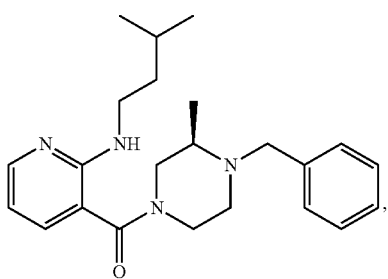

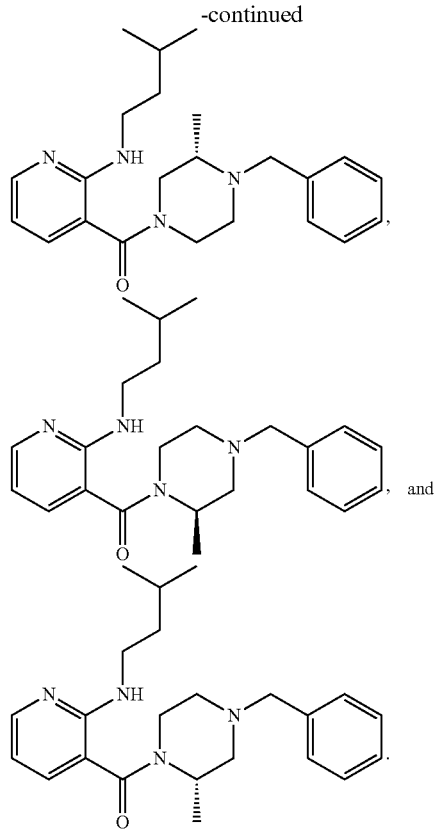

In general, the term "substituted," whether preceded by the term "optionally" or not, means that one or more hydrogens of the designated moieties are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents are generally those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein. In general, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group.

Examples of suitable monovalent substituents on a substitutable carbon atom of an "optionally substituted" group are independently halogen; —$(CH_2)_{0-4}R^\alpha$; —$(CH_2)_{0-4}OR^\alpha$; —$O(CH_2)_{0-4}R^\alpha$, —$O$—$(CH_2)_{0-4}C(O)OR^\alpha$; —$(CH_2)_{0-4}CH(OR^\alpha)_2$; —$(CH_2)_{0-4}SR^\alpha$; —$(CH_2)_{0-4}Ph$, wherein Ph is phenyl which may be substituted with $R^\alpha$; —$(CH_2)_{0-4}O(CH_2)_{0-1}$phenyl, which phenyl may be substituted with $R^\alpha$; —CH=CHPh, wherein Ph is phenyl which may be substituted with $R^\alpha$; —$(CH_2)_{0-4}O(CH_2)_{0-1}$-Py, wherein Py is pyridyl which may be substituted with $R^\alpha$; —$NO_2$; —CN;

—$N_3$; —$(CH_2)_{0-4}N(R^\alpha)_2$; —$(CH_2)_{0-4}N(R^\alpha)C(O)R^\alpha$; —$N(R^\alpha)C(S)R^\alpha$; —$(CH_2)_{0-4}N(R^\alpha)C(O)NR^\alpha_2$; —$N(R^\alpha)C(S)NR^\alpha_2$; —$(CH_2)_{0-4}N(R^\alpha)C(O)OR^\alpha$; —$N(R^\alpha)_nN(R^\alpha)C(O)R^\alpha$; —$N(R^\alpha)_nN(R^\alpha)C(O)NR^\alpha_2$; —$N(R^\alpha)_nN(R^\alpha)C(O)OR^\alpha$; —$(CH_2)_{0-4}C(O)R^\alpha$; —$C(S)R^\alpha$; —$(CH_2)_{0-4}C(O)OR^\alpha$; —$(CH_2)_{0-4}C(O)SR^\alpha$; —$(CH_2)_{0-4}C(O)OSiR^\alpha_3$; —$(CH_2)_{0-4}OC(O)R^\alpha$; —$OC(O)(CH_2)_{0-4}SR$—$SC(S)SR^\alpha$; —$(CH_2)_{0-4}SC(O)R^\alpha$; —$(CH_2)_{0-4}C(O)NR^\alpha_2$; —$C(S)NR^\alpha_2$, —$C(S)SR^\alpha$; —$SC(S)SR^\alpha$, —$(CH_2)_{0-4}OC(O)NR^\alpha_2$, —$C(O)N(OR^\alpha)R^\alpha$; —$C(O)C(O)R^\alpha$; —$C(O)CH_2C(O)R^\alpha$; —$C(NOR^\alpha)R^\alpha$; —$(CH_2)_{0-4}SSR^\alpha$; —$(CH_2)_{0-4}S(O)_2R^\alpha$; —$(CH_2)_{0-4}S(O)_2OR^\alpha$; —$(CH_2)_{0-4}OS(O)_2R^\alpha$; —$S(O)_2NR^\alpha_2$; —$(CH_2)_{0-4}S(O)R^\alpha$; —$N(R^\alpha)S(O)_2NR^\alpha_2$; —$N(R^\alpha)S(O)_2R^\alpha$; —$N(OR^\alpha)R^\alpha$; —$C(NH)NR^\alpha_2$; —$P(O)_2R^\alpha$; —$P(O)R^\alpha_2$; —$OP(O)R^\alpha_2$; —$OP(O)(OR^\alpha)_2$; —$SiR^\alpha_3$; —($C_{1-4}$ straight or branched)alkylene)-O—$N(R^\alpha)_2$; or —($C_{1-4}$ straight or branched)alkylene)C(O)O—$N(R^\alpha)_2$. Each $R^\alpha$ is independently hydrogen; $C_{1-8}$ alkyl; —$CH_2Ph$, —$O(CH_2)_{0-1}Ph$; —$CH_2$-(5- to 6-membered heteroaryl); $C_{3-8}$ cycloalkyl; $C_{6-10}$ aryl; 4- to 10-membered heterocyclyl; or 6- to 10-membered heteroaryl; and each $R^\alpha$ may be further substituted as described below.

Examples of suitable monovalent substituents on $R^\alpha$ are independently halogen, —$(CH_2)_{0-2}R^\beta$; —$(CH_2)_{0-2}OH$; —$(CH_2)_{0-2}OR^\beta$; —$(CH_2)_{0-2}CH(OR^\beta)_2$; —$CN$; —$N_3$; —$(CH_2)_{0-2}C(O)R^\beta$; —$(CH_2)_{0-2}C(O)OH$; —$(CH_2)_{0-2}C(O)OR^\beta$; —$(CH_2)_{0-2}SR^\beta$; —$(CH_2)_{0-2}SH$; —$(CH_2)_{0-2}NH_2$; —$(CH_2)_{0-2}NHR^\beta$; —$(CH_2)_{0-2}NR^\beta_2$; —$NO_2$; $SiR^\beta_3$; —$OSiROR^\beta_3$; —$C(O)SR^\beta_3$; —($C_{1-4}$ straight or branched alkylene)C(O)OR$^\beta$; or —$SSR^\beta$; wherein each $R^\beta$ is independently selected from $C_{1-4}$ alkyl; —$CH_2Ph$; —$O(CH_2)_{0-1}Ph$; $C_{3-8}$ cycloalkyl; $C_{6-10}$ aryl; 4- to 10-membered heterocyclyl; or 6- to 10-membered heteroaryl. Suitable divalent substituents on a saturated carbon atom of $R^\alpha$ include =O and =S.

Examples of suitable divalent substituents on a saturated carbon atom of an "optionally substituted" group include the following: =O; =S; =$NNR^\gamma_2$; =$NNHC(O)R^\gamma$; =$NNHC(O)OR^\gamma$; =$NNHS(O)_2R^\gamma$; =$NR^\gamma$; =$NOR^\gamma$; —$O(C(R^\beta_2))_{2-3}O$—; or —$S(C(R^\gamma_2))_{2-3}S$—; wherein each independent occurrence of $R^\gamma$ is selected from hydrogen; $C_{1-8}$ alkyl, which may be substituted as defined below; $C_{3-8}$ cycloalkyl; $C_{6-10}$ aryl; 4- to 10-membered heterocyclyl; or 6- to 10-membered heteroaryl. Suitable divalent substituents that are bound to vicinal substitutable carbons of an "optionally substituted" group include: —$O(CR^\beta)_{2-3}O$—; wherein each independent occurrence of $R^\beta$ is selected from hydrogen; $C_{1-8}$ alkyl which may be substituted as defined below; $C_{3-8}$ cycloalkyl; $C_{6-10}$ aryl; 4- to 10-membered heterocyclyl; or 6- to 10-membered heteroaryl.

Examples of suitable substituents on the alkyl group of $R^\gamma$ include halogen: —$R^\delta$; |—$OH$; —$OR^\delta$; —$CN$; —$C(O)OH$; —$C(O)OR^\delta$; —$NH_2$; —$NHR^\delta$; —$NR^\delta_2$; or —$NO_2$; wherein each $R^\delta$ is independently $C_{1-4}$ alkyl; —$CH_2Ph$; —$O(CH_2)_{0-1}Ph$; 4- to 10-membered heterocyclyl; or 6- to 10-membered heteroaryl.

Examples of suitable substituents on a substitutable nitrogen of an "optionally substituted" group include —$R^\varepsilon$; —$NR^\varepsilon_2$; —$C(O)R^\varepsilon$; —$C(O)OR^\varepsilon$; —$C(O)C(O)R^\varepsilon$; —$C(O)CH_2C(O)R^\varepsilon$; —$S(O)_2R^\varepsilon$; —$S(O)_2NR^\varepsilon_2$; —$C(S)NR^\varepsilon_2$; —$C(NH)NR^\varepsilon_2$; or —$N(R^\varepsilon)S(O)_2R^\varepsilon$; wherein each $R^\varepsilon$ is independently hydrogen; $C_{1-8}$ alkyl which may be substituted as defined below; $C_{3-8}$ cycloalkyl; $C_{6-10}$ aryl: 4- to 10-membered heterocyclyl; or 6- to 10-membered heteroaryl.

Examples of suitable substituents on the alkyl group of $R^c$ are independently halogen; —$R^\delta$; —$OH$: —$OR^\delta$: —$CN$; —$C(O)OH$: —$C(O)OR^\delta$: —$NH_2$; —$NHR^\delta$: —$NR^\alpha_2$; or —$NO_2$; wherein each $R^\delta$ is independently $C_{1-4}$ alkyl; —$CH_2Ph$; —$O(CH_2)_{0-1}Ph$; $C_{6-10}$ aryl; 4- to 10-membered heterocyclyl; or 6- to 10-membered heteroaryl.

"Tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special case of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic acid tautomerism in heterocyclic rings), enamine and enamine and anomers of reducing sugars.

"Stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection or their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which thy rotate polarized light and how they interact with different optical isomers of other compounds. Diastereomers and stereoisomers not related through a reflection operation, they are not mirror images of each other. These include meso compounds, cis- and trans- (E- and Z-)isomers, and non-enantiomeric optical isomers. Diastereomers seldom have the same physical properties. In terms of the present disclosure, stereoisomers may refer to enantiomers, diastereomers or both. Stereoisomers are often obtained in partially purified form. For the compounds of this invention that possess stereoisomers, such partially purified forms include those having 60%, 70%, 80%, 90% or 95% of one dominant stereoisomer.

"Positional isomers" or "constitutional isomers" refers to different compounds which have the same numbers of, and types of, of atoms, and hence the same molecular weight, but the atoms are connected differently.

As used herein, the term "stereochemically pure" as used herein with reference to a compound, means the compound or a composition thereof comprises predominantly one stereoisomer of the compound and is substantially free of other stereoisomer(s) of that compound. For example, a stereochemically pure composition of a compound having one chiral center will be substantially free of the opposite enantiomer of the compound. A stereochemically pure composition of a compound having two or more chiral centers will be substantially free of other diastereomers of the compound. A typical stereochemically pure compound comprises about 80% by weight or greater of one stereoisomer of the compound and about 20% by weight or less of other stereoisomer(s) of the compound. For example, in various embodiments, a stereochemically pure compound comprises 90% by weight or greater of one stereoisomer of the compound and about 10% by weight or less of the other stereoisomer(s) of the compound; about 95% by weight or greater of one stereoisomer of the compound and about 5% by weight or less of the other stereoisomer(s) of the compound; about 97% by weight or greater of one stereoisomer of the compound and about 3% by weight or less of the other stereoisomer(s) of the compound; about 98% by weight or greater of one stereoisomer of the compound and about 2% by weight or less of the other stereoisomer(s) of the compound, and about 99% by weight or greater of one stereoisomer of the compound and about 1% by weight or less of the other stereoisomer(s) of the compound.

Compounds according to the present disclosure may be prepared as described in more detail below.

The compounds described herein are TLX modulators. The term "$IC_{50}$" indicates how much of a compound is needed to induce a given biological response of the nuclear receptor TLX (e.g., influence the expression of gene(s) involved in neurogenesis, neurological disorders, metabolic disorders, and/or cancers) or component of a response (e.g., an enzyme, cell, cell receptor, or microorganism) by one half (50%). The $IC_{50}$ value for a particular test compound can be according to assays and related methods known in the art. The $IC_{50}$ of a compound can then be determined by constructing a dose-response curve and examining the effect of different concentrations of the compound on the activity of TLX. From the dose-response curve, $IC_{50}$ values can be calculated for a given compound by determining the concentration needed to induce half of the maximum biological response of TLX.

In some embodiments, the TLX $IC_{50}$ values for compounds disclosed herein range from about 0.01 nM to about 100 µM. The TLX $IC_{50}$ value for a particular compound can range, for example, from about 0.01 nM to about 0.1 nM, or from about 0.1 nM to about 1 nM, or from about 1 nM to about 100 nM, or from about 100 nM to about 250 nM, or from about 250 nM to about 500 nM, or from about 500 nM to about 750 nM, or from about 750 nM to about 1 µM, or from about 1 µM to about 10 µM, or from about 10 µM to about 25 µM, or from about 25 µM to about 50 µM, or from about 50 µM to about 75 µM, or from about 75 µM to about 100 µM. The TLX $IC_{50}$ value for a particular compound can range from about 0.01 nM to about 1 nM, or from about 0.05 nM to about 0.75 nM, or from about 0.1 nM to about 0.5 nM, from about 1 nM to about 100 nM, or from about 20 nM to about 80 nM, or from about 40 nM to about 60 nM, or from about 1 µM to about 100 µM, or from about 20 µM to about 80 µM, or from about 40 µM to about 60 µM.

III. PHARMACEUTICAL COMPOSITIONS AND ADMINISTRATION OF TLX MODULATORS

In related embodiments, the invention provides a pharmaceutical composition comprising a compound of Formula I, Formula Ia, Formula Ib, Formula II, Formula IIa, Formula IIb, or Formula IIc, or a pharmaceutically acceptable salt or isomer thereof, and a pharmaceutically acceptable excipient. The pharmaceutical compositions can be prepared by any of the methods well known in the art of pharmacy and drug delivery. In general, methods of preparing the compositions include the step of bringing the active ingredient (i.e., a compound of Formula I, Formula Ia, Formula Ib, Formula II, Formula IIa, Formula IIb, or Formula IIc, or a pharmaceutically acceptable salt or isomer thereof) into association with a carrier containing one or more accessory ingredients. The pharmaceutical compositions are typically prepared by uniformly and intimately bringing the active ingredient into association with a liquid carrier or a finely divided solid carrier or both, and then, if necessary, shaping the product into the desired formulation. The compositions can be conveniently prepared and/or packaged in unit dosage form.

Pharmaceutical compositions containing compounds of the invention can be formulated for oral use. Suitable compositions for oral administration include, but are not limited to, tablets, troches, lozenges, aqueous or oily suspensions, dispersible powders or granules, emulsions, hard or soft capsules, syrups, elixirs, solutions, buccal patches, oral gels, chewing gums, chewable tablets, effervescent powders, and effervescent tablets. Compositions for oral administration can be formulated according to any method known to those of skill in the art. Such compositions can contain one or more agents selected from sweetening agents, flavoring agents, coloring agents, antioxidants, and preserving agents in order to provide pharmaceutically elegant and palatable preparations.

Tablets generally contain the active ingredient in admixture with non-toxic pharmaceutically acceptable excipients, including; inert diluents, such as cellulose, silicon dioxide, aluminum oxide, calcium carbonate, sodium carbonate, glucose, mannitol, sorbitol, lactose, calcium phosphate, and sodium phosphate: granulating and disintegrating agents, such as com starch and alginic acid; binding agents, such as polyvinylpyrrolidone (PVP), cellulose, polyethylene glycol (PEG), starch, gelatin, and acacia; and lubricating agents such as magnesium stearate, stearic acid, and talc. The tablets can be uncoated or coated, enterically or otherwise, by known techniques to delay disintegration and absorption in the gastrointestinal tract and thereby provide a sustained action over a longer period. For example, a time delay material such as glyceryl monostearate or glyceryl distearate can be employed. Tablets can also be coated with a semi-permeable membrane and optional polymeric osmogents according to known techniques to form osmotic pump compositions for controlled release.

Compositions for oral administration can be formulated as hard gelatin capsules w % herein the active ingredient is mixed with an inert solid diluent (such as calcium carbonate, calcium phosphate, or kaolin), or as soft gelatin capsules wherein the active ingredient is mixed with water or an oil medium (such as peanut oil, liquid paraffin, or olive oil).

TLX modulators (i.e., compounds of Formula I, Formula Ia, Formula Ib, Formula Formula II, Formula IIa, Formula IIb, or Formula IIc, or a pharmaceutically acceptable salt or isomer thereof) can also be administered topically as a solution, ointment, cream, gel, or suspension, as well as in mouth washes, eye-drops, and the like. Still further, transdermal delivery of TLX modulators can be accomplished by means of iontophoretic patches and the like.

Pharmaceutical compositions containing TLX modulators can also be in the form of a sterile injectable aqueous or oleaginous solutions and suspensions. Sterile injectable preparations can be formulated using non-toxic parenterally-acceptable vehicles including water, Ringer's solution, and isotonic sodium chloride solution, and acceptable solvents such as 1,3-butane diol. In addition, sterile, fixed oils can be used as a solvent or suspending medium. For this purpose any bland fixed oil can be employed including synthetic monoglycerides, diglycerides, or triglycerides.

In some embodiments, an TLX modulator can be formulated with a polymer such as Pluronic F127 and delivered subcutaneously. Pluronic is a hydrogel that solidifies at body temperature and can provide extended drug delivery over periods of time lasting from days to weeks.

Aqueous suspensions can contain one or more TLX modulators in admixture with excipients including, but not limited to: suspending agents such as sodium carboxymethylcellulose, methylcellulose, oleagino-propylmethylcellulose, sodium alginate, polyvinyl-pyrrolidone, gum tragacanth and gum acacia; dispersing or wetting agents such as lecithin, polyoxyethylene stearate, and polyethylene sorbitan monooleate; and preservatives such as ethyl, n-propyl, and p-hydroxybenzoate. Dispersible powders and granules (suitable for preparation of an aqueous suspension by the addition of water) can contain one or more TLX modulators in admixture with a dispersing agent, wetting agent, suspending agent, or combinations thereof. Oily suspensions can be formulated by suspending an TLX modulator in a vegetable oil (e.g. arachis oil, olive oil, sesame oil or coconut oil), or in a mineral oil (e.g., liquid paraffin). Oily suspensions can contain one or more thickening agents, for example beeswax, hard paraffin, or cetyl alcohol. These compositions can be preserved by the addition of an antioxidant such as ascorbic acid.

The pharmaceutical compositions of the invention can also be in the form of oil-in-water emulsions. The oily phase can be a vegetable oil, for example olive oil or arachis oil, or a mineral oil, for example liquid paraffin or mixtures of these. Suitable emulsifying agents can be naturally-occurring gums, such as gum acacia or gum tragacanth; naturally-occurring phospholipids, such as soy lecithin; esters or partial esters derived from fatty acids and hexitol anhydrides, such as sorbitan monooleate; and condensation products of said partial esters with ethylene oxide, such as polyoxyethylene sorbitan monooleate.

The use of hybrid molecules to promote active transport or nanoparticles can be used in certain embodiments to increase blood brain barrier transport. For example liposomes, proteins, engineered peptide compounds or antibodies that bind to the receptors that transport proteins across the blood brain barrier including LPR-1 receptor, transferrin receptor, EGF-like growth factor or glutathione transporter can be used to increase penetration into the brain. Physical techniques including osmotic opening, ultrasound, lasers, sphenopalantine ganglion stimulation, direct intracranial, intrathecal, or intraventricular delivery via a pump can be used.

Pharmaceutical compositions according to the invention can also include one or more additional active agents useful in the treatment of disease or conditions associated with nuclear receptor TLX. In some embodiments, the invention provides a pharmaceutical composition comprising one or more TLX modulators as described herein in combination with one or more additional active agents for treatment of a neurological disorder, a metabolic disorder, and/or cancer. In some embodiments, the invention provides a pharmaceutical composition comprising one or more TLX modulators as described herein in combination with one or more additional active agents for treatment of major depressive disorder, depression, schizophrenia, Alzheimer's disease, Parkinson's disease, multiple sclerosis, and/or cognitive impairment. In some embodiments, the invention provides a pharmaceutical composition comprising one or more TLX modulators as described herein in combination with one or more additional active agents for treatment of Alzheimer's disease. Several therapeutics are in development and in clinical use for treatment of Alzheimer's disease. Therapeutic strategies include lowering circulating levels of β-amyloid and tau (as described in more detail below), stabilizing microtubules, removing atherosclerotic plaques, modulating autophagy, modulating neurotransmitter levels, and inhibiting GABA (A) α5 receptors. Such therapeutics can maintain and/or restore cognitive function in subjects with Alzheimer's disease; slow the decline of cognitive function; and promote neuroplasticity and recovery of the brain.

Active agents that can be combined with TLX modulators in pharmaceutical compositions include, but are not limited to, cholinesterase inhibitors, alpha-7 nicotinic receptor modulators, serotonin modulators, NMDA modulators, Aβ-targeted therapies, ApoE-targeted therapies, microglia-targeted therapies, blood/brain barrier-targeted therapies, tau-targeted therapies, and anti-inflammatories.

Examples of suitable cholinesterase inhibitors include, but are not limited to, donepezil, donepezil/memantine, galantamine, rivastigmine, and tacrine, as well as pharmaceutically acceptable salts thereof. Examples of suitable serotonin modulators include, but are not limited to, idalopirdine, RVT-101, citalopram, escitalopram, fluoxetine, fluvoxamine, paroxetine, and sertraline, as well as pharmaceutically acceptable salts thereof. Examples of suitable alpha-7 nicotinic receptor modulators include, but are not limited to, alpha-7 agonists such as encenicline and APN1 125. Suitable NMDA modulators include, but are not limited to, NMDA receptor antagonists such as memantine and derivatives thereof.

Pharmaceutical compositions of the invention can also contain active agents that are directed to biomolecular targets associated with neurological disorders. Such targets include beta amyloid peptides (also referred to as beta amyloid, abeta, or Aβ), apolipoprotein E (also referred to as ApoE), and microtubule-associated tau (also referred to as tau proteins, or simply as tau).

Aβ-targeted therapies include inhibitors of Aβ production (such as beta-secretase inhibitors, gamma-secretase inhibitors, alpha-secretase activators), inhibitors of Aβ aggregation, inhibitors of AP oligomerization, and up-regulators of Aβ clearance, among others (see, e.g., Jia, et al. *BioMed Research International,* 2014. Article ID 837157, doi: 10.1155/2014/837157). Examples of Aβ-targeted therapies include but are not limited to, antibodies, pioglitazone, begacestat, atorvastatin, simvastatin, etazolate, and tramiprosate, as well as pharmaceutically acceptable salts thereof.

Examples of ApoE-targeted therapies include, but are not limited to retinoid X receptor agonists (see, Cramer, et al., *Science* 2012. 335(6075): 1503-1506) and others described by Liu et al. (*Nat Rev Neurol.* 2013. 9(2): 106-118). Tau-targeted therapies include, but are not limited to, methylthioninium, leuco-methylthioninium, antibodies and those described by Lee, et al. (*Cold Spring Harb Perspect Med* 2011; 1:a006437).

Examples of suitable anti-inflammatories include, but are not limited to, NSAIDs such as apazone, diclofenac, ibuprofen, indomethacin, ketoprofen, nabumetone, naproxen, piroxicam, and sulindac, as well as pharmaceutically acceptable salts thereof.

IV. METHODS FOR MODULATING TLX AND TREATING CONDITIONS ASSOCIATED WITH NUCLEAR RECEPTOR TLX

In another embodiment, methods of modulating nuclear receptor TLX are provided. The methods include contacting the nuclear receptor TLX with an effective amount of a TLX modulator (i.e., a compound, or a pharmaceutically acceptable salt or isomer thereof, or a therapeutically effective amount of a composition thereof as described herein). In some embodiments, the TLX modulator is a TLX agonist.

Modulating nuclear receptor TLX generally includes contacting TLX with an amount of the compound sufficient to alter the activity of TLX as compared to the TLX activity in the absence of the compound. In some embodiments, nuclear receptor TLX modulation comprises contacting TLX with an amount of a TLX agonist sufficient to increase the activity of TLX (e.g., enhanced TLX activity) as compared to the TLX activity in the absence of the TLX agonist.

In some embodiments, contacting the nuclear receptor TLX with the TLX modulator can result in from about 1% to about 100% TLX modulation (i.e., the activity is enhanced by 1% to 100% compared to the activity in the absence of the TLX modulator or TLX agonist). In some embodiments, contacting the nuclear receptor TLX with the TLX agonist increases the TLX activity by at least 1.1-fold compared to the activity in the absence of the TLX agonist. In other words, contacting the nuclear receptor TLX with a TLX agonist (i.e., compounds of Formula I, Formula Ia, Formula Ib. Formula II, Formula IIa. Formula IIb, or Formula IIc, or a pharmaceutically acceptable salt or isomer thereof, or a composition thereof) increases the TLX activity of the nuclear receptor TLX by at least 1.1-fold compared to the TLX activity in the absence of the TLX agonist. In some embodiments, the TLX agonist increases the TLX activity by at least 1.2-fold, 1.3-fold. 1.4-fold, 1.5-fold, 1.6-fold, 1.7-fold, 1.8-fold, 1.9-fold, 2-fold, 2.5-fold, 5-fold, 10-fold, 15-fold, 20-fold, 25-fold, 30-fold, 40-fold, 50-fold, 60-fold, 70-fold, 80-fold, 90-fold, 100-fold, 250-fold, 500-fold, 1000-fold, or more, compared to the TLX activity in the absence of the TLX agonist.

The present invention further provides methods for promoting neurogenesis. The method comprises contacting a neuron or neuronal cell with a TLX modulator (i.e., a compound, or a pharmaceutically acceptable salt or isomer thereof, or a composition thereof as described herein) in an amount sufficient to promote neurogenesis. In some embodiments, the amount of compound, or a pharmaceutically acceptable salt or isomer thereof, or a composition thereof as described herein, sufficient to promote neurogenesis results in the increase of neural stem and progenitor cell proliferation by at least 1.1-fold compared to the absence of the compound. In other words, contacting a neuron or neuronal cell with a compound, or a pharmaceutically acceptable salt or isomer thereof, or a composition thereof, in an amount sufficient to promote neurogenesis increases neural stem and progenitor cell proliferation by at least 1.1-fold compared to the absence of the compound. In some embodiments, a neuron or neuronal cell is contacted with a compound, or a pharmaceutically acceptable salt or isomer thereof, or a composition thereof, in an amount sufficient to increase neural stem and progenitor cell proliferation by at least 1.2-fold, 1.3-fold, 1.4-fold, 1.5-fold, 1.6-fold, 1.7-fold. 1.8-fold, 1.9-fold, 2-fold, 2.5-fold, 5-fold, 10-fold. 15-fold, 20-fold, 25-fold, 30-fold, 40-fold, 50-fold, 60-fold. 70-fold, 80-fold, 90-fold, 100-fold. 250-fold, 500-fold, 1000-fold, or more, compared to the absence of the compound.

As mentioned above, the promotion of neurogenesis (e.g., regeneration of neural cells, proliferation of neural stem and progenitor cells, differentiation of these cells into new neural cell types, as well as migration and survival of the new cells) can in turn treat a disease or condition associated with nuclear receptor TLX. Accordingly, the present invention provides methods for treating a disease or condition associated with nuclear receptor TLX. The method comprises administering to a subject in need thereof a therapeutically effective amount of a TLX modulator (i.e., compounds of Formula I, Formula Ia, Formula Ib, Formula II, Formula IIa, Formula IIb, or Formula IIc, or a pharmaceutically acceptable salt or isomer thereof). In some embodiments, the TLX modulator can be used to treat a neurological disorder, a metabolic disorder, and cancers. In some embodiments, the disease or condition is a neurological disorder selected from major depressive disorder, depression, schizophrenia, Alzheimer's disease, Parkinson's disease, multiple sclerosis, cognitive impairment, irradiation induced cognition, epilepsy, Angelman syndrome, stroke, diabetes induced neuropathy, Down's syndrome, autism, essential tremor, frontotemporal dementia, progressive supranuclear palsy, amyotrophic lateral sclerosis, Huntington's disease, age associated memory impairment, chronic traumatic encephalopathy, cerebrovascular disease. Lewy Body disease, and multiple system atrophy. In some embodiments, the disease or condition is a metabolic disorder selected from diabetes and amyotrophic lateral sclerosis. In some embodiments, the disease or condition is a cancer selected from glioblastoma, neuroblastoma, retinoblastoma, breast cancer, prostate cancer, and pancreatic cancers.

In some embodiments, the disease or condition is a neurological disorder selected from major depressive disorder, depression, schizophrenia, Alzheimer's disease, Parkinson's disease, multiple sclerosis, cognitive impairment, irradiation induced cognition, epilepsy, Angelman syndrome, ischemic stroke, and diabetes induced neuropathy. In some embodiments, the disease or condition is a neurological disorder selected from major depressive disorder, depression, schizophrenia, and Alzheimer's disease. In some embodiments, the neurological disorder to be treated is major depressive disorder. In some embodiments, the neurological disorder to be treated is depression. In some embodiments, the neurological disorder to be treated is schizophrenia. In some embodiments, the neurological disorder to be treated is Alzheimer's disease.

TLX modulators (i.e., compounds of Formula I, Formula Ia, Formula Ib, Formula II, Formula IIa, Formula IIb, or Formula IIc, or a pharmaceutically acceptable salt or isomer thereof) can be administered at any suitable dose in the methods provided herein. In general, a TLX modulator is administered at a dose ranging from about 0.1 milligrams to about 1000 milligrams per kilogram of a subject's body weight (i.e., about 0.1-1000 mg/kg). The dose of TLX modulator can be, for example, about 0.1-1000 mg/kg, or about 1-500 mg/kg, or about 25-250 mg/kg, or about 50-100 mg/kg. The dose of TLX modulator can be about 1, 2, 3, 4, 5, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950 or 1000 mg/kg. The dosages can be varied depending upon the requirements of the patient, the severity of the disorder being treated, and the particular formulation being administered. The dose administered to a patient should be sufficient to result in a beneficial therapeutic response in the patient. The size of the dose will also be determined by the existence, nature, and extent of any adverse side-effects that accompany the administration of the drug in a particular patient. Determination of the proper dosage for a particular situation is within the skill of the typical practitioner. The total dosage can be divided and administered in portions over a period of time suitable to treat to the disease or condition.

TLX modulators can be administered for periods of time which will vary depending upon the nature of the particular disorder, its severity, and the overall condition of the subject to whom the TLX modulator is administered. Administration can be conducted, for example, hourly, every 2 hours, three hours, four hours, six hours, eight hours, or twice daily including every 12 hours, or any intervening interval thereof. Administration can be conducted once daily, or once every 36 hours or 48 hours, or once every month or several months. Following treatment, a subject can be monitored for changes in his or her condition and for alleviation of the symptoms of the disorder. The dosage of the TLX modulator can either be increased in the event the subject does not respond significantly to a particular dosage level, or the dose can be decreased if an alleviation of the symptoms of the disorder is observed, or if the disorder has been remedied, or if unacceptable side effects are seen with a particular dosage.

A therapeutically effective amount of an TLX modulator can be administered to the subject in a treatment regimen comprising intervals of at least 1 hour, or 6 hours, or 12 hours, or 24 hours, or 36 hours, or 48 hours between dosages. Administration can be conducted at intervals of at least 72, 96, 120, 144, 168, 192, 216, or 240 hours (i.e., 3, 4, 5, 6, 7, 8, 9, or 10 days). In certain embodiments, administration of one or more TLX modulators is conducted in a chronic fashion over periods ranging from several days, several weeks, several months to several years.

TLX modulators can be administered alone or in combination with one or more additional therapeutically active agents, as described above. The additional therapeutically active agents may include Aβ peptides level reducers, pathogenic level tau reducers, microtubule stabilizers, agents capable or removing atherosclerotic plaques, agents that lower circulating levels of β-amyloid and tau, modulators of autophagy, neurotransmitter level regulators, GABA(A) α5 receptors inhibitors, and additional agents that help maintain and/or restore cognitive function and functional deficits of Alzheimer's disease, and/or slow down decline in cognitive functions and functional deficits in Alzheimer's disease.

An TLX modulator as described herein can be administered in the same composition as an additional therapeutically active agent. Alternatively, the additional therapeutically active agent can be administered separately before, concurrently with, or after administration of the TLX modulator.

V. EXAMPLES

Example 1. Preparation of Singly-Substituted Piperazine TLX Modulators: Compounds 1-4

General Procedures for Preparing Compounds 1-4

Step 1: Reductive alkylation. Starting material tert-butyl methylpiperazine-1-carboxylate (1 equivalent) and benzaldehyde (1.1 equivalent) were dissolved in dichloromethane at room temperature. To this solution was added catalytic amount of acetic acid (0.1 equivalent) and anhydrous sodium sulfate (1 g per mmol). The mixture was allowed to stir for 30 minutes, then sodium triacetoxyborohydride (STAB, 2 equivalents) was added and allowed to stir at room temperature for 2 hours. LCMS and TLC showed disappearance of the secondary amine starting material. The reaction mixture was diluted with dichloromethane, filtered, and washed with aqueous sodium bicarbonate solution. The organic layer was collected and evaporated under reduced pressure to obtain the tert-butyl 4-benzyl-methylpiperazine-1-carboxylate compound as a thick liquid, which was used in Step 2 without purification.

Step 2: Boc deprotection. The boc-protected benzyl substituted compound (tert-butyl 4-benzyl-methylpiperazine-1-carboxylate) obtained from the previous reductive alkylation step was dissolved in 1,4-dioxane (5 mL). To this solution was added 4M HCl in dioxane (1 ml 20% V/V). The mixture was allowed to stir at room temperature for 16 hours. LCMS showed disappearance of the boc-protected benzyl substituted compound. The volatiles were then evaporated to obtain the 1-benzyl-methylpiperazine compound as a HCl salt, which used in Step 3 without further purification.

Step 3: Coupling reaction. The 1-benzyl-methylpiperazine compound (1 equivalent), obtained from the previous boc deprotection step, was dissolved in dimethylformamide (DMF). To this solution was added diisopropyldiethylamine (DIPEA, 6 equivalents), 2-(isopentyl amino)nicotinic acid (2 equivalents), and 1-[Bis(dimethylamino)methylene]-1H-1,2,3-triazolo[4,5-b]pyridinium 3-oxide hexafluorophosphate (HATU. 2 equivalents) at room temperature. The mixture was allowed to stir at room temperature for 3 hours. LCMS showed disappearance of the 1-benzyl-methylpiperazine compound. The reaction mixture was worked up by adding water and brine, then extracting into ethylacetate. The volatiles were then evaporated to from the organic layer to obtain the 4-benzyl-methylpiperazin-1-yl)(2-(isopentylamino)pyridin-3-yl)methanone product, and then purified by preparative HPLC.

Preparation of (R)-(4-benzyl-3-methylpiperazin-1-yl)(2-(isopentylamino)pyridin-3-yl)methanone (1)

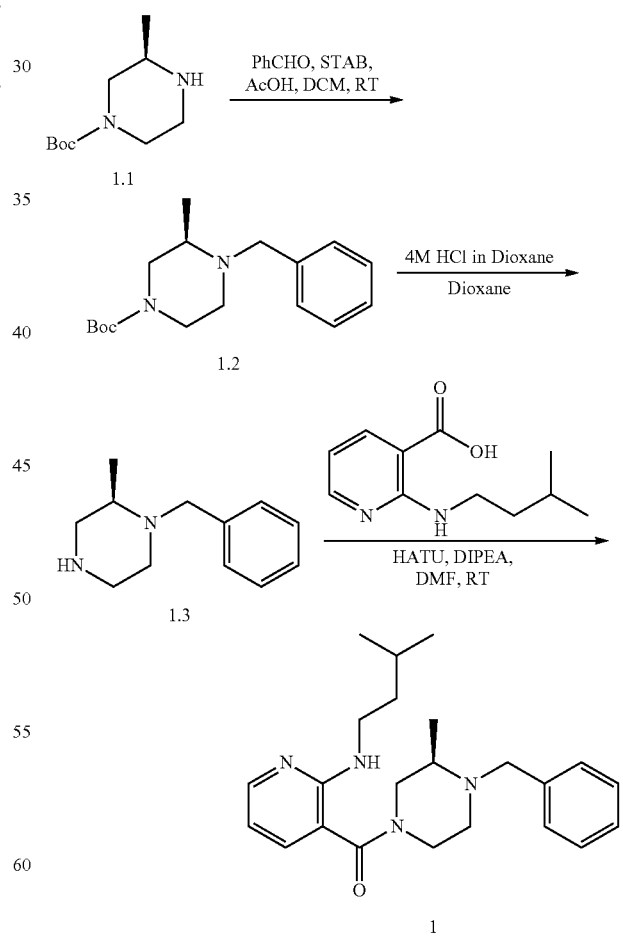

¹H NMR (800 MHz, Chloroform-d) δ 8.17 (t, J=3.2 Hz, 1H), 7.34 (d, J=4.8 Hz, 4H), 7.30-7.24 (m, 2H), 6.51 (dd, J=7.4, 5.0 Hz, 1H), 5.68 (d, J=5.4 Hz, 1H), 4.05 (d, J=13.4

Hz, 1H), 3.43 (q, J=6.7 Hz, 2H), 3.35-3.22 (m, 2H), 3.11 (s, 1H), 2.75 (d, J=11.3 Hz, 1H), 2.54 (s, 1H), 2.23-2.08 (m, 1H), 1.71 (dp, J=13.3, 6.7 Hz, 1H), 1.52 (q, J=7.3 Hz, 2H), 1.18 (s, 3H), 0.96 (d, J=6.7 Hz, 6H). $^{13}$C NMR (201 MHz, CDCl$_3$) δ 169.01, 156.74, 149.78, 135.88, 129.07, 129.01, 128.38, 127.26, 112.82, 110.65, 57.87, 55.44, 50.44, 39.67, 38.54, 26.04, 22.65, 22.62, 15.35.

Preparation of (S)-(4-benzyl-3-methylpiperazin-1-yl)(2-(isopentylamino)pyridin-3-yl)methanone (2)

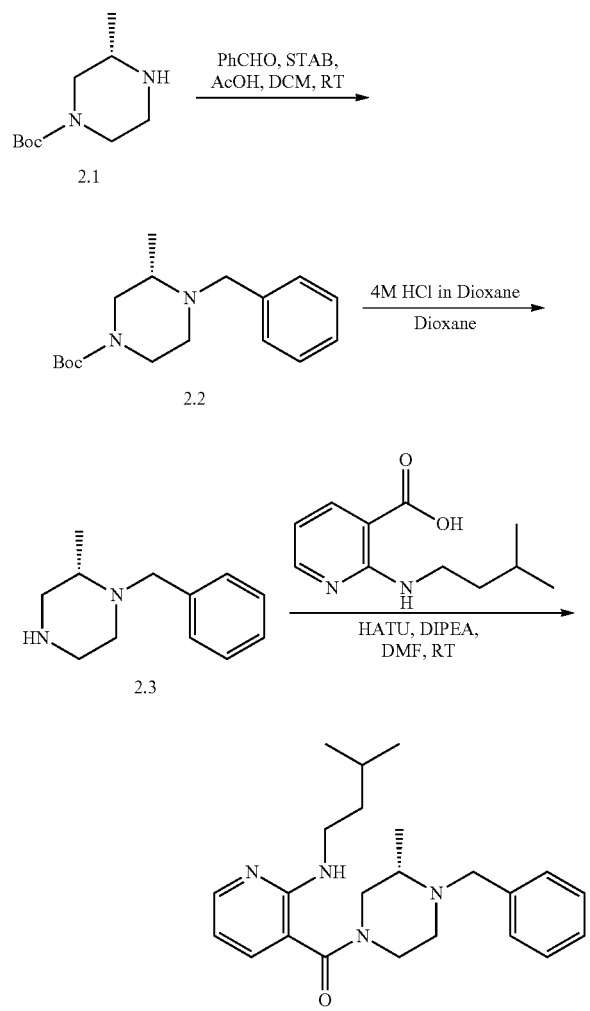

$^1$H NMR (800 MHz, Chloroform-d) δ 8.17 (dd, J=5.0, 2.0 Hz, 1H), 7.34 (d, J=4.7 Hz, 5H), 7.31-7.23 (m, 3H), 6.52 (dd, J=7.4, 4.9 Hz, 1H), 5.68 (s, 1H), 4.04 (d, J=12.5 Hz, 1H), 3.43 (td, J=7.7, 5.4 Hz, 2H), 3.27 (d, J=41.9 Hz, 2H), 3.09 (s, 1H), 2.75 (s, 1H), 2.53 (s, 1H), 2.16 (s, 1H), 1.72 (dp, J=13.2, 6.7 Hz, 1H), 1.52 (q, J=7.2 Hz, 2H), 1.23-1.09 (m, 4H), 0.96 (d, J=6.6 Hz, 7H). $^{13}$C NMR (201 MHz, CDCl$_3$) δ 169.00, 156.76, 149.78, 135.87, 129.01, 128.37, 127.18, 110.65, 57.88, 39.67, 38.55, 26.04, 22.66, 15.40.

Preparation of (R)-(4-benzyl-2-methylpiperazin-1-yl)(2-(isopentylamino)pyridin-3-yl)methanone (3)

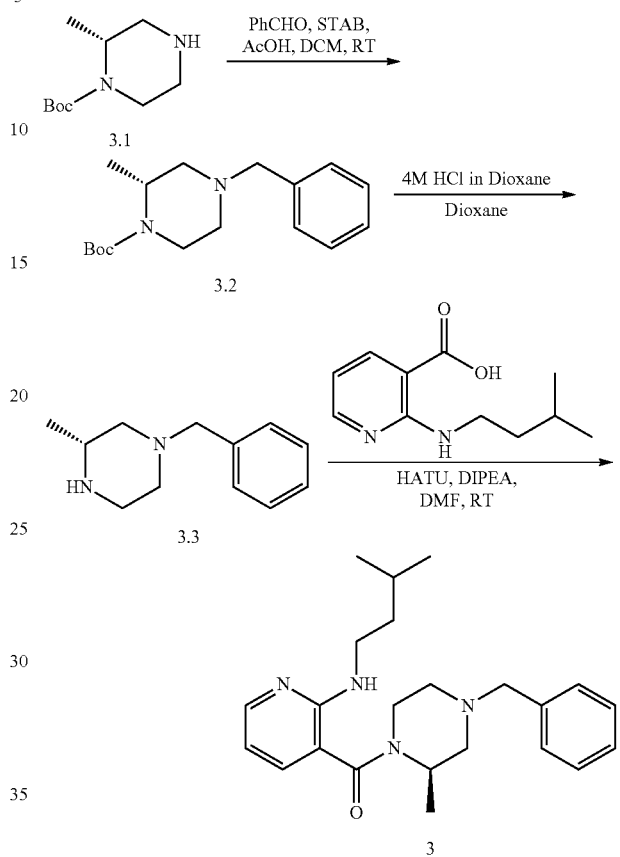

$^1$H NMR (800 MHz, Chloroform-d) δ 8.17 (dd, J=5.0, 1.9 Hz, 1H), 7.34 (d, J=5.9 Hz, 4H), 7.30-7.24 (m, 3H), 6.53 (dd, J=7.3, 5.0 Hz, 1H), 5.47 (s, 1H), 3.58 (d, J=13.0 Hz, 1H), 3.49-3.41 (m, 3H), 3.34 (s, 2H), 2.87 (s, 1H), 2.70 (d, J=11.5 Hz, 1H), 2.20 (d, J=12.8 Hz, 1H), 2.07 (d, J=19.2 Hz, 1H), 1.72 (dp, J=13.3, 6.7 Hz, 1H), 1.52 (q, J=7.2 Hz, 2H), 1.38 (d, J=6.8 Hz, 3H), 0.96 (d, J=6.7 Hz, 6H). $^{13}$C NMR (201 MHz, CDCl$_3$) δ 168.98, 156.33, 149.43, 135.29, 128.80, 128.36, 127.26, 114.02, 110.89, 62.64, 57.58, 53.55, 39.72, 38.56, 26.04, 22.66, 16.69.

Preparation of (S)-(4-benzyl-2-methylpiperazin-1-yl)(2-(isopentylamino)pyridin-3-yl)methanone (4)

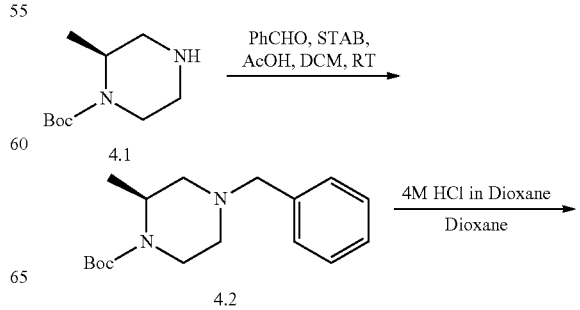

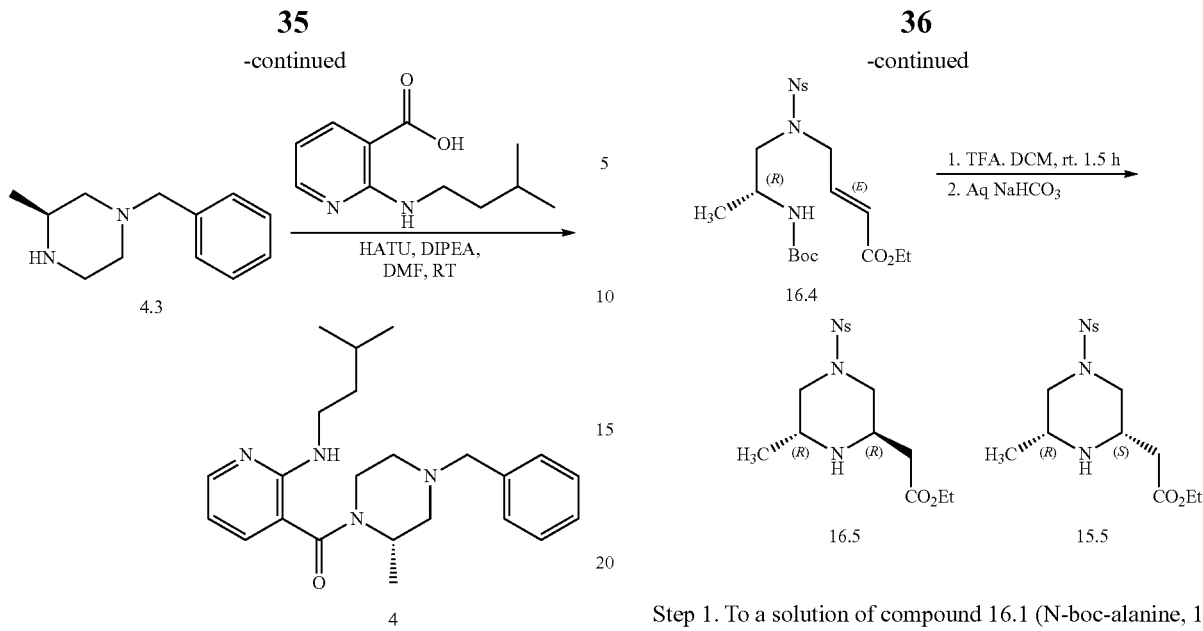

¹H NMR (800 MHz, Chloroform-d) δ 8.17 (dt, J=4.9, 1.7 Hz, 1H), 7.35 (d, J=5.8 Hz, 4H), 7.32-7.21 (m, 3H), 6.53 (ddd, J=7.0, 5.1, 1.7 Hz, 1H), 5.48 (s, 1H), 3.57 (s, 1H), 3.45 (td, J=16.6, 13.7, 9.5 Hz, 3H), 3.34 (s, 2H), 2.87 (s, 1H), 2.70 (d, J=11.2 Hz, 1H), 2.21 (s, 1H), 2.09 (s, 1H), 1.78-1.67 (m, 1H), 1.52 (q, J=7.2, 6.7 Hz, 2H), 1.42-1.36 (m, 3H), 0.97 (dt, J=6.6, 1.5 Hz, 6H). ¹³C NMR (151 MHz, CDCl₃) δ 168.95, 156.28, 149.35, 135.38, 128.84, 128.40, 110.88, 62.61, 57.57, 53.52, 39.76, 38.55, 26.05, 22.65, 16.72.

Example 2. Preparation of Doubly-Substituted Piperazine TLX Modulators

Preparation of 2-((2R,6R)-1-benzyl-6-methyl-4-phenylpiperazin-2-yl)acetic acid (16)

The title compound was prepared from Boc-protected D-alanine as shown in the following schemes.
Steps 1-4: N₄-Nosylation.

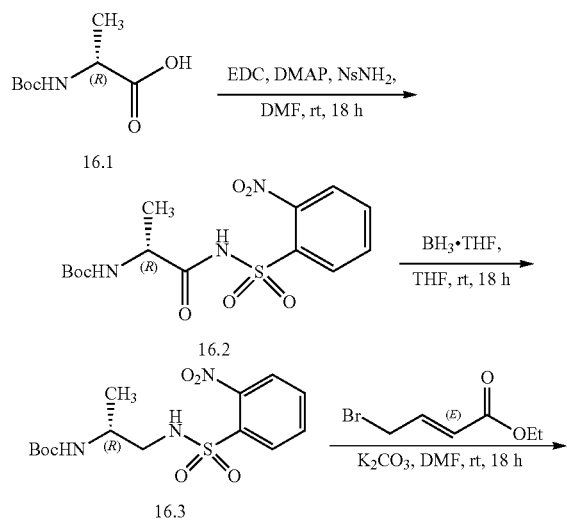

Step 1. To a solution of compound 16.1 (N-boc-alanine, 1 eq) in DMF was added 2-nitro benzenesulfonamide (0.9 eq), DMAP (1.2 eq), and EDCI (1.5 eq). The reaction mixture was stirred at room temperature for 18 h before being partitioned between EtOAc and water. The organic layer was washed with 10% citric acid solution and sodium bicarbonate solution, followed by brine solution. The water layer was re-extracted a second time with the sequence of washings. The combined organic layers were dried over MgSO₄ and concentrated under reduced pressure. Crude compound 16.2 was used in next reaction step without purification.

Step 2. A dried, round bottom flask was charged with compound 16.2 (acylsulfonamide, 1.0 eq) and THF (ACS reagent grade). The reaction flask was placed in a water bath, and borane THF complex (BH₃·THF, 1M solution in THF, 2.5 eq) was added dropwise via cannula. The reaction mixture was allowed to stir overnight at ambient temperature. After completion of the reaction, methanol was added and allowed to stir for 15 minutes, followed by solvent removal via evaporation. The reaction mixture was then washed with 1N NaOH solution and extracted with ethylacetate. The combined organic layers were concentrated under reduced pressure and the residue was purified by column chromatography to obtain the pure compound 16.3.

Step 3. To a solution of nosyl amide compound 16.3 (1 eq) in anhydrous N,N-dimethylformamide was added potassium carbonate (2 eq) and ethyl 4-bromocrotonate (80%) (1.5 eq). The reaction mixture was allowed to stir overnight at room temperature. After completion of the reaction, the reaction mixture was poured into ice cold water and extracted with ethylacetate. The organic layer was washed with brine, dried with magnesium sulfate, filtered, and concentrated under reduced pressure. The resulting residue was purified by column chromatography to obtain pure compound 16.4.

Step 4. To a stirring solution of compound 16.4 in DCM was added TFA, and the reaction mixture was allowed to stir at room temperature for 1.5 h. After completion of the reaction, the DCM and remaining TFA was removed via evaporation. The TFA salt of the product was re-dissolved in DCM, followed by the careful addition of sodium bicarbonate solution, and extraction with DCM. The organic layer was concentrated under reduced pressure to give cis and trans products, 16.5 and 15.5, respectively.

Steps 5-8: N₁-Benzylation, N₄-Phenylation.

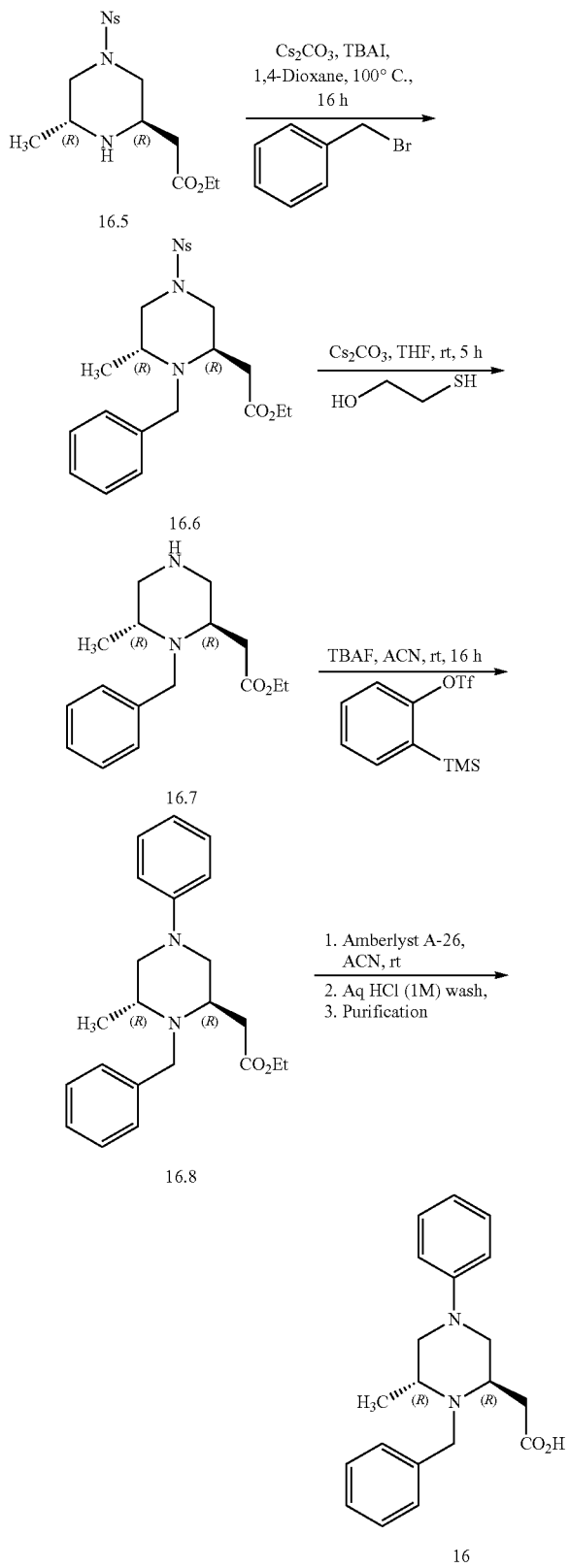

16.5

16.6

16.7

16.8

16

Step 5. A 10 mL glass reaction vessel was charged with a solution of ethyl 2-((2R,6R)-6-methyl-4-((2-nitrophenyl) sulfonyl) piperazin-2-yl) acetate (compound 16.5) in 1,4-dioxane. Next, cesium carbonate (2 eq) and TBAI (0.2 eq) was added, followed by the addition of benzylbromide (5 eq). The reaction vial was sealed with a cap and allowed to stir at 100° C. for 16 h. The reaction mixture was then diluted with ethylacetate and washed with water, then brine. The organic layer was evaporated to obtain crude compound 16.6 as a residue, which was carried through to the next reaction step without further purification.

Step 6. A 10 mL glass reaction vessel with a filter frit and male Luer tip was placed into the rubber female Luer receptacle of a Bohdan MiniBlock. The MiniBlock was placed atop a Bohdan MiniBlock orbital shaker. The vessel was charged with a solution of crude ethyl 2-((2R,6R)-1-benzyl-6-methyl-4-((2-nitrophenyl)sulfonyl)piperazin-2-yl) acetate (compound 16.6) in dry THF (2 mL). 2-Mercapto-ethanol (3 eq) was added by syringe, followed by $Cs_2CO_3$ (2 eq). The vessel was sealed with a septum sheet and agitated for 16 h. UPLC/MS analysis indicated complete removal of the 2-nosyl protecting group. Agitation was stopped and the reaction mixture was drained into a glass tube and evaporated to a residue. The residue was dissolved in DCM (2 mL) and transferred to a new 10 mL glass vessel in a block atop the shaker. Aqueous HCl (2N, 2 mL) was added. The vessel was sealed with a septum sheet and agitated 5 min and the 2-phase mixture was drained into a phase separator. The retained aqueous layer was recovered and evaporated to give a residue containing the HCl salt of the deprotected amine ethyl 2-((2R,6R)-1-benzyl-6-methylpiperazin-2-yl)acetate-HCl. The crude material was re-dissolved in 5% TEA in DCM for neutralization and washed with water to eliminate TEA·HCl salt. The organic layer was evaporated to obtain crude compound 16.7, which was carried on to the next reaction step without further purification.

Step 7. A 10 mL glass vessel was positioned as described in step 6. The vessel was charged with a solution of ethyl 2-((2R,6R)-1-benzyl-6-methylpiperazin-2-yl)acetate (compound 16.7) (based on complete conversion to its corresponding deprotected derivative) in dry acetonitrile (2 mL). The vessel was sealed with a septum sheet. 2-(Trimethylsilyl)phenyl trifluoromethanesulfonate (2 eq) was added by syringe, followed by TBAF (2 equiv). Normal agitation (600 rpm) was initiated and continued for 16 h. UPLC/MS indicated complete conversion. Agitation was stopped, the reaction mixture was drained into a glass tube and evaporated to a residue. The residue was dissolved in 1:1 of ethylacetate:hexanes, and passed through a small pad of silica to remove excess TBAF. The retained organic layer was evaporated to give crude compound 16.8, which was carried forward to the next reaction step without further purification.

Step 8. A 10 mL glass vessel was positioned as described above. The vessel was charged with a solution of ethyl 2-((2R,6R)-1-benzyl-6-methyl-4-phenylpiperazin-2-yl)acetate (compound 16.8) (based on complete conversion of its corresponding bis-diversified derivative) in ACN (2 mL). A26 Hydroxide Resin (5 eq) was added and the vessel was sealed with a septum sheet. Normal agitation (600 rpm) was initiated and continued for 16 h. UPLC/MS indicated no starting compound was observed in the solution. The ACN solution was drained through a filter frit, and the resin was suspended in 20% (v/v) 2N HCl/ACN. Agitation was initiated at room temperature, and continued for 15 minutes. The ACN solution was again drained through a filter frit, and the process was repeated 2× more. Additional acid washes were performed until pink color no longer appeared and the mixture remained yellow. The yellow mixture was drained into a glass tube and the volatiles were removed via evaporation to obtain the crude product residue. The residue was purified by HPLC to obtain pure product 16, 2-((2R,6R)-1-benzyl-6-methyl-4-phenylpiperazin-2-yl)acetic acid.

Example 3. Preparation of Substituted piperazine-2-acetic acids

The scaffold group, or "scaffold family", was designed to adhere to the chemical diversification principles of SCD as described above. Our goals in the current studies are twofold. One goal is to analytically determine by computation and spectroscopy the architectural characteristics of a fragment compound library comprising a full stereochemical matrix of constitutional isomers. Another goal is to demonstrate its production by parallel synthesis.

We focused on the portion of our previously published piperazine scaffold family derived from both antipodes of alanine. Of all the scaffolds prepared to date, the alanine derived examples are the most fragment-like, featuring the lowest molecular weight (mw=158.2) and the lowest number of rotatable bonds (two rotatable bonds). A saturated core structure bearing two substituents on $sp^3$ carbons has a matrix of twelve absolute constitutional stereoisomers. The twelve piperazine-2-acetic acid scaffold isomers derived from the two antipodes of alanine are shown in FIG. 1.

Figure 2:
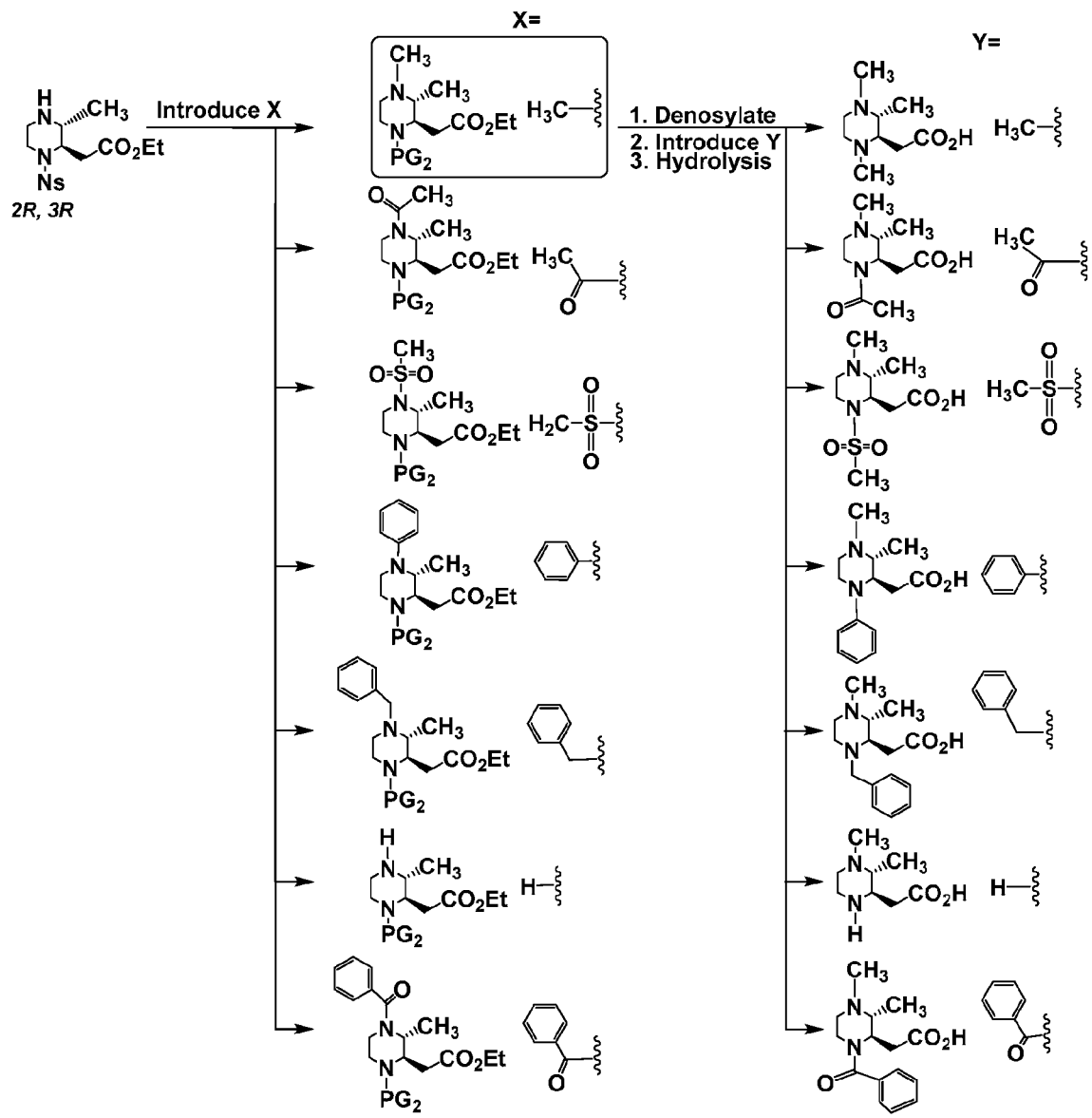
FIG. 2 shows a parallel synthesis grid for mono-N-nosyl protected piperazine scaffolds. All three scaffold regiosiomers are processed using the same workflows.

In our previous reports several synthetic sequences were successfully carried out on certain individual scaffolds related to the ones shown in FIG. 1 to demonstrate the diversification potential of the larger scaffold family. In all cases diversification was shown to afford final fragment products that were enantiomerically homogenous. Having established the viability of diversifying the scaffolds using chemistry suitable for parallel synthesis we composed a set of target fragments featuring substituents on both nitrogen atoms that are often present in clinically active compounds. A schematic representation of the 49-member target set of compounds for a single scaffold is shown in FIG. 2. The diversity elements are methyl, acetyl, mesyl, phenyl, benzyl, benzoyl and hydrogen. The total size of the target library is 12 scaffolds×49 compounds/scaffold=588 compounds.

We began our production studies by designating the group of N-capping reactions that were required to construct our desired collection. For introduction of N-methyl we chose reductive methylation. For N-acetyl and N-benzoyl we used acid chloride acylation. For N-mesylation we chose sulfonyl chloride sulfonylation. For N-benzylation two protocols were adopted, either reductive benzylation or alkylation. For N-phenylation, benzyne chemistry was used. Each of these transformations is briefly discussed below.

Figure 3:
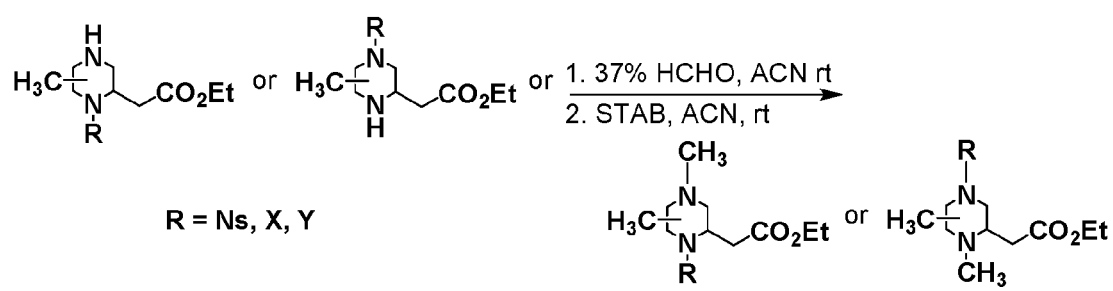
FIG. 3 shows N-methylation, N-acetylation, and N-benzoylation of piperazine scaffolds.
Figure 3:
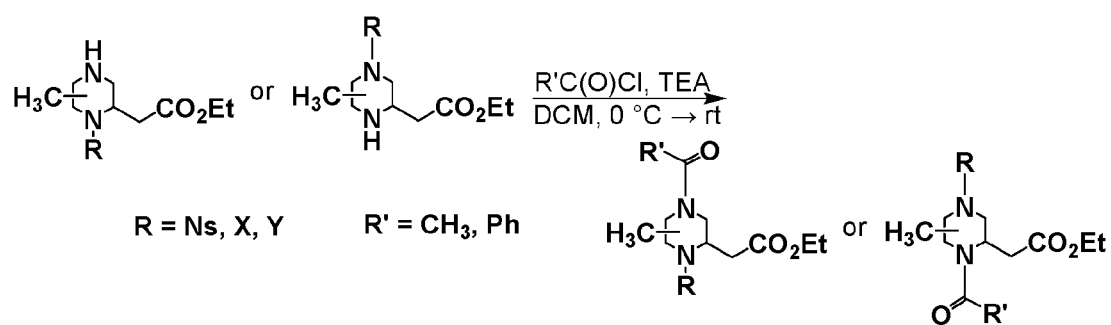

Reductive methylation proved to be straightforward using standard methodology. Exposure of any of the piperazine scaffolds, regardless of substitution pattern, bearing an unprotected $N_1$ or $N_4$ atom to 37% aq HCHO for a short period of time (<30 m, rt) followed by treatment with sodium triacetoxyborohydride (STAB)/AcOH quantitatively converted them to N-methylated derivatives. ACN was preferred as the solvent for this transformation. Both acetylation and benzoylation behaved similarly, with all piperazines bearing an unprotected nitrogen atom at either $N_1$ or $N_4$ reacting quantitatively with AcCl or PhC(O)Cl (BzCl) in the presence of TEA/DCM at rt to afford N-acetyl/benzoyl derivatives (FIG. 3).

Figure 4:
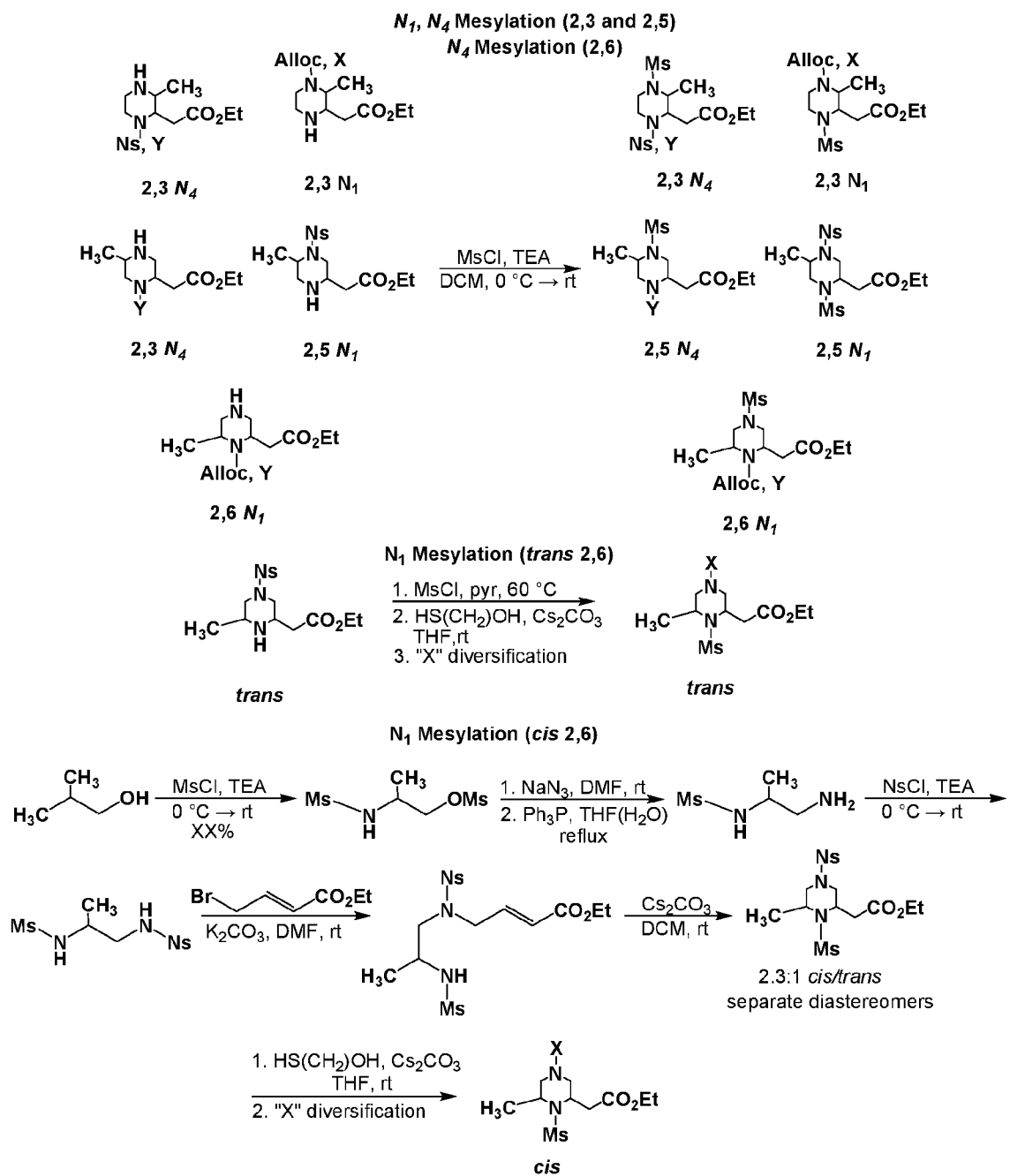
FIG. 4 shows N-mesylation of piperazine scaffolds.

Standard N-mesylation methodology (MsCl, TEA, DCM, rt) was effective in converting all unprotected nitrogen atoms in both the 2,3- and 2.5-scaffold family branches to N-mesyl derivatives (FIG. 4). The $N_4$ atom of the 2,6-scaffold family branch was also efficiently converted to its $N_4$-mesyl derivative using the same method. The $N_1$ atom of the 2,6-scaffold family branch, being the most sterically hindered, was more resistant. The trans diastereomers could be converted to $N_1$-mesyl derivatives by treatment with MsCl/pyr (60° C., 3 h). No conditions were identified that could reliably convert the $N_1$ atom of the cis diastereomers to $N_1$-mesyl derivatives. In order to complete the library a de novo batch synthesis of the cis $N_1$-mesyl 2,6-scaffold derivatives was devised as shown in FIG. 4. The antipodes of alaninol were converted to their bis-methanesulfonamides X. Reaction with $NaN_3$ afforded the methanesulfonamide azides X. Staudinger reduction produced the monoprotected diamine X, which was converted to its bis-sulfonamide derivative X. X was regioselectively alkylated with ethyl 4-bromocrotonate to afford the cyclization precursor X (Bordwell pKa (DMSO) $MeSO_2NH_2$=17.5; $PhSO_2NH_2$=16.1). Base promoted cyclization afforded a mixture of cis and trans diastereomers X and X (dr=2.3:1). The diastereomers were separated by column chromatography, giving the $N_1$-mesyl-$N_4$—$N_4$ piperazines X and X. Denosylation provided the cis $N_1$-mesyl 2,6-scaffolds with an unprotected Na atom available for diversification which was carried out on the parallel platform.

Figure 5:
FIG. 5 shows N-benzylation of piperazine scaffolds.
Figure 5:
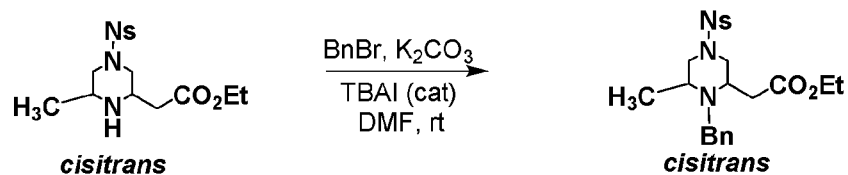

Benzylation followed a similar pattern as mesylation (FIG. 5). All unprotected nitrogen atoms in the 2,3- and 2,5-scaffold family branches, as well as the $N_4$ atom of the 2,6-branch, were efficiently benzylated using reductive alkylation conditions (PhCHO, AcOH, STAB, DCM, rt). For the 2,6-branch reductive alkylation failed to fully convert the $N_1$ atom of both diastereomers to their benzylated derivatives. Instead, alkylation ($PhCH_2Br$, $K_2CO_3$, DMF, TBAI (cat), rt) afforded the desired N-benzyl derivatives with no evidence of quaternization.

Figure 6:
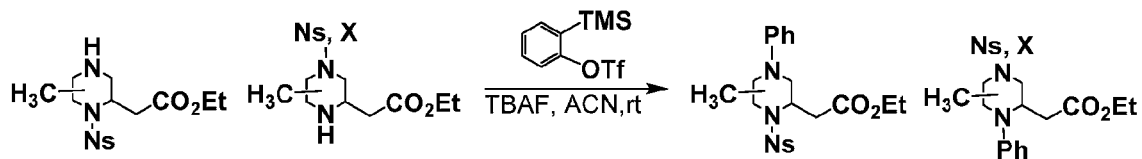
FIG. 6 shows N-phenylation of piperazine scaffolds.

N-Phenylation was the most problematic N-capping reaction (FIG. 6). The most reliable method for effecting N-phenylation was the use of benzyne chemistry. Using ((2-trifluoromethylsulfonyloxy))phenyl)trimethylsilane as the benzyne source, a number of fluoride reagents were tried. TBAF proved to be the most effective for N-phenylation but the presence of the tetrabutylammonium triflate (TBAT) byproduct created problems during both the parallel processing and the final purification of the library compounds by reverse phase mass directed fractionation (MDF). The presence of TBAT led to loss of some of the product to water when the reactions were partitioned between organic and aqueous. TBAT also proved difficult to separate from the desired product by MDF purification at the end of the synthetic sequence. It was therefore necessary to remove the substrates from the parallel platform and individually render them free of TBAT by solid phase extraction before advancing them further in the synthesis.

Figure 7:
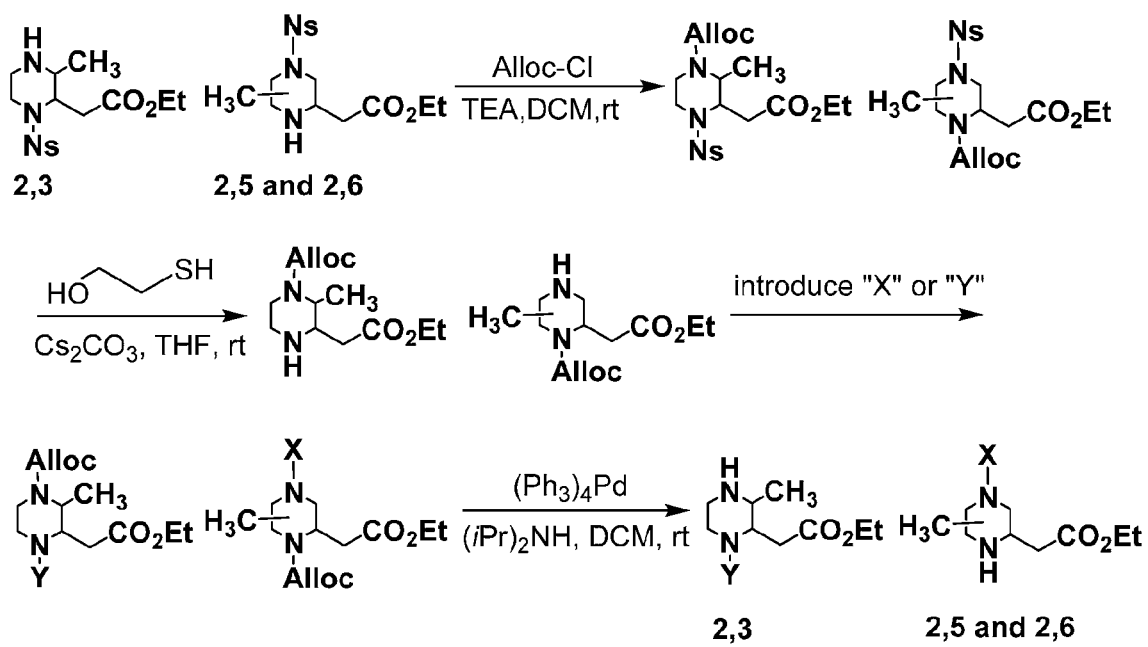
FIG. 7 shows N-Alloc protection, N-denosylation, diversification and N-Alloc deprotection of piperazine scaffolds.

Finally, in cases where the target compound required protection of the free N atom that emerged from the scaffold synthesis prior to diversification, the Alloc group was found to effectively protect either $N_1$ or $N_4$ in all twelve stereoisomers. The production sequence is shown in FIG. 7. Alloc protection was followed by denosylation. The denosylated N atom was diversified and the Alloc group removed using $(TPP)_4Pd$ with excess DIA added as a scavenger for the allyl cation byproduct.

Figure 8:
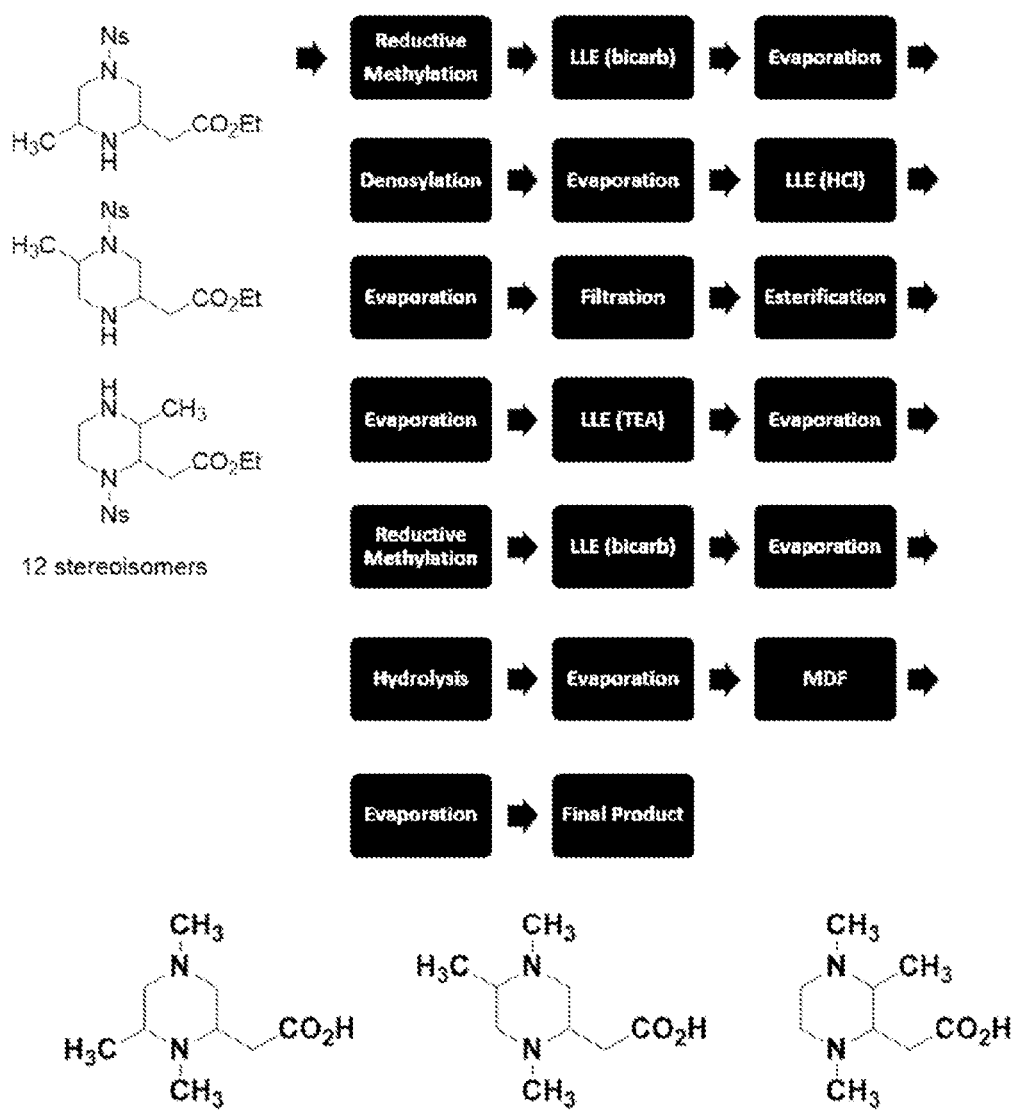
FIG. 8 shows a process blockflow diagram for the double reductive methylation of mono-N-nosylated piperazine scaffolds in a parallel platform format. LLE=liquid/liquid extraction (bicarb=DCM/aq NaHCO3, HCl=DCM/2N HCl, TEA=DCM (5% TEA)/H2O. MDF=Mass Directed Fractionation.
Figure 9:
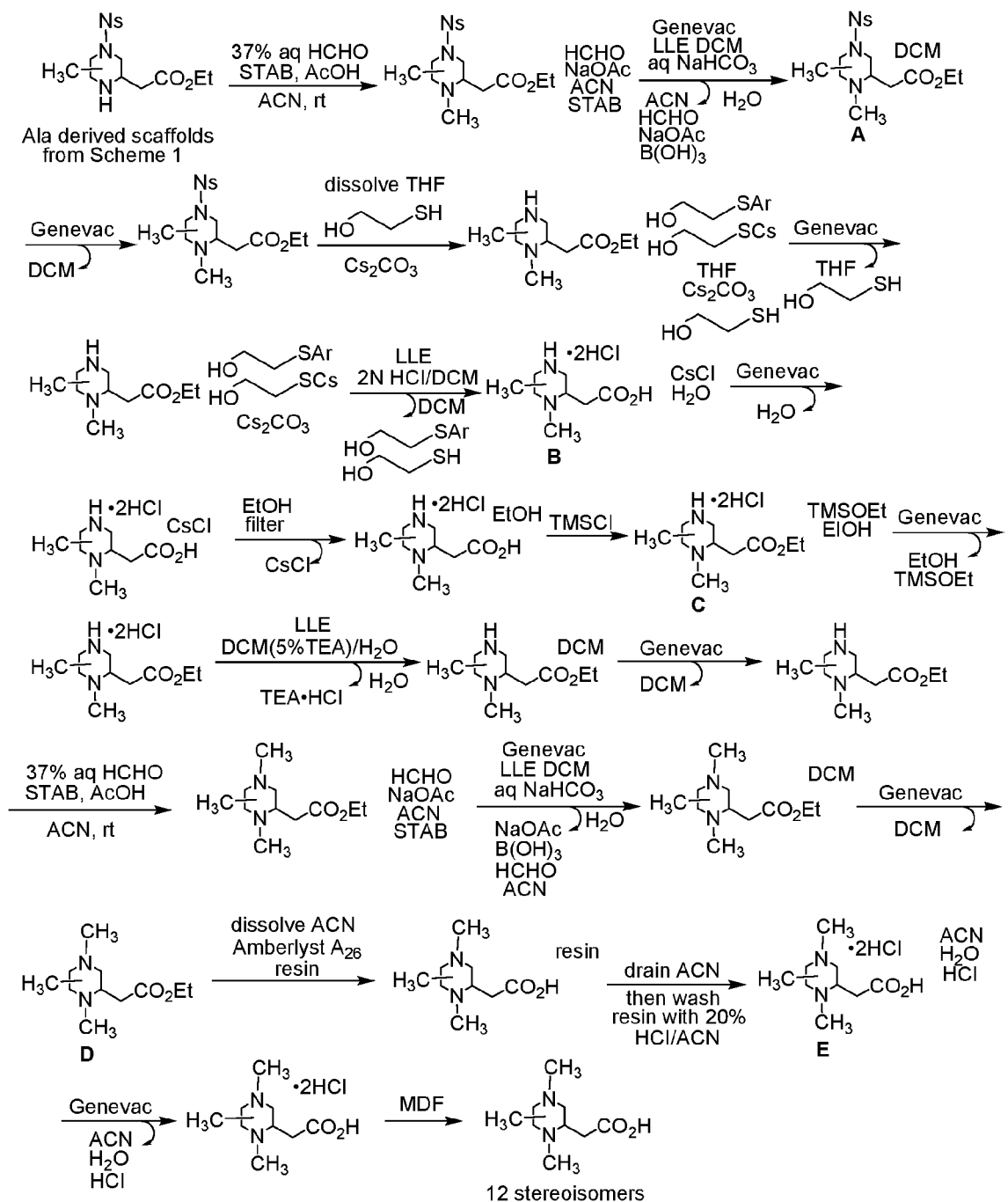
FIG. 9 shows a process workflow diagram for double reductive methylation of mono-N-nosylated piperazine scaffolds in a parallel platform format. Red=materials removed. Blue=materials present/carried through the workflow. LLE=liquid/liquid extraction. Genevac=parallel evaporation. All reactions were carried out at rt.

Each of the above transformations was standardized as a parallel platform compatible procedure. The synthetic sequences that were required to convert scaffold starting materials to final library compounds were formulated as a series of the above standardized transformations. These transformations were interspersed with byproduct removal and solvent switching steps designed to insure that no residual materials from an earlier reaction would interfere with a subsequent one. Each complete sequence was then defined by a workflow protocol that would represent a complete end-to-end process. An example of a complete sequence is depicted below showing the double reductive methylation of the monoprotected scaffolds that emerge from the previously reported piperazine syntheses. The sequences are first formulated as a series of block operations as shown in FIG. 8. These operations are then converted to detailed synthetic workflows as shown in FIG. 9. At each step the substances present in solution are shown in blue and the substances removed are shown in red.

As shown in FIG. 9, the alanine-derived scaffolds (introduced in FIG. 1), in parallel, are subjected to reductive methylation, affording the mono-methylated products along with the other depicted components (HCHO, NaOAc, ACN, STAB in blue). Evaporation (Genevac) followed by liquid-liquid extraction (LLE; DCM/aq NaHCO$_3$) removes all the volatile and water soluble components (ACN, HCHO, NaOAc, B(OH)$_3$ in red) leaving the mono-methylated intermediate A in DCM. Removal of DCM is followed by denosylation, affording the deprotected amine along with the other components/byproducts. Evaporation followed by LLE (DCM/aq HCl) removes all volatiles and neutral organics leaving the intermediate water soluble amino acid hydrochloride B along with CsCl. Partial ester hydrolysis could not be avoided. Evaporation of water followed by dissolution in EtOH and filtration removes CsCl, leaving the amino acid hydrochloride in EtOH solution. Addition of TMSCl re-esterifies the amino acid hydrochloride to the amino ethyl ester hydrochloride C. Evaporation followed by LLE (DCM/TEA/H$_2$O) leaves the liberated amino ester in DCM. Evaporation of DCM is followed by the second reductive methylation. The process sequence from earlier is repeated leaving the isolated bis-methylated amino ester D. The ester is hydrolyzed on Amberlyst A26 resin onto which it is adsorbed until it is liberated from the resin by washing with ACN/HCl. The product bis-methylated amino acid hydrochloride E is rendered free of all volatiles and purified by reverse phase mass directed fractionation (MDF) to give the twelve final stereoisomeric products.

All library compounds were produced using the above synthetic design with the block operations added, removed or rearranged according to the desired outcome. A complete listing of the block operations, their definitions and the process workflows used to produce all the library compounds can be found in the Supplementary Information. In general 100 mg of each scaffold was front-loaded into the beginning of each sequence affording between 5-45 mg of diversified library compound after MDF in widely varying overall yields. Final analysis of all library compounds was carried out by LCMS.

2-((2R,5R)-1,4,5-trimethylpiperazin-2-yl)acetic acid. $^1$H NMR (600 MHz, DMSO-d$_6$) δ 2.97 (vbs, 1H), 2.64 (dd, J=11.8, 4.2 Hz, 1H), 2.49-2.43 (m, 5H), 2.38-2.35 (bm, 2H), 2.28 (s, 3H), 2.22 (s, 3H), 0.99 (d, J=6.0 Hz, 3H). $^{13}$C NMR (151 MHz, DMSO-d$_6$) δ 174.2, 172.0, 164.1, 59.0, 57.5, 56.5, 55.9, 42.3, 41.8, 36.4, 31.2, 22.9, 15.3. HRMS (ESI-TOF) m/z: [M+H]$^+$ Calcd for C$_9$H$_{19}$N$_2$O$_2$ 187.1447; Found 187.1441.

2-((2R,5R)-4-acetyl-1,5-dimethylpiperazin-2-yl)acetic acid. Approximately 1:1 mixture of rotamers. $^1$H NMR (600 MHz, DMSO-d$_6$) δ 4.50 (t, J=5.0 Hz, 0.5H), 4.20 (dd, J=13.3, 3.1 Hz 0.5H), 3.99 (d, J=7.2 Hz, 0.5H), 3.62 (dd, J=13.4, 2.8 Hz, 1H), 3.50-3.48 (m, 3H), 3.43-3.41 (m, 2H), 3.07 (dd, J=13.2, 10.8 Hz, 1H), 2.63 (m, J=11.6 Hz, 1H), 2.57-2.53 (m overlapping s, 4.5H), 2.29 (dd, J=16.0, 6.4 Hz, 0.5H), 2.23 (dt, J=12.2 Hz, J$_d$=3.7 Hz, 2H), 2.20 (s, 1.5H), 2.19-2.09 (m, 1H), 2.08 (s, 1.5H), 1.99 (s, 1.5H), 1.22 (d, J=6.7 Hz, 1.5H), 1.10 (d, J=6.9 Hz, 1.5H). $^{13}$C NMR (151 MHz, DMSO-d$_6$) δ 173.21, 173.17, 168.4, 168.2, 60.6, 60.1, 60.0, 59.8, 49.1, 45.6, 43.9, 42.91, 42.85, 37.0, 36.4, 23.0, 21.9, 21.3, 16.9, 15.9. HRMS (ESI-TOF) m/z: [M+H]$^+$ Calcd for C$_{10}$H$_{19}$N$_2$O$_3$ 215.1396; Found 215.1389.

2-((2R,5R)-1,5-dimethyl-4-(methylsulfonyl)piperazin-2-yl)acetic acid. $^1$H NMR (600 MHz, DMSO-d$_6$) δ 4.09-4.03 (m, 1H), 3.67-3.63 (m, 1H), 3.10-3.06 (m, 2H), 2.98 (s, 3H), 2.88-2.75 (m, 2H), 2.48-2.43 (m, 6H), 2.37 (quar, J=5.8 Hz, 1H), 1.31 (d, J=6.9 Hz, 3H). $^{13}$C NMR (151 MHz, DMSO-d$_6$) δ 172.3, 72.9, 68.1, 63.3, 60.6, 59.7, 47.9, 46.1, 43.1, 42.0, 34.6, 24.9, 16.0. HRMS (ESI-TOF) m/z: [M+H]$^+$ Calcd for C$_9$H$_{19}$N$_2$O$_4$S 251.1066; Found 251.1062.

2-((2R,5R)-4-benzyl-1,5-dimethylpiperazin-2-yl)acetic acid. $^1$H NMR (600 MHz DMSO-d$_6$) δ 7.30-7.29 (m, 4H), 7.22 (hept, J=3.8 Hz, 0H), 3.79 (bd, J=13.7 Hz, 1H), 3.26 (bd, J=13.7 Hz, 1H), 2.72 (vbs, 1H), 2.62 (vbs, 1H), 2.43 (dt, J=10.7, 5.0 Hz, 1H), 2.36-2.29 (m, 2H), 2.23 (s, 3H), 1.04 (d, J=6.3 Hz, 1H). $^{13}$C NMR (151 MHz, DMSO-d$_6$) δ 174.0, 139.5, 128.8, 128.6, 127.2, 58.3, 57.7, 53.34, 53.32, 52.6, 42.3, 40.9, 32.3, 14.1. HRMS (ESI-TOF) m/z: [M+H]$^+$ Calcd for C$_{15}$H$_{23}$N$_2$O$_2$ 263.1760; Found 263.1750.

2-((2R,5R)-1,5-dimethyl-4-phenylpiperazin-2-yl)acetic acid (7 {5,1}) HRMS (ESI-TOF) m/z: [M+H]$^+$ Calcd for C$_{14}$H$_{21}$N$_2$O$_2$ 249.1603; Found 249.1595.

2-((2R,5R)-1,5-dimethylpiperazin-2-yl)acetic acid (7 {6,1}) HRMS (ESI-TOF) m/z: [M+H]$^+$ Calcd for C$_8$H$_{17}$N$_2$O$_2$ 173.1290; Found 173.1284.

2-((2R,5R)-4-benzoyl-1,5-dimethylpiperazin-2-yl)acetic acid (7 {7,1}) HRMS (ESI-TOF) m/z: [M+H]$^+$ Calcd for C$_{15}$H$_{21}$N$_2$O$_3$ 277.1552; Found.

2-((2R,5R)-1-acetyl-4,5-dimethylpiperazin-2-yl)acetic acid (7 {1,2}). Approximately 1:1 mixture of rotamers. $^1$H NMR (600 MHz, DMSO-d$_6$) δ 5.01-4.98 (m, 0.25H), 4.93 (dt, J=10.0, 5.0 Hz, 0.25H), 4.60-4.53 (bm, 0.5H), 4.43 (dt, J=15.0, 3.8 Hz, 0.5H), 4.07-3.92 (bm, 1H), 3.58-3.43 (m, 3H), 3.37-3.34 (m, 0.5H), 3.29-3.27 (m, 1H), 3.26-3.14 (m, 2H), 3.09-3.02 (m, 2H), 2.79-2.70 (m overlapping s, 4H), 2.48-2.43 (m, 0.5H), 2.12 (s, 1.5H), 2.04 (s, 1.5H), 1.39-1.36 (m, 3H). $^{13}$C NMR (151 MHz, DMSO-d$_6$) δ 174.6, 172.6, 172.4, 172.0, 171.0, 171.0, 169.2, 169.1, 169.0, 72.9, 66.6, 66.5, 63.3, 60.0, 59.8, 59.8, 59.7, 59.3, 59.3, 58.2, 56.1, 56.1, 55.4, 55.3, 54.1, 53.8, 49.0, 48.9, 45.8, 45.6, 45.4, 43.6, 43.5, 35.5, 35.5, 34.5, 34.4, 23.0, 22.9, 21.7, 21.7, 21.3, 21.3, 18.4, 17.2, 13.8, 13.6. HRMS (ESI-TOF) m/z: [M+H]$^+$ Calcd for C$_{10}$H$_{19}$N$_2$O$_3$ 215.1396; Found 215.1388.

2-((2R,5R)-1,4-diacetyl-5-methylpiperazin-2-yl)acetic acid (7 {2,2}) HRMS (ESI-TOF) m/z: [M+H]$^+$ Calcd for C$_{11}$H$_{19}$N$_2$O$_4$ 243.1345; Found 243.1338.

2-((2R,5R)-1-acetyl-5-methyl-4-(methylsulfonyl)piperazin-2-yl)acetic acid (7 {3,2}). Approximately 3:1 mixture of rotamers. $^1$H NMR (600 MHz, DMSO-d$_6$) δ 4.51-4.48 (m, 0.7H), 4.36 (bt, J=6.6 Hz, 0.3H), 4.26 (dd, J=13.7, 5.7 Hz, 0.3H), 3.86 (dq, J=12.3, 6.2 Hz, 0.7H), 3.79-3.72 (m, 1.5H), 3.62 (dd, J=14.3, 6.0 Hz, 0.4H), 3.51-3.50 (m, 0.5H), 3.25 (dd, J=14.8, 9.6 Hz, 1.5H), 3.11-3.06 (m, 1H), 2.91 (s, 1H), 2.84 (s, 2H), 2.63-2.57 (m, 0.6H), 2.50-2.47 (m, 0.5H), 2.40 (dd, J=16.0, 4.0 Hz, 0.5H), 2.06-2.04 (two singlets in 3:1 ratio, 2.06 major, 2.04 minor, 3H), 1.19-1.13 (m, 3H). $^{13}$C NMR (151 MHz, DMSO-d$_6$) δ 172.5, 169.7, 51.9, 51.7, 51.0, 47.7, 46.2, 45.5, 44.9, 43.1, 40.9, 38.7, 38.4, 36.4, 35.3, 22.0, 21.2, 18.6. HRMS (ESI-TOF) m/z: [M+H]$^+$ Calcd for C$_{10}$H$_{19}$N$_2$O$_5$S 279.1015; Found 279.1006.

2-((2R,5R)-1-acetyl-4-benzyl-5-methylpiperazin-2-yl) acetic acid (7 {4,2}). $^1$H NMR (600 MHz, DMSO-d$_6$) δ 7.32-7.29 (m, 4H), 7.24-7.20 (m, 1H), 4.67 (bt, J=4.5 Hz, 0.4H), 4.22-4.17 (m, 1H), 4.07 (dd, J=13.8, 6.4 Hz, 1H), 3.63-3.59 (m, 1H), 3.03 (dd, J=13.8, 4.6 Hz, 1.25H), 2.92 (dd, J=13.5, 4.6 Hz, 0.6H), 2.80-2.73 (m, 1.25H), 2.68-2.58 (m, 1.25H), 2.48-2.43 (m, 1H), 2.24 (dd, J=15.3, 4.3 Hz, 1H), 2.14-2.08 (m, 1.5H), 2.01 (s, 1.5H), 1.98 (s, 1.5H), 1.13 (apparent t, J=5.6 Hz, 3H). $^{13}$C NMR (151 MHz, DMSO-$d_6$) δ 172.9, 172.9, 168.6, 168.5, 139.3, 128.8, 128.7, 128.7, 128.7, 128.6, 127.2, 127.2, 60.0, 57.0, 56.5, 56.3, 55.5, 54.3, 51.0, 49.0, 45.6, 43.5, 41.6, 40.9, 35.2, 34.2, 22.0, 21.4, 18.0, 17.8. HRMS (ESI-TOF) m/z: [M+H]$^+$ Calcd for $C_{16}H_{23}N_2O_3$ 291.1709; Found 291.1703.

2-((2R,5R)-1-acetyl-5-methyl-4-phenylpiperazin-2-yl)acetic acid (7 {5,2}). Approximately 3:2 mixture of rotamers. $^1$H NMR (600 MHz, DMSO-$d_6$) δ 7.26 (t, J=7.7 Hz, 1H), 7.22 (t, J=7.8 Hz, 1.5H), 6.98 (d, J=7.9 Hz, 1H), 6.94 (t, J=7.4 Hz, 0.6H), 6.85 (d, J=8.0 Hz, 1.4H), 6.80 (t, J=7.3 Hz, 0.7H), 4.55 (bt, J=3.8 Hz, 1H), 4.31 (bdd, J=12.8, 4.5 Hz, 1H), 3.75 (dd, J=14.1, 5.3 Hz, 2H), 3.52-3.49 (m, 2H), 3.45 (dd, J=13.8, 5.1 Hz, 1H), 3.22 (dd, J=12.9, 4.4 Hz, 1H), 3.12 (dt, J=13.0 Hz, J=8.6 Hz, 2H), 3.03-3.00 (m, 1H), 2.81 (t, J=6.5 Hz, 1H), 2.70-2.62 (m, 1H), 2.61-2.56 (m, 2H), 2.47 (d, J=4.1 Hz, 0.7H), 2.02-2.00 (two singlets, 2.02 minor, 2.00 major, 3H total), 1.03 (d, J=6.1 Hz, 2H), 0.93 (d, J=6.0 Hz, 1.5H). $^{13}$C NMR (151 MHz, DMSO-$d_6$) δ 173.2, 169.3, 169.1, 150.9, 150.1, 129.6, 129.5, 122.3, 121.4, 119.8, 117.2, 54.3, 54.0, 53.6, 51.3, 48.4, 47.3, 47.2, 40.9, 36.1, 35.1, 22.1, 21.4, 17.6, 17.3. HRMS (ESI-TOF) m/z: [M+H]$^+$ Calcd for $C_{15}H_{21}N_2O_3$ 277.1552; Found 277.1546.

2-((2R,5R)-1-acetyl-5-methylpiperazin-2-yl)acetic acid (7 {6,2}). Approximately 1:1 mixture of rotamers. $^1$H NMR (600 MHz, DMSO-$d_6$) δ 4.88 (dt, $J_d$=9.8 Hz, $J_t$=5.0 Hz, 0.5H), 4.43-4.37 (m, 1H), 3.81 (dd, J=14.2, 3.2 Hz, 0.5H), 3.24-3.08 (m, 4H), 3.06-2.97 (m, 3H), 2.91 (ddd, J=11.0, 6.5, 3.9 Hz, 1H), 2.87 (d, J=7.4 Hz, 2H), 2.66-2.63 (m, 1H), 2.39-2.36 (m, 1H), 2.10 (s, 15H), 2.02 (s, 1.5H), 1.23 (d, J=6.7 Hz, 1.5H), 1.22 (d, J=6.6 Hz, 1.5H). $^{13}$C NMR (151 MHz, DMSO-$d_6$) δ 172.8, 172.7, 172.0, 169.1, 169.0, 58.2, 54.1, 51.1, 51.1, 48.2, 46.2, 45.7, 45.2, 42.6, 42.5, 40.9, 35.1, 34.0, 23.0, 21.9, 21.5, 16.5, 16.2. HRMS (ESI-TOF) m/z: [M+H]$^+$ Calcd for $C_9H_{17}N_2O_3$ 201.1239; Found 201.1232.

2-((2R,5R)-1-acetyl-4-benzoyl-5-methylpiperazin-2-yl)acetic acid 97 {7,2}) HRMS (ESI-TOF) m/z: [M+H]$^+$ Calcd for $C_{16}H_{21}N_2O_4$ 305.1501; Found.

2-((2R,5R)-4,5-dimethyl-1-(methylsulfonyl)piperazin-2-yl)acetic acid (7 {1,3}). $^1$H NMR (600 MHz, DMSO-$d_6$) δ 4.17-4.15 (m, 1.3H), 3.41 (dd, J=13.5, 2.5, 1.3H), 2.95 (s, 3H), 2.89 (dd, J=15.8, 8.7 Hz, 1.2H), 2.72-2.68 (m, 2H), 2.53-2.49 (m, 1.6H), 2.23 (dd, J=12.0, 3.3 Hz, 1H), 2.14 (s, 3H), 1.97-1.91 (m, 1H), 0.98 (d, J=6.2 Hz, 3H). $^{13}$C NMR (151 MHz, DMSO-$d_6$) δ 173.0, 172.0, 58.6, 57.9, 50.2, 46.9, 42.7, 40.6, 35.3, 23.0, 17.1. HRMS (ESI-TOF) m/z: [M+H]$^+$ Calcd for $C_9H_{19}N_2O_4S$ 251.1066; Found 251.1059.

2-((2R,5R)-4-acetyl-5-methyl-1-(methylsulfonyl)piperazin-2-yl)acetic acid (7 {2,3}). $^1$H NMR (600 MHz, DMSO-$d_6$) δ 4.53-4.26 (m, 1H), 4.11 (d, J=69.1 Hz, 1H), 3.96-3.82 (m, 1H), 3.69-3.63 (m, 1H), 3.28-3.20 (m, 1H), 3.11 (dd, J=15.1, 10.7 Hz, 1H), 2.98-2.83 (m, 1H), 2.64-2.53 (m, 1H), 2.15-1.84 (m, 3H). 1.07 (vbd, J=6.2 Hz, 1.5H), 0.96 (vbs, 1.5H). $^{13}$C NMR (151 MHz, DMSO-$d_6$) δ 172.7, 169.4, 60.0, 53.1, 46.8, 45.0, 41.6, 39.0, 38.7, 22.0, 15.8. HRMS (ESI-TOF) m/z: [M+H]$^+$ Calcd for $C_{10}H_{19}N_2O_5S$ 279.1015; Found 279.0996.

2-((2R,5R)-5-methyl-1,4-bis(methylsulfonyl)piperazin-2-yl)acetic acid (7 {3,3}) HRMS (ESI-TOF) m/z: [M+H]$^+$ Calcd for $C_9H_{19}N_2O_6S_2$ 315.0685; Found.

2-((2R,5R)-1-benzyl-5-methyl-4-(methylsulfonyl)piperazin-2-yl)acetic acid (7 {4,3}). $^1$H NMR (600 MHz, DMSO-$d_6$) δ 8.14 (s, 0.1H, formate), 7.30 (dd, J=13.1, 6.3 Hz, 4H), 7.24-7.21 (m, 1H), 4.10-4.07 (m, 2H), 3.62 (t, J=6.6 Hz, 1H), 3.04 (d, J=13.8 Hz, 1H), 2.96 (s, 3H), 2.82 (dd, J=12.2, 10.2 Hz, 1H), 2.80-2.78 (m, 2H), 2.62-2.60 (m, 1H), 2.48 (d, J=5.1 Hz, 1H), 2.31-2.29 (vbm, 1H), 2.16-2.13 (vbm, 1H), 1.11 (d, J=6.0 Hz, 3H). $^{13}$C NMR (151 MHz, DMSO-$d_6$) δ 172.7, 163.5, 139.2, 128.8, 128.7, 127.3, 60.0, 56.9, 56.0, 54.7, 50.1, 47.4, 41.6, 40.5, 34.7, 17.6. HRMS (ESI-TOF) m/z: [M+H]$^+$ Calcd for $C_{15}H_{23}N_2O_4S$ 327.1379; Found 327.1375.

2-((2R,5R)-5-methyl-1-(methylsulfonyl)-4-phenylpiperazin-2-yl)acetic acid (7 {5,3}). $^1$H NMR (600 MHz, DMSO-$d_6$) δ 7.26 (dd, J=8.6, 7.2 Hz, 2H), 6.95 (d, J=7.8 Hz, 2H), 6.89 (tt, J=7.3, 1.1 Hz, 1H), 4.12 (bdt, $J_d$=9.9 Hz, $J_t$=5.0 Hz, 1H), 3.62 (dd, J=14.1, 5.0 Hz, 1H), 3.53 (dpent, J=11.4, 5.9 Hz, 1H), 3.39 (dd, J=13.4, 4.6 Hz, 1H), 3.09-3.02 (m, 2H), 2.91 (dd, J=16.0, 8.8 Hz, 1H), 2.84 (s, 3H), 2.64 (dd, J=16.0, 4.6 Hz, 1H), 0.96 (d, J=6.0 Hz, 3H). $^{13}$C NMR (151 MHz, DMSO-$d_6$) δ 172.9, 150.2, 129.6, 121.2, 119.2, 52.6, 50.98, 50.96, 46.5, 36.6, 16.9. HRMS (ESI-TOF) m/z: [M+H]$^+$ Calcd for $C_{14}H_{21}N_2O_4S$ 313.1222; Found 313.1217.

2-((2R,5R)-5-methyl-1-(methylsulfonyl)piperazin-2-yl)acetic acid (7 {6,3}). $^1$H NMR (600 MHz, DMSO-$d_6$) δ 4.21 (bdt, J=9.5, 4.6 Hz, 1.6H), 3.56 (dd, =13.8, 3.3 Hz, 1H), 3.10-3.06 (m, 1.6H), 3.02-2.98 (m, 1.6H) overlapping with 3.01 (s, 3H), 2.90-2.87 (m, 1H), 2.76 (dd, J=13.8, 11.2 Hz, 1H), 2.53 (dd, J=16.2, 5.3 Hz, 1H), 2.34 (s, 1H), 1.09 (d, J=6.3 Hz, 3H). $^{13}$C NMR (151 MHz, DMSO-$d_6$) δ 172.8, 172.0, 58.2, 54.1, 50.8, 47.9, 47.2, 46.1, 45.5, 34.9, 23.0, 17.5. HRMS (ESI-TOF) m/z: [M+H]$^+$ Calcd for $C_8H_{17}N_2O_4S$ 237.0909; Found.

2-((2R,5R)-4-benzoyl-5-methyl-1-(methylsulfonyl)piperazin-2-yl)acetic acid (7 {7,3}) HRMS (ESI-TOF) m/z: [M+H]$^+$ Calcd for $C_{15}H_{21}N_2OSS$ 341.1171; Found.

2-((2R,5R)-1-benzyl-4,5-dimethylpiperazin-2-yl)acetic acid (7 {1,4}). $^1$H NMR (600 MHz, DMSO-$d_6$) δ 8.20 (s, 0.4H, formate), 7.32-7.30 (m, 4H), 7.25-7.22 (m, 1H). 3.62 (½AB, J=13.1 Hz, 1H), 3.57 (½AB, J=13.6 Hz, 1H), 3.10 (vbdd, J=8.2, 3.1 Hz, 1H), 2.68-2.62 (m, 2H), 2.55-2.49 (m, 1H), 2.40 (dd, J=11.4, 2.9 Hz, 1H), 2.36 (dd, J=11.8, 3.0 Hz, 1H), 2.23 (dd, J=11.9, 9.8 Hz, 1H), 2.18-2.16 (m overlapping s, 4H), 0.93 (d, J=6.2 Hz, 3H). $^{13}$C NMR (151 MHz, DMSO-$d_6$) δ 174.5, 164.1, 139.1, 129.0, 128.7, 127.4, 60.0, 58.0, 57.7, 57.1, 54.6, 53.5, 42.7, 30.2, 16.8. HRMS (ESI-TOF) m/z: [M+H]$^+$ Calcd for $C_{15}H_{23}N_2O_2$ 263.1760; Found 263.1751.

2-((2R,5R)-4-acetyl-1-benzyl-5-methylpiperazin-2-yl)acetic acid (7 {2,4}). $^1$H NMR (600 MHz, DMSO-$d_6$) δ 8.18 (s, 0.1H, formate), 7.32 (bt, J=7.1 Hz, 4H), 7.24 (vbt, J=6.2 Hz, 1H), 4.43 (s, 0.6H), 4.26 (dd, J=13.5, 3.6 Hz, 0.6H), 4.07 (d, J=13.5 Hz, 1H), 3.93 (vbs, 1H), 3.69-3.67 (m, 1H), 3.24-3.20 (m, 1H), 3.01 (dd, J=13.4, 7.5 Hz, 1.3H), 2.71-2.60 (m, 2H), 2.48-2.42 (m, 2H), 2.35 (dd, J=15.6, 6.8 Hz, 0.6H), 2.13 (dd, J=11.7, 2.6 Hz, 0.5H), 2.01 (dd, J=12.3, 3.8 Hz, 0.5H), 1.97 (s, 3H), 1.14 (bd, J=6.6 Hz, 1.5H), 1.02 (bd, J=6.8 Hz, 1.5H). $^{13}$C NMR (151 MHz, DMSO-$d_6$) δ 173.3, 168.4, 168.3, 163.9, 139.3, 128.9, 128.7, 127.3, 58.3, 58.0, 57.4, 57.3, 56.7, 56.0, 49.0, 45.9, 43.9, 41.6, 40.9, 37.4, 36.9, 21.9, 21.3, 16.5, 15.6. HRMS (ESI-TOF) m/z: [M+H]$^+$ Calcd for $C_{16}H_{23}N_2O_3$ 291.1709; Found 291.1697.

2-((2R,5R)-1-benzyl-5-methyl-4-(methylsulfonyl)piperazin-2-yl)acetic acid (7 {3,4}). $^1$H NMR (600 MHz, DMSO-$d_6$) δ 7.34-7.30 (m, 4H), 7.26-7.23 (m, 1H), 4.06 (d, J=13.6 Hz, 1H), 3.82 (bdt, $J_t$=6.6 Hz, $J_d$=3.2 Hz, 1H), 3.50 (dd, J=13.0, 3.4 Hz, 1H), 3.12 (dd, J=12.9, 10.3 Hz, 1H), 3.06 (d, J=13.5 Hz, 1H), 2.92 (s, 3H), 2.71-2.66 (m, 2H), 2.51 (p, J=1.8 Hz, 0H), 2.48-2.46 (m, 1H), 2.40 (dt, $J_d$=9.2 Hz, $J_t$=1.6

Hz, 1H), 2.21 (dd, J=11.9, 3.7 Hz, 1H), 1.15 (d, J=6.7 Hz, 3H). $^{13}$C NMR (151 MHz, DMSO-$d_6$) δ 173.2, 139.3, 128.8, 128.7, 127.4, 57.5, 57.2, 56.8, 49.0, 44.8, 36.4, 15.7. HRMS (ESI-TOF) m/z: [M+H]$^+$ Calcd for $C_{15}H_{23}N_2O_4S$ 327.1379; Found 327.1374.

2-((2R,5R)-1,4-dibenzyl-5-methylpiperazin-2-yl)acetic acid (7 {4,4}). $^1$H NMR (600 MHz, DMSO-$d_6$) δ 8.16 (s, 0.3H, formate), 7.32-7.27 (m, 8H). 7.25-7.20 (m, 2H), 3.95 (½AB, J=13.8 Hz, 1H), 3.63 (½AB, J=13.5 Hz, 1H). 3.52 (½/AB, J=13.5 Hz, 1H), 3.14 (½AB, J=13.8 Hz, 1H), 3.01 (bm, 1H), 2.61 (dd, J=15.7, 8.6 Hz, 1H), 2.56-2.52 (m, 2H), 2.46-2.44 (m, 1H), 2.39 (dd, J=11.8, 3.3 Hz, 1H), 2.33-2.26 (m, 2H), 1.01 (d, J=6.1 Hz, 3H). $^{13}$C NMR (151 MHz, DMSO-$d_6$) δ 174.2, 163.6, 139.5, 139.1, 129.0, 128.8, 128.7, 128.6, 127.3, 127.1, 57.8, 57.6, 55.0, 54.7, 54.2, 30.5, 16.6. HRMS (ESI-TOF) m/z: [M+H]$^+$ Calcd for $C_{21}H_{27}N_2O_2$ 339.2073; Found 339.2067.

2-((2R,5R)-1-benzyl-5-methyl-4-phenylpiperazin-2-yl)acetic acid (7 {5,4}, compound 11 of Table 1). $^1$H NMR (600 MHz, DMSO-$d_6$) δ 8.22 (s, 0.2H, formate), 7.35-7.32 (m, 4H), 7.26-7.23 (m, 1H), 7.20 (dd, J=8.7, 7.2 Hz, 2H), 6.86 (d, J=8.1 Hz, 2H), 6.75 (t, J=7.3 Hz, 1H), 4.07 (d, J=13.4 Hz, 1H). 3.87-3.85 (m, 2H), 3.37 (dd, J=11.9, 3.4 Hz, 2H), 3.12 (d, J=13.4 Hz, 2H), 2.89 (dd, J=11.9, 9.6 Hz, 1H), 2.83-2.79 (m, 1H), 2.69 (dd, J=15.8, 4.3 Hz, 1H), 2.56-2.53 (m, 2H), 2.32 (dd, J=11.5, 3.6 Hz, 1H), 0.91 (d, J=6.4 Hz, 3H). $^{13}$C NMR (151 MHz, DMSO-$d_6$) δ 173.8, 150.0, 139.4, 129.5, 128.9, 128.7, 127.3, 119.0, 116.4, 57.7, 57.6, 56.6, 50.0, 48.5, 36.4, 12.9. HRMS (ESI-TOF) m/z: [M+H]$^+$ Calcd for $C_{20}H_{25}N_2O_2$ 325.1916; Found 325.1905.

2-((2R,5R)-1-benzyl-5-methylpiperazin-2-yl)acetic acid (7 {6,4}). $^1$H NMR (600 MHz, DMSO-$d_6$) δ 8.25 (s, 2H, formate), 7.32 (d, J=4.8 Hz, 4H), 7.25 (dt, J=8.8, 4.0 Hz, 1H), 3.63 (dt, J=13.2, 6.9 Hz, 2H), 3.19-3.09 (m, 4H), 2.73 (dd, J=16.1, 8.8 Hz, 1H), 2.58 (dd, J=16.0, 4.2 Hz, 1H), 2.37 (dd, J=12.8, 9.6 Hz, 1H), 1.11 (d, J=6.5 Hz, 1H). 13C NMR (151 MHz, DMSO-$d_6$) δ 174.1, 164.6, 138.8, 129.0, 128.8, 127.5, 60.0, 57.6, 52.2, 50.9, 49.6, 45.5, 41.6, 30.8, 16.6. HRMS (ESI-TOF) m/z: [M+H]$^+$ Calcd for $C_{14}H_{21}N_2O_2$ 249.1603; Found.

2-((2R,5R)-4-benzoyl-1-benzyl-5-methylpiperazin-2-yl)acetic acid (7 {7,4}) HRMS (ESI-TOF) m/z: [M+H]$^+$ Calcd for $C_{21}H_{25}N_2O_3$ 353.1865; Found.

2-((2R,5R)-4,5-dimethyl-1-phenylpiperazin-2-yl)acetic acid (7 {1,5}). Approximately 20:1 mixture of two conformers. NMR data described for major conformer. $^1$H NMR (600 MHz, DMSO-$d_6$) δ 8.20 (s, 0.2H, formate), 7.21 (dd, J=8.7, 7.2 Hz, 2H), 6.87 (dt, J=7.1, 1.1 Hz, 2H), 6.73 (tt, J=7.3, 1.0 Hz, 1H), 4.17 (vbt, J=4.0 Hz, 1H), 3.33 (dd, J=12.0, 3.4 Hz, 1H), 2.85-2.79 (m, 2H), 2.54 (d, J=6.5 Hz, 1H), 2.35 (dd, J=11.5, 2.2 Hz, 1H), 2.20 (s, 3H), 2.10-2.04 (m, 2H), 1.08 (d, J=6.2 Hz, 3H). $^{13}$C NMR (151 MHz, DMSO-$d_6$) δ 174.0, 149.1, 129.6, 118.6, 115.2, 58.6, 58.0, 52.0, 49.4, 42.9, 31.8, 17.7. HRMS (ESI-TOF) m/z: [M+H]$^+$ Calcd for $C_{14}H_{21}N_2O_2$ 249.1603; Found 249.1597.

2-((2R,5R)-4-acetyl-5-methyl-1-phenylpiperazin-2-yl)acetic acid (7 {2,5}). $^1$H NMR (600 MHz, DMSO-$d_6$) δ 7.17 (vbt, J=7.7 Hz, 2H), 6.84 (vbs, 2H), 6.69 (vbs, 1H), 4.52-4.25 (vbm, 2H), 4.24-3.97 (vbm, 3H), 3.85-3.67 (vbm, 4H), 3.65 (dd, J=14.5, 6.0 Hz, 3H), 3.29-3.25 (vbm, J=1H), 3.06-3.05 (vbm, 1H), 2.74 (vbs, 1H), 2.46-2.39 (vbm, 1H), 1.94-1.88 (vbm, J=1H), 1.18-1.12 (vbm, 1.5H), 1.12-1.06 (vbm, 1.5H). $^{13}$C NMR (151 MHz, DMSO-$d_6$) δ 173.1, 149.2, 118.6, 117.9, 115.0, 114.0, 55.4, 54.9, 49.1, 46.4, 44.1, 36.8, 22.0, 21.1, 16.9, 15.8. HRMS (ESI-TOF) m/z: [M+H]$^+$ Calcd for $C_{15}H_{21}N_2O_3$ 277.1552; Found 277.1542.

2-((2R,5R)-5-methyl-4-(methylsulfonyl)-1-phenylpiperazin-2-yl)acetic acid (7 {3,5}). $^1$H NMR (600 MHz, DMSO-$d_6$) δ 7.22 (dd, J=8.6, 7.4 Hz, 2H), 6.92 (dt, J=7.2, 1.1 Hz, 2H), 6.76 (tt, J=7.2, 1.0 Hz, 1H), 4.09 (dpent, J=8.9, 4.7 Hz, 1H), 3.77 (dt, J=9.2, 5.8 Hz, 1H), 3.65-3.57 (m, 2.4H), 3.30 (dd, J=13.9, 8.1 Hz, 1.6H), 2.94 (dd, J=14.0, 9.1 Hz, 1H). 2.71 (s, 3H), 2.53-2.49 (m, 2H), 2.40 (dd, J=16.0, 4.0 Hz, 1H). 1.25 (d, J=6.3 Hz, 2H). $^{13}$C NMR (151 MHz, DMSO-$d_6$) δ 173.0, 149.0, 129.8, 119.0, 115.3, 53.4, 50.7, 48.3, 44.9, 38.5, 35.0, 18.2. HRMS (ESI-TOF) m/z: [M+H]$^+$ Calcd for $C_{14}H_{21}N_2O_4S$ 313.1222; Found 313.1207.

2-((2R,5R)-4-benzyl-5-methyl-1-phenylpiperazin-2-yl)acetic acid (7 {4,5}, compound 23 of Table 1). $^1$H NMR (600 MHz, DMSO-$d_6$) δ 8.16 (s, 0.2H, formate), 7.33-7.29 (m, 4H), 7.23-7.19 (m, 3H), 6.86 (d, J=8.1 Hz, 2H), 6.73 (t, J=7.3 Hz, 1H), 4.13 (t, J=11.9 Hz, 2H), 3.40 (dd, J=12.1, 3.5 Hz, 3H), 3.07 (d, J=13.7 Hz, 1.3H), 2.87 (dd, J=15.9, 10.0 Hz, 1.3H), 2.72 (dd, J=11.6, 2.2 Hz, 1H), 2.62 (dd, J=12.2, 10.6 Hz, 1H), 2.45-2.40 (m, 1H), 2.24 (dd, J=11.7, 1.9 Hz, 1H), 2.06 (dd, J=15.9, 1.5 Hz, 1H), 1.19 (d, J=6.0 Hz, 3H). $^{13}$C NMR (151 MHz, DMSO-$d_6$) δ 173.7, 163.7, 149.1, 139.4, 129.6, 128.8, 128.6, 127.2, 118.6, 115.2, 57.3, 56.2, 54.8, 51.9, 50.0, 31.2, 18.2. HRMS (ESI-TOF) m/z: [M+H]$^+$ Calcd for $C_{20}H_{25}N_2O_2$ 325.1916; Found 325.1907.

2-((2R,5R)-5-methyl-1,4-diphenylpiperazine-2-yl)acetic acid (7 {5,5}). $^1$H NMR (600 MHz, DMSO-$d_6$) δ 7.26 (dd, J=8.5, 7.3 Hz, 2H), 7.22 (dd, J=8.7, 7.2 Hz, 2H), 7.00 (d, J=7.9 Hz, 2H), 6.92 (m, 3H), 6.75 (t, J=7.2 Hz, 1H), 4.12 (bdd, J=9.3, 4.5 Hz, 1H), 3.57 (dd, J=12.7, 4.2 Hz, 1H), 3.49-3.28 (M, 10H), 3.13 (dd, J=12.6, 5.0 Hz, 1H), 2.89-2.85 (m, 2H), 2.33 (dd, J=15.5, 3.4 Hz, 1H), 1.04 (d, J=6.1 Hz, 2H). $^{13}$C NMR (151 MHz, DMSO-$d_6$) δ 173.7, 151.0, 149.3, 129.7, 129.5, 121.8, 120.7, 118.9, 115.5, 53.5, 53.1, 52.6, 49.7, 33.2, 17.3. HRMS (ESI-TOF) m/z: [M+H]$^+$ Calcd for $C_{19}H_{23}N_2O_2$ 311.1760. Found 311.1751.

2-((2R,5R)-5-methyl-1-phenylpiperazin-2-yl)acetic acid (7 {6,5}). Approximately 10:1 mixture of two conformers. NMR data given for major conformer. $^1$H NMR (600 MHz, DMSO-$d_6$) δ 8.25 (s, 1.5H, formate), 7.23 (dd, J=8.7, 7.2 Hz, 2H), 6.90 (d, J=8.2 Hz, 2H), 6.76 (t, J=7.2 Hz, 1H), 4.21-4.20 (m, 1.6H), 3.43 (dd, J=12.5, 3.4 Hz, 1H), 3.17-3.14 (m, 1H), 3.08-3.06 (m, 1H), 2.98-2.96 (m, 1.3H), 2.87 (dd, J=15.9, 9.8 Hz, 1H), 2.58 (t, J=11.7 Hz, 1H), 2.09 (dd, J=15.9, 3.3 Hz, 1H), 1.17 (d, J=6.3 Hz, 3H). $^{13}$C NMR (151 MHz, DMSO-$d_6$) δ 174.0, 164.7, 149.2, 129.69, 129.65, 119.0, 115.6, 60.0, 50.6, 50.4, 48.2, 47.2, 41.6, 31.8, 18.2. HRMS (ESI-TOF) m/z: [M+H]$^+$ Calcd for $C_{13}H_{19}N_2O_2$ 235.1447; Found.

2-((2R,5R)-4-benzoyl-5-methyl-1-phenylpiperazin-2-yl)acetic acid (7 {7,5}) HRMS (ESI-TOF) m/z: [M+H]$^+$ Calcd for $C_{20}H_{23}N_2O_3$ 339.1709; Found.

2-((2R,5R)-4,5-dimethylpiperazin-2-yl)acetic acid (7 {1,6}) HRMS (ESI-TOF) m/z: [M+H]$^+$ Calcd for $C_8H_{17}N_2O_2$ 173.1290; Found 173.1285.

2-((2R,5R)-4-acetyl-5-methylpiperazin-2-yl)acetic acid (7 {2,6}). $^1$H NMR (600 MHz, DMSO-$d_6$) δ 7.32 (vbs, 0.5H), 6.69 (vbs, 0.6H), 4.72 (t, =6.4 Hz, 0.5H), 4.52 (dd, J=14.3, 3.6 Hz, 0.5H), 4.25 (bt, J=6.5 Hz, 0.5H), 3.90-3.88 (m, 0.5H), 3.40-3.39 (m, 1.5H), 3.23-3.18 (m, 2H), 3.13 (dd, J=13.2, 6.3 Hz, 1H), 3.07-3.03 (m, 1H), 2.88-2.82 (m, 1H), 2.77-2.66 (m, 1.5H), 2.05 (s, 1.5H), 2.00 (s, 1.5H), 1.35 (d, J=7.0 Hz, 1.5H), 1.23 (d, J=7.2 Hz, 1.5H). $^{13}$C NMR (151 MHz, DMSO-$d_6$) δ 171.9, 171.6, 171.3, 168.8, 168.7, 52.1, 51.9, 47.1, 46.5, 42.8, 41.4, 37.3, 35.1, 34.5, 23.0, 21.8, 21.4, 16.5, 15.5. HRMS (ESI-TOF) m/z: [M+H]$^+$ Calcd for $C_9H_{17}N_2O_3$ 201.1239; Found 201.1233.

2-((2R,5R)-5-methyl-4-(methylsulfonyl)piperazin-2-yl) acetic acid (7 {3,6}). $^1$H NMR (600 MHz, DMSO-d$_6$) δ 4.10 (bt, J=5.1 Hz, 1.3H), 3.71 (dd, J=13.9, 3.5 Hz, 2H), 3.30-3.29 (m, 1H), 3.14-3.11 (m, 4H), 3.01 (s, 3H), 2.69 (½ABX, J=17.2, 6.2 Hz, 1H), 2.64 (½ABX, J=17.1, 6.8 Hz, 1H), 1.32 (d, J=7.0 Hz, 3H). $^{13}$C NMR (151 MHz, DMSO-d$_6$) δ 171.8, 51.9, 48.5, 46.5, 42.0, 35.4, 23.0, 15.6. HRMS (ESI-TOF) m/z: [M+H]$^+$ Calcd for C$_8$H$_{17}$N$_2$O$_4$S 237.0909; Found 237.0898.

2-((2R,5R)-4-benzyl-5-methylpiperazin-2-yl)acetic acid (7 {4,6}). Approximately 5:1 mixture of conformers. $^1$H NMR (600 MHz, DMSO-d$_6$) δ 7.32-7.28 (m, 4H), 7.25 (bpent, J=4.8 Hz, 1H), 4.10-4.06 (m, 0.6H), 3.77 (½AB overlapping m dd, J=13.6 Hz, 1.25H), 3.37 (½AB, J=13.7 Hz, 1H), 3.18 (vbs, 1H), 2.94-2.92 (m, 1H), 2.80 (dd, J=12.5, 5.8 Hz, 1H), 2.71 (vbs, 1H), 2.43-2.36 (m, 3H), 2.22-2.14 (m, 1H), 1.11-1.07 (two overlapping doublets, J=6.5 Hz, 3H). $^{13}$C NMR (151 MHz, DMSO-d$_6$) δ 139.2, 128.9, 128.7, 127.3, 57.8, 56.1, 55.1, 54.6, 52.0, 50.9, 47.3, 35.8, 17.8, 12.4. HRMS (ESI-TOF) m/z: [M+H]$^+$ Calcd for C$_{14}$H$_{21}$N$_2$O$_2$ 249.1603; Found 249.1596.

2-((2R,5R)-5-methyl-4-phenylpiperazin-2-yl)acetic acid (7 {5,6}). $^1$H NMR (600 MHz, DMSO-d$_6$) δ 8.41 (s, 0.2H, formate), 7.19 (dd, J=8.7, 7.2 Hz, 1H), 6.85 (d, J=8.1 Hz, 2H), 6.70 (t, J=7.3 Hz, 1H), 4.02-3.95 (bm, 1H), 3.32 (dd, J=11.9, 3.5 Hz, 1H), 3.02-2.99 (m, 2H), 2.91 (dd, J=12.0, 1.9 Hz, 1H). 2.60-2.55 (m, 1H), 2.36 (½ABX, J=17.0, 59 Hz, 1H), 2.30 (½ABX, J=16.0, 7.0 Hz, 1H), 0.98 (d, J=6.6 Hz, 3H). $^{13}$C NMR (151 MHz, DMSO-d$_6$) δ 173.8, 150.1, 129.5, 118.3, 115.4, 52.6, 50.1, 49.0, 46.4, 38.8, 11.7. HRMS (ESI-TOF) m/z: [M+H]$^+$ Calcd for C$_{13}$H$_{19}$N$_2$O$_2$ 235.1447; Found 235.1439.

2-((2R,5R)-5-methylpiperazin-2-yl)acetic acid (7 {6,6}). $^1$H NMR (600 MHz, DMSO-d$_6$) δ 3.42 (bquar, J=3.5 Hz, 2H), 3.30 (dt, J$_t$=9.7 Hz, J$_d$=3.4 Hz, 2H), 3.05 (ddd, J=17.6, 13.2, 3.6 Hz, 2H), 2.93 (dd, J=13.0, 6.7 Hz, 1H), 2.77-2.64 (m, 3H), 2.50-2.49 (two s, 1H total), 1.27 (d, J=6.8 Hz, 3H). $^{13}$C NMR (151 MHz, DMSO-d$_6$) δ 172.5, 48.0, 47.7, 45.1, 42.9, 35.3, 34.5, 15.1. HRMS (ESI-TOF) m/z: [M+H]$^+$ Calcd for C$_2$H$_{15}$N$_2$O$_2$ 159.1134; Found 159.1127.

2-((2R,5R)-4-benzoyl-5-methylpiperazin-2-yl)acetic acid (7 {7,6}) HRMS (ESI-TOF) m/z: [M+H]$^+$ Calcd for C$_{15}$H$_{21}$N$_2$O$_3$ 277.15; Found.

2-((2R,5R)-1-benzoyl-4,5-dimethylpiperazin-2-yl)acetic acid (7 {1,7}). $^1$H NMR (600 MHz, DMSO-d$_6$) δ 7.50 (vbm, 3H), 7.42 (vbd, J=6.6 Hz, 1H), 5.02 (vbs. 0.6H), 4.31-4.24 (vbm, J=0.8H), 4.09 (vbs, 0.8H), 3.33-3.30 (m, 0.8H), 3.05-3.01 (m, 0.7H), 2.93-2.91 (m, 1.7H), 2.77-2.65 (m, 2.5H), 2.41 (vbd, J=11.9 Hz, 1H), 2.29 (bs, 1H). 2.18-2.07 (m, 1H), 1.16 (vbs, 1.5H), 0.95 (vbs, 1.5H). $^{13}$C NMR (151 MHz, DMSO-d$_6$) δ 173.0, 172.6, 169.7, 169.4, 136.3, 130.1, 128.9, 127.3, 127.0, 60.0, 58.6, 58.4, 57.9, 51.9, 49.7, 46.0, 42.4, 41.6, 35.3, 34.9, 16.8. HRMS (ESI-TOF) m/z: [M+H]$^+$ Calcd for C$_{15}$H$_{20}$N$_2$O$_3$ 276.1474; Found.

2-((2R,5R)-4-acetyl-1-benzoyl-5-methylpiperazin-2-yl) acetic acid (7 {2.7}). $^1$H NMR (600 MHz, DMSO-d$_6$) δ 7.47-7.45 (m, 3H), 7.32-7.25 (bm, 2H), 4.55-3.51 (3 vbm, 3H), 3.38-3.22 (vbm, 4H), 2.92-2.80 (vbm, 0.6H), 2.65 (bd, J=6.0 Hz, 1H), 2.04 (s, 3H), 1.04-0.94 (2 vbs, 3H). $^{13}$C NMR (151 MHz, DMSO-d$_6$) δ 172.5, 170.6, 169.4, 136.6, 133.3, 130.0, 129.7, 129.0, 126.7, 50.7, 49.1, 43.2, 38.1, 35.4, 22.1, 21.5, 17.2, 16.0. HRMS (ESI-TOF) m/z: [M+H]$^+$ Calcd for C$_{16}$H$_{20}$N$_2$O$_4$ 304.1423; Found.

2-((2R,5R)-1-benzoyl-5-methyl-4-(methylsulfonyl)piperazin-2-yl)acetic acid (7 {3,7}). $^1$H NMR (600 MHz, DMSO-d$_6$) δ 7.48-7.45 (m, 3H), 7.41-7.39 (m, 2H), 4.60 (vbs, 1H), 3.70 (vbs, 1H), 3.38-3.35 (bm, 5H), 3.10-3.07 (bm, 1H), 2.97 (s, 3H), 2.71-2.61 (m, 2H), 1.11 (vbs, 3H). $^{13}$C NMR (151 MHz, DMSO-d$_6$) δ 172.4, 170.4, 136.3, 130.1, 129.0, 127.1, 52.2, 49.1, 38.9, 35.2, 18.5. HRMS (ESI-TOF) m/z: [M+H]$^+$ Calcd for C$_{15}$H$_{20}$N$_2$O$_5$S 340.1093; Found.

2-((2R,5R)-1-benzoyl-4-benzyl-5-methylpiperazin-2-yl) acetic acid (7 {4,7}). Approximately 1:1 mixture of two conformers. $^1$H NMR (600 MHz, DMSO-d$_6$) δ 7.45-7.23 (m, 101H), 4.88 (vbs, 0.5H), 4.29-4.24 (m, 0.5H), 4.15-4.03 (vbm, 1H), 3.94 (vbs, 0.5H), 3.30 (vbd, J=13.0 Hz, 2H), 3.10-2.98 (bm, 1.75H), 2.87-2.72 (m, 3H), 2.71-2.61 (2 bm, 2H), 2.32-2.15 (bm, 1H), 2.14 (vbd, J=11.0 Hz, 1H), 1.18 (vbd, J=7.2 Hz, 1.5H), 0.98 (vbs, 1.5H). $^{13}$C NMR (151 MHz, DMSO-d$_6$) δ 172.9, 172.5, 169.6, 169.3, 139.3, 136.5, 130.0, 128.9, 128.8, 128.7, 127.2, 127.0, 57.0, 56.5, 54.9, 54.4, 52.1, 50.6, 46.2, 44.5, 34.91, 34.5, 17.7. HRMS (ESI-TOF) m/z: [M+H]$^+$ Calcd for Chemical Formula C$_{21}$H$_{24}$N$_2$O$_3$ 352.1787; Found.

2-((2R,5R)-1-benzoyl-5-methyl-4-phenylpiperazin-2-yl) acetic acid (7 {5,7}). $^1$H NMR (600 MHz, DMSO-d$_6$) δ 7.26 (d, J=5.7 Hz, 3H), 7.16-7.12 (m, 2H), 7.08 (t, J=7.7 Hz, 1H), 6.79-6.73 (m, 3H), 4.57 (vbs, 0.6H), 4.01 (vbs, 0.8H), 3.24-3.15 (vbm, 6H), 2.84-2.55 (vbm, 3.5H), 2.32-2.31 (m, 0.5H), 2.23-2.21 (m, 0.5H), 0.72 (vbs, 3H). $^{13}$C NMR (151 MHz, DMSO-d$_6$) δ 173.0, 170.0, 150.4, 136.6, 130.0, 129.6, 129.5, 128.9, 128.7, 127.1, 126.1, 118.7, 53.9, 49.1, 35.1, 29.5, 17.5. HRMS (ESI-TOF) m/z: [M+H]$^+$ Calcd for C$_{20}$H$_{22}$N$_2$O$_3$ 338.1630; Found.

2-((2R,5R)-1-benzoyl-5-methylpiperazin-2-yl)acetic acid (7 {6,7}). $^1$H NMR (600 MHz, DMSO-d$_6$) δ 7.46-7.41 (m, 5H), 5.02 (vbs, 0.8H), 4.39-4.34 (vbm, 1.7H), 4.25-4.10 (vbm, 1.3H) 3.41-3.12 (bm, 5H), 3.07 (dd, J=16.0, 8.6 Hz, 1H), 2.77-2.69 (m, 1.7H), 1.24-1.19 (vbm, 1.5H), 1.05 (vbs, 1.5H). $^{13}$C NMR (151 MHz, DMSO-d$_6$) δ 163.6, 130.2, 128.9, 127.4, 99.2, 61.4, 51.1, 46.0, 17.0. HRMS (ESI-TOF) m/z: [M+H]$^+$ Calcd for C$_{14}$H$_{18}$N$_2$O$_3$ 262.1317; Found.

2-((2R,5R)-1,4-dibenzoyl-5-methylpiperazin-2-yl)acetic acid (7 {7,7}) HRMS (ESI-TOF) m/z: [M+H]$^+$ Calcd for C$_{21}$H$_{23}$N$_2$O$_4$ 367.1658; Found.

{2,1} Regioisomers 2-((2R,3S)-4-acetyl-1,3-dimethylpiperazin-2-yl)acetic acid ({2,1}). $^1$H NMR (600 MHz, DMSO-d$_6$) δ 4.85 (t, J=6.2 Hz, 0.7H), 4.40-4.37 (m, 0.8H), 3.89 (d, J=18.1 Hz, 0.8H), 3.70 (vbs, 0.5H), 3.57-3.33 (bm, 6.7H), 3.19 (bt, J=12.5 Hz, 1.8H), 3.07-3.03 (m, 0.8H), 3.02-2.89 (m, 1.3H), 2.70 (d, J=11.2 Hz, 3H), 2.66-2.61 (m, 1H), 2.04-2.03 (two overlapping s, 3H), 1.37 (d, J=7.0 Hz, 1H), 1.33-1.16 (m, 2H). $^{13}$C NMR (151 MHz, DMSO-d$_6$) δ 174.6, 172.0, 171.6, 171.4, 168.7, 168.4, 63.3, 62.2, 62.1, 60.0, 54.2, 54.1, 50.6, 45.8, 45.0, 41.4, 41.2, 38.5, 33.5, 33.3, 23.0, 21.7, 21.2, 18.4, 17.2, 13.1, 12.1.

2-((2S,3S)-4-acetyl-1,3-dimethylpiperazin-2-yl)acetic acid (2 {2,1}). $^1$H NMR (600 MHz, DMSO-d$_6$) δ 4.74 (bt, J=5.5 Hz, 0.6H), 4.37 (vbd, J=9.8 Hz, 0.4H), 4.20-4.17 (m, 0.4H), 3.85-3.83 (m, 0.8H), 3.77-3.70 (m, 0.7H), 3.68-3.47 (m, 5H), 3.10-3.04 (m, 2H), 2.75 (vbs, 3H), 2.06-2.03 (two overlapping s, 3H), 1.52 (vbs, 1H), 1.37 (bd, J=7.7 Hz, 2H). $^{13}$C NMR (151 MHz, DMSO-d$_6$) δ 172.0, 171.8, 170.1, 169.9, 72.9, 67.0, 63.3, 60.0, 59.8, 59.3, 58.2, 54.1, 51.8, 48.3, 48.0, 45.9, 38.5, 33.2, 29.7, 23.0, 21.8, 21.0, 18.4, 16.9, 15.8.

2-((2S,5S)-4-acetyl-1,5-dimethylpiperazin-2-yl)acetic acid (5 {2,1}). $^1$H NMR (600 MHz, DMSO-d$_6$) δ 4.51 (bpent, J=6.3 Hz, 1H), 4.22 (dd, J=13.4, 3.5 Hz, 1H), 4.01 (vbp, J=6.5 Hz, 1H), 3.64 (dd, J=14.0, 3.0 Hz, 1H), 3.10-3.05 (m, 1H), 2.69-2.66 (m, 2H), 2.58 (dd, J=16.0, 4.5 Hz, 2H), 2.34-2.21 (m, 4H), 2.18-2.15 (s overlapping m, 8H), 2.00 (s, 3H), 1.96 (s, 3H), 1.23 (d, J=6.8 Hz, 3H), 1.11 (d, J=6.8 Hz, 3H). $^{13}$C NMR (151 MHz, DMSO-d$_6$) δ 173.1, 173.1, 172.0, 168.4, 168.3, 60.5, 60.1, 60.0, 59.8, 49.0, 45.5, 43.8, 42.82, 42.76, 36.8, 36.2, 23.0, 21.9, 21.3, 16.9, 15.9.

2-((2R,5S)-4-acetyl-1,5-dimethylpiperazin-2-yl)acetic acid (6 {2,1}). $^1$H NMR (600 MHz, DMSO-d$_6$) δ 4.48 (vbs, 0.5H), 4.22-4.15 (m, 0.5H), 3.97 (vbs, 0.5H), 3.50-3.51 (m, 1H), 3.06 (vbd, J=9.0 Hz, 1H), 2.91 (vbs, 0.5H), 2.48-2.34 (m, 1H), 2.27 (bd, J=12.3 Hz, 1H), 2.23 (s, 3H), 2.13-2.09 (m, 0.5H), 2.02-1.94 (m, 3H), 1.22 (vbd, J=6.5 Hz, 1.5H), 1.11 (vbd, J=6.4 Hz, 1.5H). $^{13}$C NMR (151 MHz, DMSO-d$_6$) δ 174.5, 169.4, 56.1, 55.5, 52.4, 51.9, 49.0, 44.3, 43.9, 26.4, 21.7, 17.3, 16.3.

2-((2R,6S)-4-acetyl-1,6-dimethylpiperazin-2-yl)acetic acid (9 {2,1}). $^1$H NMR (600 MHz, DMSO-d$_6$) δ 4.49 (bd, J=14.0 Hz, 0.6H), 4.34 (bd, J=14.2 Hz, 0.5H), 3.99 (bd, J=14.3 Hz, 0.7H), 3.90 (bd, J=14.0 Hz, 0.8H), 3.62-3.55 (m, 3H), 3.22-3.12 (m, 4H), 2.93-2.85 (m, 2H), 2.80-2.70 (m, 2H), 2.65 (bd, J=9.1 Hz, 3H), 2.04-2.02 (two s, 3H), 1.27 (d, J=7.2 Hz, 3H), 1.25 (d, J=7.2 Hz, 3H). $^{13}$C NMR (151 MHz, DMSO-d$_6$) δ 171.7, 168.9, 158.8, 158.6, 118.7, 116.7, 60.1, 59.8, 59.4, 54.0, 46.1, 34.6, 21.4, 21.3, 18.5, 17.2, 15.4, 15.1, 12.8.

2-((2S,6S)-4-acetyl-1,6-dimethylpiperazin-2-yl)acetic acid (10 {2,1}). $^1$H NMR (600 MHz, DMSO-d$_6$) δ 3.91 (bt, J=13.3 Hz, 1H), 3.77 (dd, J=13.0, 3.9 Hz, 1H), 3.62-3.60 (m, 1H), 3.55-3.47 (m, 2H), 3.31-3.29 (m, 1H), 3.08 (dd, J=13.5, 8.8 Hz, 1H), 2.87 (vbs, 0.5H), 2.75 (t, J=10.9 Hz, 0.5H), 2.68-2.66 (m, 0.6H), 2.37 (s, 1.5H), 2.33 (s, 1.5H), 2.32-2.31 (m, 1H), 2.24 (dd, J=16.5, 9.0 Hz, 0.6H), 2.02-1.96 (twos overlapping m, 3H), 1.02 (d, J=6.0 Hz, 1.2H), 0.98 (d, J=6.1 Hz, 1.3H). $^{13}$C NMR (151 MHz, DMSO-d$_6$) S 173.7, 173.1, 172.3, 172.0, 169.3, 169.0, 72.9, 68.1, 63.3, 60.6, 56.2, 55.6, 52.6, 51.7, 50.5, 48.5, 46.0, 43.3, 38.2, 38.0, 30.3, 29.7, 23.0, 21.5, 21.2, 15.2, 14.3.

TABLE 1

Doubly-substituted piperazine TLX modulators (N-benzyl, N-phenyl series): Compounds 5-28

| No | Structure | Calculated MW | Observed MW |
|---|---|---|---|
| 5 | (2S,3R)-N-Ph, N'-Bn, 3-Me, 2-CH$_2$COOH piperazine | 325.1916 | 325.1904 |
| 6 | (2S,3S)-N-Ph, N'-Bn, 3-Me, 2-CH$_2$COOH piperazine | 325.1916 | 325.1907 |
| 7 | (2S,3R)-N-Ph, N'-Bn, 3-Me, 2-CH$_2$COOH piperazine | 325.1916 | 325.1908 |
| 8 | (2R,3R)-N-Ph, N'-Bn, 3-Me, 2-CH$_2$COOH piperazine | 325.1916 | 325.1906 |
| 9 | (2S,5S)-N-Ph, N'-Bn, 5-Me, 2-CH$_2$COOH piperazine | 325.1916 | 325.1906 |

TABLE 1-continued

Doubly-substituted piperazine TLX modulators (N-benzyl, N-phenyl series): Compounds 5-28

| No | Structure | Calculated MW | Observed MW |
|----|-----------|---------------|-------------|
| 10 | (2S,5R)-piperazine, N-Ph, N-Bn, CH2COOH | 325.1916 | 325.1906 |
| 11 | (2R,5R)-piperazine, N-Ph, N-Bn, CH2COOH | 325.1916 | 325.1907 |
| 12 | (2S,5R)-piperazine isomer | 325.1916 | 325.1907 |
| 13 | (2R,6S)-piperazine isomer | 325.1916 | 325.1906 |
| 14 | (2S,6S)-piperazine isomer | 325.1916 | 325.1905 |
| 15 | (2S,6R)-piperazine isomer | 325.1916 | 325.1907 |

TABLE 1-continued

Doubly-substituted piperazine TLX modulators (N-benzyl, N-phenyl series): Compounds 5-28

| No | Structure | Calculated MW | Observed MW |
|----|-----------|---------------|-------------|
| 16 | (2R,3R)-1-Ph, 4-CH2Ph, 3-Me, 2-CH2COOH piperazine | 325.1916 | 325.1907 |
| 17 | (2R,3S)-1-CH2Ph, 4-Ph, 3-Me, 2-CH2COOH piperazine | 325.1916 | 325.1905 |
| 18 | (2S,3S)-1-CH2Ph, 4-Ph, 3-Me, 2-CH2COOH piperazine | 325.1916 | 325.1907 |
| 19 | (2S,3R)-1-CH2Ph, 4-Ph, 3-Me, 2-CH2COOH piperazine | 325.1916 | 325.1905 |
| 20 | (2R,3R)-1-CH2Ph, 4-Ph, 3-Me, 2-CH2COOH piperazine | 325.1916 | 325.1906 |
| 21 | (2S,5S)-1-CH2Ph, 4-Ph, 5-Me, 2-CH2COOH piperazine | 325.1916 | 325.1901 |
| 22 | (2R,5S)-1-CH2Ph, 4-Ph, 5-Me, 2-CH2COOH piperazine | 325.1916 | 325.1907 |

TABLE 1-continued
Doubly-substituted piperazine TLX modulators (N-benzyl, N-phenyl series): Compounds 5-28
| No | Structure | Calculated MW | Observed MW |
|---|---|---|---|
| 23 | 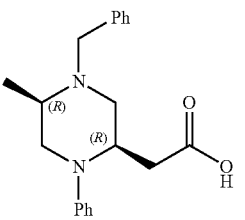 | 325.1916 | 325.1905 |
| 24 | 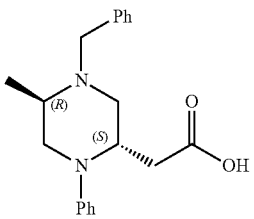 | 325.1916 | 325.1903 |
| 25 | 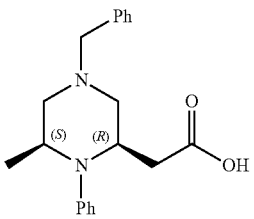 | 325.1916 | 325.1906 |
| 26 | 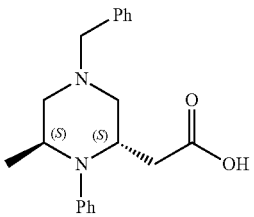 | 325.1916 | 325.1905 |
| 27 | 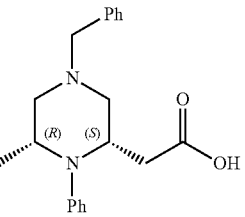 | 325.1916 | 325.1914 |
| 28 | 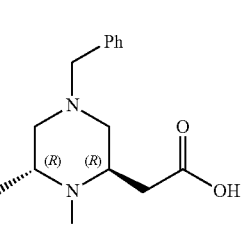 | 325.1916 | 325.1910 |

TABLE 1-continued

Doubly-substituted piperazine TLX modulators (N-benzyl, N-phenyl series): Compounds 5-28

| No | Structure | Calculated MW | Observed MW |
|---|---|---|---|
| 29 (reference compound) | | | |

Example 4. ALPHA Screen Assay with TLX LBD

Assays were performed according to the manufacturer's protocol (PerkinElmer, USA), with the following modifications: Ligands were tested for TLX-coactivator binding in 50 mM phosphate buffer, 150 mM NaCl, pH 7, 1 mM DTT and 100 μM CHAPS. Ligands were dissolved and diluted in DMSO as stocks and were prepared in assay buffer from the original stock in the 100% DMSO and added to the assay plate. Biotinylated SRC peptide and polyhistidine tagged TLX LBD were diluted in assay buffer, subsequently added to respective ALPHA beads, under low light. The plates were spun down, mixed with a shaker and incubated for 120 minutes and read on a TECAN Plate reader using the manufacturer's protocol. The effective concentration that provokes 50% signal change ($EC_{50}$) was calculated by nonlinear regression fit using Prism 7 software. The data of Table 2 show that the compounds were effective for activating TLX.

TABLE 2

Results from the ALPHA screen assay for TLX LBD and Coactivator Peptide Recruitment for Compounds 1-4.

| Compound | $EC_{50}$ μM | Normalized fold increase at 200 μM |
|---|---|---|
| 1 | 5.124e−005 | 1.97X |
| 2 | 0.0001015 | 2.45X |
| 3 | 2.812e−005 | 2.49X |
| 4 | 2.981e−005 | 2.29X |

Additional piperazine compounds were prepared and tested for TLX-coactivator binding according to the methods described above. Table 3 shows the dose response of piperazine-based compounds 31-96 that were also tested for TLX LBD targeting and coactivator recruitment using the ALPHA screen assay.

TABLE 3

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 1 | | 8.53E−05 | 1.97 (0.07) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 2 | *(structure 2)* | 6.37E−05 | 2.45 (0.05) |
| 3 | *(structure 3)* | 2.81E−05 | 2.49 (0.12) |
| 4 | *(structure 4)* | 2.98E−05 | 2.29 (0.09) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 29 (reference compound) | 29 | 3.61E−05 | 2.52 (0.09) |
| 30 (reference compound) | 30 | 6.73E−05 | 1.93 (0.08) |
| 31 | 31 | 1.38E−05 | 4.52 (0.06) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 32 | 32 | 1.43E−05 | 3.85 (0.09) |
| 33 | 33 | 1.87E−05 | 3.89 (0.21) |
| 34 | 34 | Not determined | 1.29 (0.05) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 35 | | 1.28E−05 | 4.57 (0.38) |
| 36 | | 1.26E−05 | 8.78 (0.30) |
| 37 | | 3.35E−05 | 2.30 (0.02) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
|---|---|---|---|
| 38 | 38 | Not determined | 0.85 (0.06) |
| 39 | 39 | 2.76E−05 | 3.19 (0.17) |
| 40 | 40 | 5.29E−05 | 2.48 (0.02) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 41 | 41 | 5.85E−06 | 2.73 (0.13) |
| 42 | 42 | Not determined | 0.96 (0.05) |
| 43 | 43 | 6.91E−06 | 3.49 (0.17) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 44 | 44 | 1.24E−05 | 3.28 (0.09) |
| 45 | 45 | 1.13E−05 | 3.50 (0.06) |
| 46 | 46 | Not determined | 0.86 (0.09) |

TABLE 3-continued

Results from the ALPHA screen assay for TLX LBD and Coactivator Peptide
Recruitment for Compounds 31-96.

| Compound No. | Structure | ALPHA assay EC$_{50}$ μM | Average ALPHA signal at 200 μM (std. dev.) |
|---|---|---|---|
| 47 | 47 | 1.25E−05 | 7.81 (0.45) |
| 48 | 48 | 9.52E−06 | 3.75 (0.31) |
| 49 | 49 | 3.32E−05 | 3.09 (0.12) |

TABLE 3-continued

Results from the ALPHA screen assay for TLX LBD and Coactivator Peptide Recruitment for Compounds 31-96.

| Compound No. | Structure | ALPHA assay EC$_{50}$ µM | Average ALPHA signal at 200 µM (std. dev.) |
|---|---|---|---|
| 50 | (structure 50) | Not determined | 0.93 (0.05) |
| 51 | (structure 51) | 1.99E−05 | 2.98 (0.10) |
| 52 | (structure 52) | 2.61E−05 | 2.03 (0.12) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 53 | 53 | 9.04E−06 | 2.84 (0.05) |
| 54 | 54 | Not determined | 1.17 (0.06) |
| 55 | 55 | 4.12E−05 | 2.87 (0.07) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 56 | *structure 56* | 4.42E−05 | 2.74 (0.08) |
| 57 | *structure 57* | 7.45E−05 | 2.54 (0.04) |
| 58 | *structure 58* | Not determined | 1.30 (0.05) |

TABLE 3-continued

Results from the ALPHA screen assay for TLX LBD and Coactivator Peptide Recruitment for Compounds 31-96.

| Compound No. | Structure | ALPHA assay EC$_{50}$ µM | Average ALPHA signal at 200 µM (std. dev.) |
|---|---|---|---|
| 59 | 59 | Not determined | 1.25 (0.09) |
| 60 | 60 | Not determined | 1.06 (0.05) |
| 61 | 61 | 1.52E−05 | 2.89 (0.07) |

TABLE 3-continued

Results from the ALPHA screen assay for TLX LBD and Coactivator Peptide
Recruitment for Compounds 31-96.

| Compound No. | Structure | ALPHA assay $EC_{50}$ μM | Average ALPHA signal at 200 μM (std. dev.) |
|---|---|---|---|
| 62 | 62 | 1.20E−05 | 2.54 (0.08) |
| 63 | 63 | 1.23E−05 | 2.72 (0.05) |
| 64 | 64 | 8.58E−06 | 2.26 (0.07) |

TABLE 3-continued

Results from the ALPHA screen assay for TLX LBD and Coactivator Peptide
Recruitment for Compounds 31-96.

| Compound No. | Structure | ALPHA assay EC$_{50}$ μM | Average ALPHA signal at 200 μM (std. dev.) |
|---|---|---|---|
| 65 | 65 | Not determined | 0.99 (0.04) |
| 66 | 66 | Not determined | 0.96 (0.03) |
| 67 | 67 | Not determined | 0.97 (0.03) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 68 | 68 | Not determined | 1.02 (0.03) |
| 69 | 69 | 8.10E−06 | 2.53 (0.08) |
| 70 | 70 | 4.85E−06 | 2.63 (0.01) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 71 | 71 | 7.31E-06 | 2.47 (0.03) |
| 72 | 72 | 6.58E-06 | 2.51 (0.10) |
| 73 | 73 | 7.52E-06 | 2.69 (0.07) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 74 | 74 | 9.82E−06 | 2.96 (0.08) |
| 75 | 75 | 7.94E−06 | 2.65 (0.04) |
| 76 | 76 | 1.26E−05 | 3.09 (0.18) |

TABLE 3-continued

Results from the ALPHA screen assay for TLX LBD and Coactivator Peptide Recruitment for Compounds 31-96.

| Compound No. | Structure | ALPHA assay EC$_{50}$ µM | Average ALPHA signal at 200 µM (std. dev.) |
|---|---|---|---|
| 77 | 77 | Not determined | 1.09 (0.06) |
| 78 | 78 | Not determined | 1.16 (0.03) |
| 79 | 79 | Not determined | 1.23 (0.02) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 80 | *(structure 80)* | Not determined | 1.11 (0.07) |
| 81 | *(structure 81)* | Not determined | 1.15 (0.02) |
| 82 | *(structure 82)* | Not determined | 1.11 (0.02) |

TABLE 3-continued

Results from the ALPHA screen assay for TLX LBD and Coactivator Peptide Recruitment for Compounds 31-96.

| Compound No. | Structure | ALPHA assay EC$_{50}$ μM | Average ALPHA signal at 200 μM (std. dev.) |
|---|---|---|---|
| 83 | 83 | Not determined | 1.02 (0.03) |
| 84 | 84 | Not determined | 1.09 (0.01) |
| 85 | 85 | Not determined | 1.48 (0.16) |

TABLE 3-continued
Results from the ALPHA screen assay for TLX LBD and Coactivator Peptide Recruitment for Compounds 31-96.
| Compound No. | Structure | ALPHA assay $EC_{50}$ μM | Average ALPHA signal at 200 μM (std. dev.) |
|---|---|---|---|
| 86 | 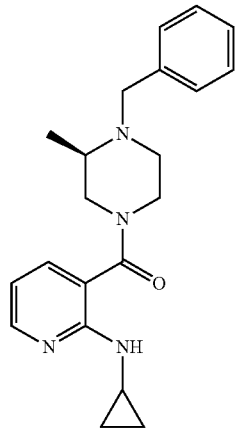 [SMILES: C[C@@H]1CN(C(=O)c2cccnc2NC2CC2)CCN1Cc1ccccc1]<br>86 | Not determined | 1.35 (0.04) |
| 87 | 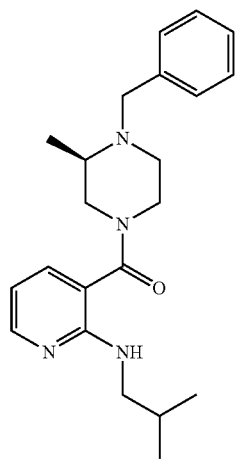 [SMILES: CC(C)CNc1ncccc1C(=O)N1CCN(Cc2ccccc2)[C@H](C)C1]<br>87 | Not determined | 2.07 (0.03) |
| 88 | 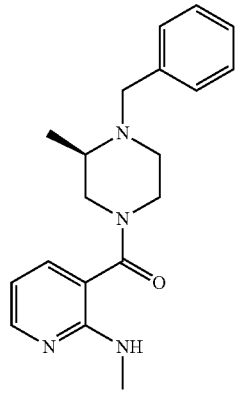 [SMILES: CNc1ncccc1C(=O)N1CCN(Cc2ccccc2)[C@H](C)C1]<br>88 | Not determined | 2.17 (0.21) |

TABLE 3-continued
Results from the ALPHA screen assay for TLX LBD and Coactivator Peptide Recruitment for Compounds 31-96.
| Compound No. | Structure | ALPHA assay EC$_{50}$ μM | Average ALPHA signal at 200 μM (std. dev.) |
|---|---|---|---|
| 89 | 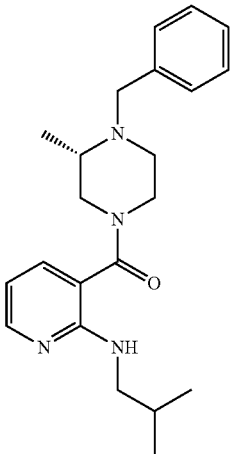 [SMILES: CC(C)CNc1ncccc1C(=O)N1CCN(Cc2ccccc2)[C@@H](C)C1]<br>89 | Not determined | 1.98 (0.05) |
| 90 | 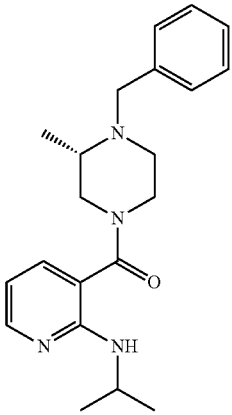 [SMILES: CC(C)Nc1ncccc1C(=O)N1CCN(Cc2ccccc2)[C@@H](C)C1]<br>90 | Not determined | 1.57 (0.06) |
| 91 | 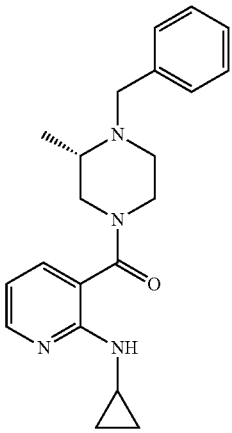 [SMILES: C[C@H]1CN(C(=O)c2cccnc2NC2CC2)CCN1Cc1ccccc1]<br>91 | Not determined | 1.48 (0.04) |

TABLE 3-continued

Results from the ALPHA screen assay for TLX LBD and Coactivator Peptide Recruitment for Compounds 31-96.

| Compound No. | Structure | ALPHA assay $EC_{50}$ μM | Average ALPHA signal at 200 μM (std. dev.) |
| --- | --- | --- | --- |
| 92 | 92 | Not determined | 1.85 (0.10) |
| 93 | 93 | 3.56E−06 | 3.46 (0.10) |
| 94 | 94 | 3.00E−06 | 3.65 (0.10) |

TABLE 3-continued

Results from the ALPHA screen assay for TLX LBD and Coactivator Peptide Recruitment for Compounds 31-96.

| Compound No. | Structure | ALPHA assay EC$_{50}$ µM | Average ALPHA signal at 200 µM (std. dev.) |
|---|---|---|---|
| 95 | (R)-isomer structure | 3.47E-06 | 2.37 (0.19) |
| 96 | (S)-isomer structure | 3.15E-06 | 2.41 (0.07) |

Example 5. In Vivo Neurogenesis Studies in Animals

Animals. C57BL/6J (JAX 000664, RRID:IMSR_JAX: 000664) mice were purchased from The Jackson Laboratory (Bar Harbor. ME).

Figure 10:
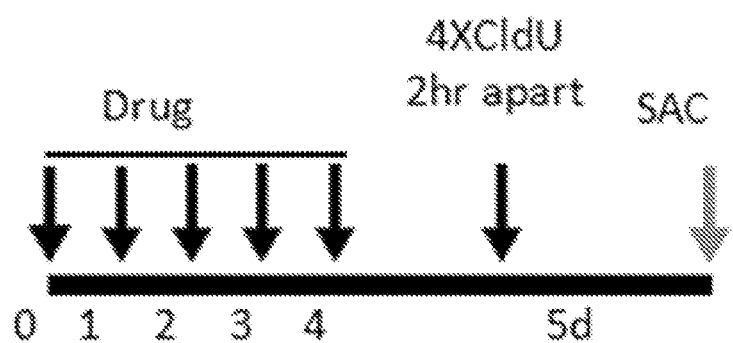
FIG. 10 shows a schematic representation of daily single oral drug dosing for 5 days and CldU injections for neural stem cell proliferation assay in mice.

Small Molecule Oral Gavage Delivery and Chloro-Deoxyuridine (CldU) Injections. Small molecule candidates (3 mg/kg of animal) were delivered through oral gavage to animals (N=3-4) each day at the same time for 5 consecutive days. On the final day, animals received four consecutive IP injections of CldU (85 mg/kg dissolved in sterile saline) 2 hr apart. FIG. 10 shows a schematic of the in vivo drug delivery and CldU injection regime.

Immunohistochemistry. Animals were anesthetized and perfused transcardially with 30 ml of phosphate buffered saline (PBS) followed by 30 ml of 4% (w/v) ice cold paraformaldehyde (PFA) in PBS. Brains were post fixed in 4% PFA solution overnight at 4° C. PFA was replaced with PBS and tissues were kept at 4° C. for further use. Free floating serial sagittal sections of 50 µm thickness were cut using Vibratome 1500 sectioning system and collected in 5 parallel sets each containing 14 sections 250 µm apart from each other. Sections were immunostained, as described in Semerci, F., et al. *eLife* 2017, 6(e24660): 1-28. Following initial permeabilization and blocking at room temperature (RT) for 2 hrs, sections were incubated with primary antibodies overnight at 4° C. Sections were then washed three times and incubated with fluorochrome-conjugated secondary antibodies for 2 hrs at RT. Sections were washed three times with PBS and mounted on slides with DakoCytomation Fluorescent Mounting Medium (DakoCytomation, Carpinteria, CA) as anti-fading agent.

For antigens, the following antibodies were used: mouse anti-GFAP (Sigma-Aldrich Cat #G3893 RRID:AB_477010)

at 1:1000; rabbit anti-Sox2 (Abcam Cat #ab97959 RRID: AB_2341193) at 1:500; secondary antibodies (conjugated with Alexa 488, 594, or 657) (all pre-absorbed against other species to prevent cross reactivity) (Jackson Immunoresearch, West Grove, PA) at 1:500. Sections were counterstained with DAPI (5 μg/mL, Sigma) at 1:1000.

Confocal microscopy and stereology. Quantification and characterization of proliferating cell types was performed according to previously described optical dissector methods. See, e.g., Semerci, F., et al. eLife 2017, 6(e24660): 1-28; and Encinas, J. M., et al. Methods Cell Biol. 2008, 85: 243-272. An observer blind to experimental groups counted immunoreactive cells that had the mentioned properties below in every fifth sagittal section throughout the dentate gyrus. Neural stem cells were identified according to their triangular $Sox2^+$ nuclei located in SGZ with a $GFAP^+$ radial process spanning through granule cell layer.

For quantification that required analysis of phenotypic morphology and/or overlapping markers, 20 μm thick sections were scanned with confocal microscope (Zeiss LSM 710). 3D reconstruction and orthogonal views were acquired via ZEN2012 SP1 software (Zeiss, Thornwood, NY). Cells in the uppermost focal plane were excluded from the quantification. Total counts from 14 sections were multiplied by 10 to get the total number of cells in two dentate gyri. The ratio of $CldU^+$ cells among a certain cell type was calculated by dividing the $CldU^+$ cells by the total number of cells in that cell type.

Statistics. Statistical analysis was performed using GraphPad Prism 8.0 (GraphPad RRID:SCR_002798). Experiments involving 2 groups were compared using un-paired Student t-test. Experiments involving more than 2 groups with one variable were compared by One-Way Analysis of Variance (ANOVA), followed by Tukey HSD post-hoc test analysis for pairwise comparisons. Types of test were indicated in the figure legends. Exact p values were indicated in the main text next to sample size. Significance was defined as $p<0.05$. Data are shown as mean+S.E.M. $*p<0.05$ denoted the corresponding significance levels in all graphs.

Figure 11:
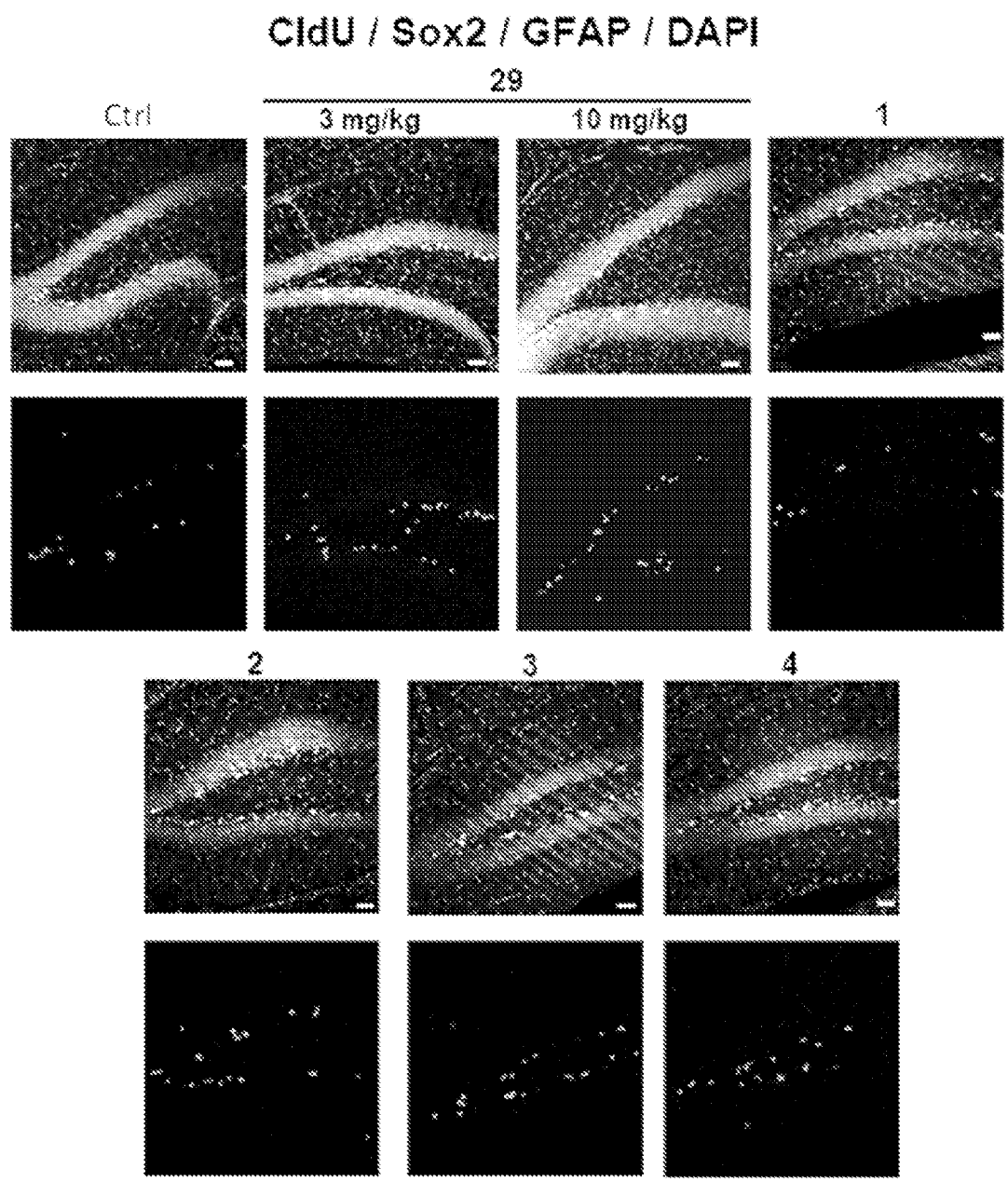
FIG. 11 shows proliferation of neural stem and progenitor cells within representative hippocampal brain sections following the oral drug treatment. Neurogenesis was monitored by the presence of CldU$^+$ labeled cells (green); staining neural stem cell markers Sox2 (red) and GFAP (blue); and DAPI nuclear counterstaining (grey). Scale bars 50 µm.
Figure 12:
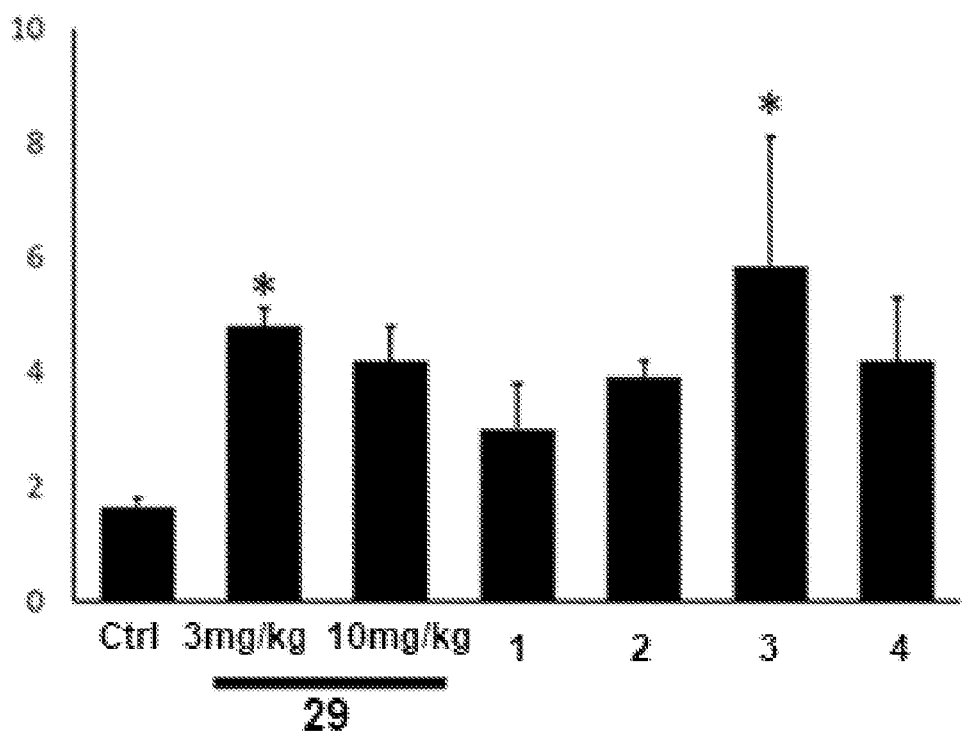
FIG. 12 shows quantified hippocampal neural stem cell (NSC) proliferation upon oral drug treatment, resulting in increased ratio of proliferating neural stem cells (CldU$^+$ NSC/total NSC number) relative to the sham control. N≥3 for each group. 3 mg/kg oral dosing of the compound unless stated otherwise. One-Way Analysis of Variance (ANOVA), followed by Tukey HSD post-hoc test analysis for pairwise comparisons. Data are shown as mean±S.E.M. *p<0.05 denoted the corresponding significance levels.

Following administration of different TLX agonists (i.e., compounds 1, 2, 3, and 4) according to the drug delivery methods described above, an increase in cell proliferation of neural stem and progenitor cells in the adult hippocampal neurogenic niche was observed (FIG. 11). A reference compound, (4-benzylpiperazin-1-yl)(2-(isopentylamino) pyridin-3-yl)methanone (compound 29), was also assessed. Compared to the vehicle control, there was a quantified significant increase in ratio of proliferating NSCs in the adult neurogenic niche (FIG. 12). This has significance in several neurological disorders.

Example 6. Study of TLX Agonist Activity in Human Brain Organoids

Figure 13:
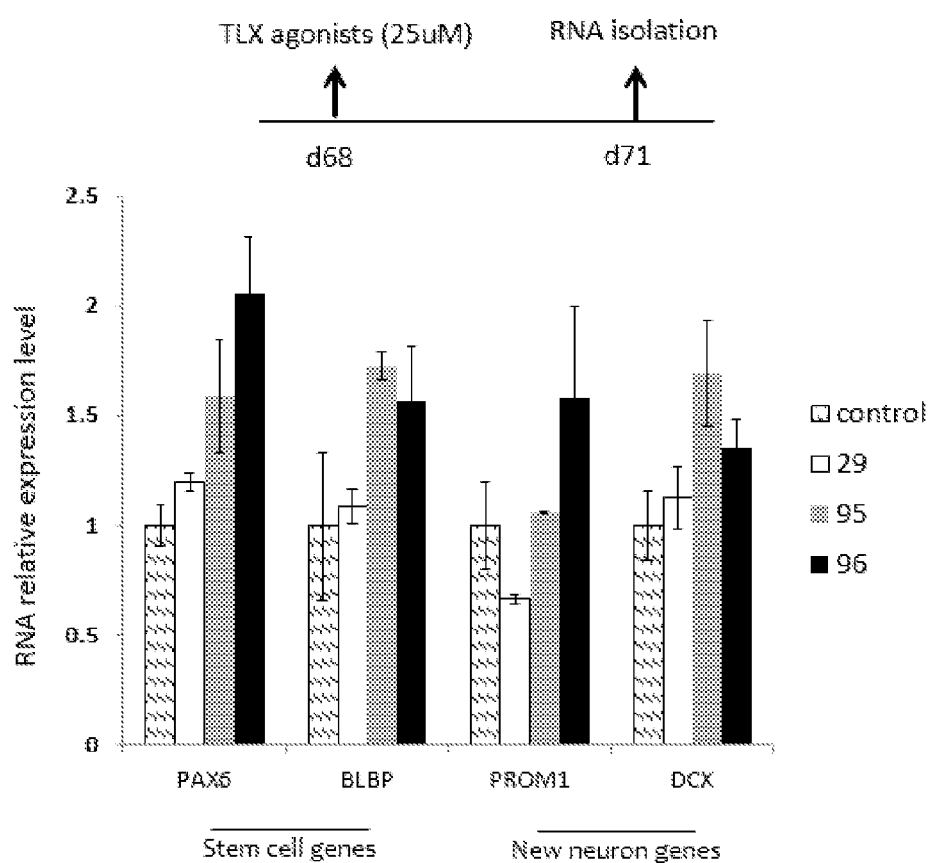
FIG. 13 shows the relative expression level of RNA for stem cell genes and new neuron genes in human brain organoids following treatment with TLX agonists 95 and 96, as compared to reference compound 29.

Human induced pluripotent cells (iPSCs) were used to generate brain organoids using a modified Pasca protocol as previously described. See, Manganas, et al. (Sci Rep 2001, 11: 5546) and Pasca, et al. (Nat. Methods 2015, 12: 671-678), which are incorporated herein by reference. Within 2 months, the protocol produces organoids with a variety of cell types that mimic early human brain (neural stem cells, progenitors, different types of neurons at different maturation stage, astrocytes, oligodendrocytes). About 300 organoids can be generated per batch and thus the model provides for testing of different experimental paradigms in the same batch. Organoids were treated at 68-days with 25 μM of reference compound 29, test compounds 95 and %), or vehicle (0.03N HCl) for 3 days, after which they were processed to examine the expression of NSC genes (PAX6, BLBP) and immature neuron genes (PROM1, DCX). FIG. 13 shows show the relative RNA expression level graphs (mean+/−SEM) in different groups. While compound 29 did not lead to a substantial difference in gene expression compared to controls, both test compounds 95 and 96 substantially increased the expression levels of tested genes. The data indicate that the new TLX agonists stimulate NSCs as well as production of new neurons in the human brain organoid model.

Example 7. TLX Agonists Increase the Number of Proliferating, CldU+ Neural Stem Cells in Young Mice 3-month-old wild-type mice are treated with test compounds (e.g., compounds 95 and 96) to establish their effect on neural stem cell (NSC) proliferation. Mice are treated with either 3 mg/kg or 10 mg/kg test compound or vehicle (0.03N HCl, equal volume) via oral gavage for 5 consecutive days. On the 6th day, they are given CldU (150 mg/kg intraperitoneally) 4 times, 2 hrs apart, to label dividing cells. Mice are sacrificed 24 hr after the first CldU injection. Brains are isolated, sectioned, and immunostained with antibodies against CldU, GFAP and Sox 2 (markers of NSCs) and DAPI (marker of nuclei). The percentage of dividing NSCs among total number of NSCs is determined, including differences between control groups and treated groups, as well as difference between groups treated with different doses of the test compounds. Dentate gyrus sections from each experimental group are examined via microscopy to assess the difference in the number of proliferating CldU+ cells. CldU+ cells represent all dividing cells. As mice are sacrificed 24 hrs following the first CldU injection, the majority of the CldU+ cells are NSCs, while the minority are their proliferating progeny, so called transient amplifying neuroprogenitors (TAPs).

Example 8. TLX Agonists Increase Increases the Number of Proliferating, EdU+ Neural Stem Cells As neurogenesis substantially declines during aging and in AD, it is an important target for therapy aimed to prevent this decline and to treat AD. Thus, studies of drug effects on neurogenesis are particularly needed for age-related disorders.

The effect of increased duration of TLX agonist treatment on NSC proliferation is examined in a mouse model of AD, 5×FAD mouse. 5-month-old 5×FAD mice (when they have fully established AD pathology with accumulation of amyloid) are treated with 3 mg/kg test compound (e.g., compound 95 or 96) or vehicle (0.03N HCl, equal volume) via oral gavage for 5 consecutive days followed by a 2-day break and then 5 more consecutive days of treatment. On the $13^{th}$ day, they are given EdU (50 mg/kg intraperitoneally) 4 times, 2 hrs apart, to label dividing cells. Mice are sacrificed 24 hr after the first EdU injection. Brains are isolated, sectioned, and immunostained with antibodies against EdU, GFAP and Sox 2 (markers of NSCs) and DAPI (marker of nuclei). The total number of dividing, EdU+ cells in the subgranular layer (SGL; where neural stem cells reside) is determined, as well as the total number of dividing EdU+ NSCs. 10-day treatment with 3 mg/kg TLX agonist is observed to increase the number of proliferating NSCs significantly ($*p<0.05$) in the AD model.

Example 9. TLX Agonists Increase the Number of Newborn Neurons Compared to the Vehicle in Both Old Wild-Type Mice and 5×FAD Mice Experiments are conducted to test whether 10-day treatment with TLX agonists (at concentrations found to increase NSC proliferation in 5×FAD mice) leads to increased number of mature (30-day-old) newborn neurons. 5-month-old 5×FAD mice are treated with test compound (e.g., 3 mg/kg compound 95 or compound 96) or vehicle (0.03N HCl, equal volume) via oral gavage for 5 consecutive days followed by a 2-day break and then 5 more consecutive days of treatment. On the 13$^{th}$ day, they are given CldU (150 mg/kg intraperitoneally) 4 times, 2 hrs apart, to label dividing cells. Mice are sacrificed on the 31$^{st}$ day. Brains are isolated, sectioned, and immunostained with antibodies against CldU, doublecortin (marker of immature neurons) and NeuN (marker of mature neurons). The control group is matched with old, 15-month-old wild-type mice in which the level of neurogenesis corresponds to the level of neurogenesis observed in the 5-month-old 5×FAD mice. The control group is treated the same way as the 5×FAD group. The total number of newborn, CldU+ neurons in 15-month-old wild-type mice and in 5-month-old 5×FAD mice are determined. 10-day treatment with the TLX agonists is found to increase the number of newborn neurons in both old and AD mice. The results demonstrated the effect of the TLX agonists on neurogenesis in a targeted disease model as well as in old mice.

Example 10. TLX Agonist Treatment is Associated with More Distance Travel in Old Mice, Suggesting More Exploratory/Less Anxious Behavior Neurogenesis is important for mood control. Experiments are conducted to test whether 30+ day treatment with TLX agonists leads to detectable change in neurogenesis-dependent behavior related to anxiety. 12- to 13-month-old wild-type mice are treated with either TLX agonists (e.g., compound 95 or 96; e.g., 3 mg/kg or 10 mg/kg) or vehicle (0.03N HCl, equal volume) via oral gavage for 33 consecutive days. Mice are tested in elevated plus maze (EPM) that examines how much time mice are spending in a closed environment vs. an open platform. This test is designed to assess their anxiety levels—normally, mice prefer closed environment and when they are anxious, they spend even more time there. The experiment is conducted to assess whether mice treated with the TLX agonists will have less anxious behavior and would explore more compared to control mice. The total distance traveled for mice in each group is assessed. 33-day treatment with TLX agonist (e.g., at 10 mg/kg) is found to increase the total distance travelled, which suggests that those mice had more exploratory/less anxious behavior. The results provide an assessment of the effect of the TLX agonists on anxiety behavior in old mice.

Example 11. TLX Agonist Treatment is Associated with More Spontaneous Alterations in Old Mice, Suggesting More Exploratory Behavior Related to Working Memory Neurogenesis is also important for learning and memory. Experiments are conducted to test whether 30+ day treatment with TLX agonists leads to detectable changes in neurogenesis-dependent working memory. 12- to 13-month-old wild-type mice are treated with either TLX agonists (e.g., compound 95 or 96; e.g., 3 mg/kg or 10 mg/kg) or vehicle (0.03N HCl, equal volume) via oral gavage for 35 consecutive days. Mice are tested in a Y maze that examines how much mice alternate between different arms of the maze. Normally, mice would explore new routes as they remember the previous one and here. The experiments is designed to test whether the spontaneous alterations of their route will be increased following treatment with TLX agonists. Spontaneous alterations for mice in each group are observed. 35-day treatment with 10 mg/kg TLX agonists increases these alterations significantly (*p<0.05), suggesting that those mice have better working memory and thus, explored more. The results provide an assessment of the effect of the TLX compounds on memory behavior in old mice.

VI. EXEMPLARY EMBODIMENTS

Exemplary embodiments provided in accordance with the presently disclosed subject matter include, but are not limited to, the claims and the following embodiments:
1. A compound according to Formula II:

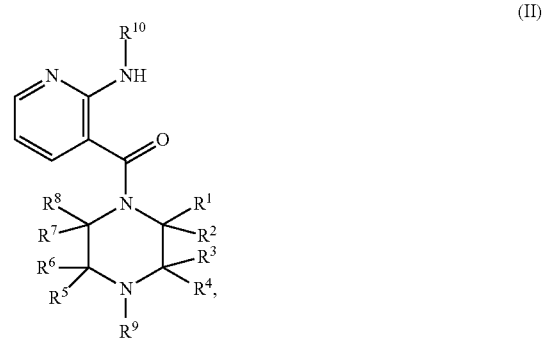

(II)

or a pharmaceutically acceptable salt or isomer thereof, wherein:
R$^1$, R$^2$, R$^3$, R$^4$, R$^5$, R$^6$, and R$^7$ are independently selected from the group consisting of hydrogen, halogen, C$_1$-C$_{12}$ alkyl, C$_2$-C$_{12}$ alkenyl, C$_2$-C$_{12}$ alkynl, 2- to 12-membered heteroalkyl, C$_3$-C$_8$ cycloalkyl, 3- to 8-membered heterocycloalkyl, C$_6$-C$_{14}$ aryl, (C$_6$-C$_{14}$ aryl)-(C$_1$-C$_6$ alkyl), 5- to 12-membered heteroaryl, hydroxyl, -(L$^1$)$_n$N(R$^a$)$_2$, -(L$^1$)$_n$NR$^a$C(=O)R$^b$, -(L$^1$)NR$^a$S(=O)$_2$R$^b$, -(L$^1$)$_n$NR$^8$C(=O)OR$^c$, -(L$^1$)$_n$NR$^a$C(=O)NR$^d$R$^e$, -(L$^1$)$_n$NR$^a$C(=S)NR$^d$R$^e$, -(L$^1$)$_n$OC(=O)R$^b$, -(L$^1$)$_n$OC(=O)OR$^c$, -(L$^1$)$_n$OC(=O)NR$^d$R$^e$, -(L$^1$)$_n$C(=O)R$^b$, -(L$^1$)$_n$C(=O)OR$^c$, -(L$^1$)$_n$C(=O)NR$^d$R$^e$, -(L$^1$)$_n$C(=S)NR$^d$R$^e$, -(L$^1$)$_n$S(=O)$_2$R$^a$, and -(L$^1$)$_n$S(=O)$_2$NR$^d$R$^e$, wherein each subscript n is independently 0 or 1;
R$^8$ is selected from the group consisting of (C$_6$-C$_{14}$ aryl)-(C$_1$-C$_6$ alkyl), hydrogen, halogen, C$_1$-C$_{12}$ alkyl, C$_2$-C$_{12}$ alkenyl, C$_2$-C$_{12}$ alkynyl, 2- to 12-membered heteroalkyl, C$_3$-C$_8$ cycloalkyl, 3- to 8-membered heterocycloalkyl, C$_6$-C$_{14}$ aryl, 5- to 12-membered heteroaryl, hydroxyl, -(L$^1$)$_n$N(R$^a$)$_2$, -(L$^1$)$_n$NR$^a$C(=O)R$^b$, -(L$^1$)$_n$NR$^a$S(=O)$_2$R$^b$, -(L$^1$)$_n$NR$^8$C(=O)OR$^c$, -(L$^1$)$_n$NR$^a$C(=O)NR$^d$R$^e$, -(L$^1$)$_n$NR$^a$C(=S)NR$^d$R$^e$, -(L$^1$)$_n$OC(=O)R$^b$, -(L$^1$)$_n$OC(=O)OR$^1$, -(L$^1$)$_n$OC(=O)NR$^d$R$^e$, -(L$^1$)$_n$C(=O)R$^b$, -(L$^1$)$_n$C(=O)OR$^c$, -(L$^1$)$_n$C(=O)NR$^d$R$^e$, -(L$^1$)$_n$C(=S)NR$^d$R$^e$, -(L$^1$)$_n$S(=O)$_2$R$^a$, and -(L$^1$)$_n$S(=O)$_2$NR$^d$R$^e$, wherein each subscript n is independently 0 or 1;

at least one of $R^1$, $R^2$, $R^3$, $R^4$, $R^5$, $R^6$, $R^7$, and $R^8$ is other than hydrogen;

$R^9$ is selected from the group consisting of ($C_6$-$C_{14}$ aryl)-($C_1$-$C_6$ alkyl), hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$$N(R^a)_2$, -$(L^1)_n$ $NR^aC(=O)R^b$, -$(L^1)_n$$NR^aS(=O)_2R^b$, -$(L^1)_n$$NR^aC(=O)OR^c$, -$(L^1)_n$$NR^gC(=O)NR^dR^e$, -$(L^1)_n$$NR^aC(=S)NR^dR^e$, -$(L^1)_n$$OC(=O)R^b$, -$(L^1)_n$$OC(=O)OR^c$, -$(L^1)$$OC(=O)NR^dR^e$, -$(L^1)_n$$C(=O)R^b$, -$(L^1)_n$$C(=O)OR^c$, -$(L^1)_n$$C(=O)NR^dR^e$, -$(L^1)_n$$C(=S)NR^dR^e$, -$(L^1)_n$ $S(=O)_2R^a$, and -$(L^1)_n$$S(=O)_2NR^dR^e$, wherein each subscript n is independently 0 or 1;

each $R^a$, $R^b$, $R^c$, $R^d$, and $R^e$ is independently selected from the group consisting of hydrogen. $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl;

each aryl, heteroaryl, cycloalkyl in $R^1$-$R^9$ is unsubstituted or is optionally and independently substituted with 1-5 substitutents independently selected from the group consisting of $C_1$-$C_{12}$ alkyl, $C_1$-$C_{12}$ alkoxy, —C(=O)$R^b$, and —C(=O)$OR^c$;

each $L^1$ is independently selected from the group consisting of $C_1$-$C_{12}$ alkylene and 2- to 12-membered heteroalkylene; and $R^{10}$ is selected from the group consisting of $C_5$-$C_{12}$ alkyl, $C_1$-$C_4$ alkyl, and $C_3$-$C_8$ cycloalkyl.

2. The compound of embodiment 1, or a pharmaceutically acceptable salt or isomer thereof, having a structure Formula IIa:

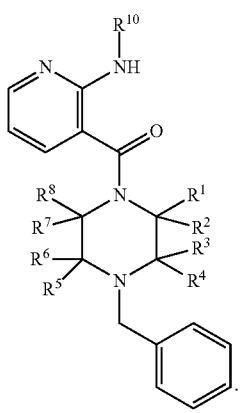

(IIa)

3. The compound of embodiment 1 or embodiment 2, or a pharmaceutically acceptable salt or isomer thereof, wherein $R^8$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^6$, and $R^7$ are hydrogen.

4. The compound of embodiment 1 or embodiment 2, or a pharmaceutically acceptable salt or isomer thereof, wherein $R^1$ is ($C_6$-$C_{14}$ aryl)-($C_1$-$C_6$ alkyl) or $C_1$-$C_6$ alkyl, and $R^2$, $R^3$, $R^4$, $R^5$, $R^6$, $R^7$, and $R^8$ are hydrogen.

5. The compound of embodiment 1 or embodiment 2, or a pharmaceutically acceptable salt or isomer thereof, wherein $R^2$ is ($C_6$-$C_{14}$ aryl)-($C_1$-$C_6$ alkyl) or $C_1$-$C_6$ alkyl, and $R^1$, $R^3$, $R^4$, $R^5$, $R^6$, $R^7$, and $R^8$ are hydrogen.

6. The compound of embodiment 1 or embodiment 2, or a pharmaceutically acceptable salt or isomer thereof, wherein $R^3$ is ($C_6$-$C_{14}$ aryl)-($C_1$-$C_6$ alkyl) or $C_1$-$C_6$ alkyl, and $R^1$, $R^2$, $R^4$, $R^5$, $R^6$, $R^7$, and $R^8$ are hydrogen.

7. The compound of embodiment 1 or embodiment 2, or a pharmaceutically acceptable salt or isomer thereof, wherein $R^4$ is ($C_6$-$C_{14}$ aryl)-($C_1$-$C_6$ alkyl) or $C_1$-$C_6$ alkyl, and $R^1$, $R^2$, $R^3$, $R^1$, $R^6$, $R^7$, and $R^8$ are hydrogen.

8. The compound of embodiment 1 or embodiment 2, or a pharmaceutically acceptable salt or isomer thereof, wherein $R^5$ is ($C_6$-$C_{14}$ aryl)-($C_1$-$C_6$ alkyl) or $C_1$-$C_6$ alkyl, and $R^1$, $R^2$, $R^3$, $R^4$, $R^6$, $R^7$, and $R^8$ are hydrogen.

9. The compound of embodiment 1 or embodiment 2, or a pharmaceutically acceptable salt or isomer thereof, wherein $R^6$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^7$, and $R^8$ are hydrogen.

10. The compound of embodiment 1 or embodiment 2, or a pharmaceutically acceptable salt or isomer thereof, wherein $R^7$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^6$, and $R^8$ are hydrogen.

11. The compound of embodiment 1 or embodiment 2, or a pharmaceutically acceptable salt or isomer thereof, wherein:

$R^2$ is selected from the group consisting of $C_1$-$C_6$ alkyl, -$(L^1)_n$$N(R^a)_2$, -$(L^1)_n$$C(=O)R^1$, -$(L^1)_n$$C(=O)OR^c$, and -$(L^1)_n$$C(=O)NR^dR^e$;

$R^6$ is $C_1$-$C_6$ alkyl; and $R^1$, $R^3$, $R^4$, $R^5$, $R^7$, and $R^8$ are hydrogen.

12. The compound of embodiment 1 or embodiment 2, or a pharmaceutically acceptable salt or isomer thereof, wherein:

$R^4$ is selected from the group consisting of $C_1$-$C_6$ alkyl, -$(L^1)_n$$N(R^a)_2$, -$(L^1)_n$$C(=O)R^b$, -$(L^1)_n$$C(=O)OR^c$, and -$(L^1)_n$$C(=O)NR^dR^e$; $R^6$ is $C_1$-$C_6$ alkyl; and $R^1$, $R^2$, $R^3$, $R^5$, $R^7$, and $R^8$ are hydrogen.

13. The compound of embodiment 1 or embodiment 2, or a pharmaceutically acceptable salt or isomer thereof, wherein:

$R^7$ is selected from the group consisting of $C_1$-$C_6$ alkyl, -$(L^1)_n$$N(R^a)_2$, -$(L^1)_n$$C(=O)R^b$, -$(L^1)_n$$C(=O)OR^c$, and -$(L^1)_n$$C(=O)NR^dR^e$, $R^6$ is $C_1$-$C_6$ alkyl; and $R^1$, $R^2$, $R^3$, $R^4$, $R^5$, and $R^8$ are hydrogen.

14. The compound of embodiment 1 or embodiment 2, which is selected from the group consisting of:

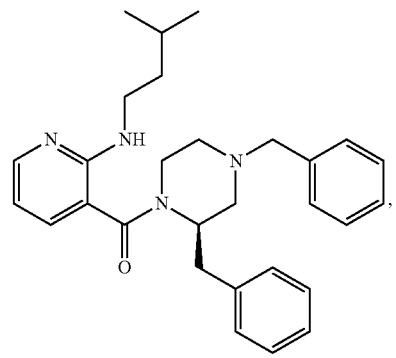

-continued

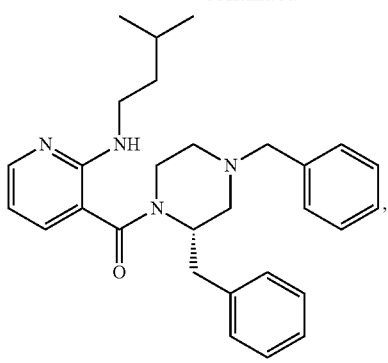

and pharmaceutically acceptable salts or isomers thereof

15. The compound of embodiment 1 or embodiment 2, which is selected from the group consisting of:

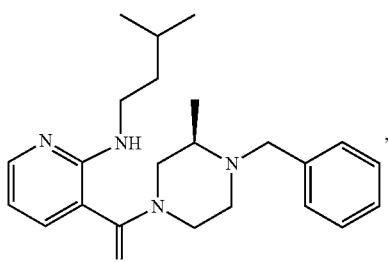,

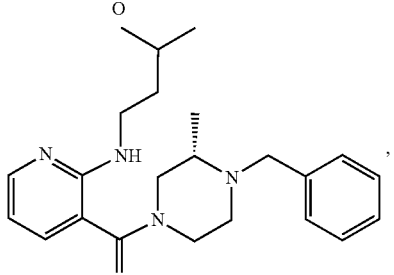,

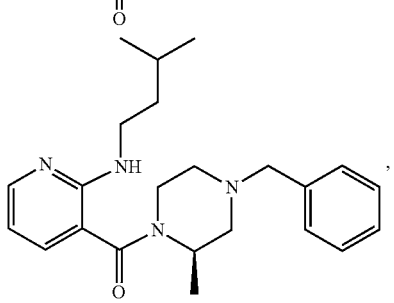,

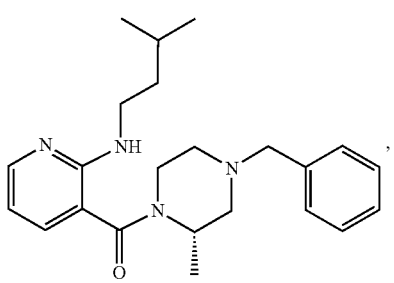, and pharmaceutically acceptable salts or isomers thereof.

16. A compound according to Formula I:

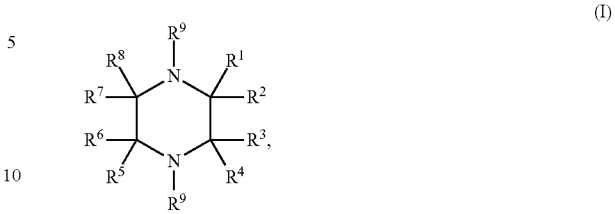

(I)

or a pharmaceutically acceptable salt or isomer thereof, wherein:

$R^1$, $R^2$, $R^3$, $R^4$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_2$ alkynyl, 2- to 12-membered heteroalkyl, $C_3$-$C_8$ cycloalkyl, 3- to 8-membered heterocycloalkyl, $C_6$-$C_{14}$ aryl, ($C_6$-$C_{14}$ aryl)-($C_1$-$C_6$ alkyl), 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1, each $R^9$ is independently selected from the group consisting of hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^B$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;

provided that when one $R^9$ is 2-(isopentylamino)pyridin-3-ylcarbonyl and the other $R^9$ is benzyl, at least one of $R^1$, $R^2$, $R^3$, $R^4$, $R^5$, $R^6$, $R^7$, and $R^8$ is other than hydrogen;

each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl; and each $L^1$ is independently selected from the group consisting of $C_1$-$C_{12}$ alkylene and 2- to 12-membered heteroalkylene.

17. The compound of embodiment 16, or a pharmaceutically acceptable salt or isomer thereof, wherein at least one of $R^1$, $R^2$, $R^3$, $R^4$, $R^5$, $R^6$, $R^7$, and $R^8$ is other than hydrogen.

18. The compound of embodiment 16, or a pharmaceutically acceptable salt or isomer thereof, wherein:

$R^1$, $R^2$, $R^5$, $R^6$, $R^7$, and $R^8$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$ NR$^a$C(=O)R$^b$, -$(L^1)_n$NR$^a$S(=O)$_2$R$^b$, -$(L^1)_n$N-

$R^aC(=O)OR^c$, $-(L^1)_nNR^aC(=O)NR^dR^e$, $-(L^1)_nNR^aC(=S)NR^dR^e$, $-(L^1)_nOC(=O)R^b$, $-(L^1)_nOC(=O)OR^c$, $-(L^1)_nOC(=O)NR^dR^e$, $-(L^1)_nC(=O)R^b$, $-(L^1)_nC(=O)OR^c$, $-(L^1)_nC(=O)NR^dR^e$, $-(L^1)_nC(=S)NR^dR^e$, $-(L^1)_nS(=O)_2R^a$, and $-(L^1)_nS(=O)_2NR^dR^e$, wherein each subscript n is independently 0 or 1;

$R^3$ is hydrogen; and $R^4$ is selected from the group consisting of halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, $-(L^1)_nN(R^a)_2$, $-(L^1)_n NR^aC(=O)R^b$, $-(L^1)_nNR^aS(=O)_2R^b$, $-(L^1)_nNR^aC(=O)OR^c$, $-(L^1)_nNR^aC(=O)NR^dR^e$, $-(L^1)_nNR^aC(=S)NR^dR^e$, $-(L^1)_nOC(=O)R^b$, $-(L^1)_nOC(=O)OR^c$, $-(L^1)_nOC(=O)NR^dR^e$, $-(L^1)_nC(=O)R^b$, $-(L^1)_nC(=O)OR^c$, $-(L^1)_nC(=O)NR^dR^e$, $-(L^1)_nC(=S)NR^dR^e$, $-(L^1)_nS(=O)_2R^a$, and $-(L^1)_nS(=O)_2NR^dR^e$, wherein each subscript n is independently 0 or 1.

19. The compound of any one of embodiments 16-18, or a pharmaceutically acceptable salt or isomer thereof, wherein:

$R^1$, $R^2$, $R^5$, $R^6$, $R^7$, and $R^8$ are independently selected from the group consisting of hydrogen, halogen, $C_1$-$C_6$ alkyl, $C_2$-$C_6$ alkenyl, $C_2$-$C_6$ alkynyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, $-(L^1)_nN(R^a)_2$, $-(L^1)_nNR^aC(=O)R^b$, $-(L^1)_nNR^aS(=O)_2R^b$, $-(L^1)_nNR^aC(=O)OR^c$, $-(L^1)_nNR^aC(=O)NR^dR^e$, $-(L^1)_nNR^aC(=S)NR^dR^e$, $-(L^1)_nOC(=O)R^b$, $-(L^1)_nOC(=O)OR^c$, $-(L^1)_nOC(=O)NR^dR^e$, $-(L^1)_nC(=O)R^b$, $-(L^1)_nC(=O)OR^c$, $-(L^1)_nC(=O)NR^dR^e$, $-(L^1)_nC(=S)NR^dR^e$, $-(L^1)_nS(=O)_2R^a$, and $-(L^1)_nS(=O)_2NR^dR^e$, wherein each subscript n is independently 0 or 1;

at least one of $R^1$, $R^2$, $R^5$, $R^6$, $R^7$, and $R^8$ is other than hydrogen;

$R^3$ is hydrogen; and $R^4$ is selected from the group consisting of halogen, $C_1$-$C_6$ alkyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, $-(L^1)_nN(R^a)_2$, $-(L^1)_nNR^aC(=O)R^b$, $-(L^1)_nNR^aC(=O)OR^c$, $-(L^1)_nNR^aC(=O)NR^dR^e$, $-(L^1)_nOC(=O)R^b$, $-(L^1)_nOC(=O)OR^c$, $-(L^1)_nOC(=O)NR^dR^e$, $-(L^1)_nC(=O)R^b$, $-(L^1)_nC(=O)OR^c$, and $-(L^1)_nC(=O)NR^dR^e$, wherein each subscript n is independently 0 or 1.

20. The compound of any one of embodiments 16-19, or a pharmaceutically acceptable salt or isomer thereof, wherein $R^4$ is selected from the group consisting of $C_1$-$C_6$ alkyl, $-(L^1)_nN(R^a)_2$, $-(L^1)C(=O)R^b$, $-(L^1)C(=O)OR^c$, and $-(L^1)_nC(=O)NR^dR^e$, wherein each subscript n is independently 0 or 1.

21. The compound of any one of embodiments 16-20, or a pharmaceutically acceptable salt or isomer thereof, wherein each $L^1$ is $C_1$-$C_6$ alkylene.

22. The compound of embodiment 20, or a pharmaceutically acceptable salt or isomer thereof, wherein $R^1$ is $C_1$-$C_6$ alkyl, and $R^2$, $R^3$, $R^5$, $R^6$, $R^7$, and $R^8$ are hydrogen.

23. The compound of embodiment 20, or a pharmaceutically acceptable salt or isomer thereof, wherein $R^2$ is $C_1$-$C_6$ alkyl, and $R^1$, $R^3$, $R^5$, $R^6$, $R^7$, and $R^8$ are hydrogen.

24. The compound of embodiment 20, or a pharmaceutically acceptable salt or isomer thereof, wherein $R^2$ is $C_1$-$C_6$ alkyl, and $R^1$, $R^2$, $R^3$, $R^6$, $R^7$, and $R^8$ are hydrogen.

25. The compound of embodiment 20, or a pharmaceutically acceptable salt or isomer thereof, wherein $R^6$ is $C_1$-$C_6$ alkyl, and $R^1$, $R^2$, $R^3$, $R^5$, $R^7$, and $R^8$ are hydrogen.

26. The compound of embodiment 20, or a pharmaceutically acceptable salt or isomer thereof, wherein $R^7$ is $C_1$-$C_6$ alkyl, and $R^1$, $R^2$, $R^3$, $R^5$, $R^6$, and $R^8$ are hydrogen.

27. The compound of embodiment 20, or a pharmaceutically acceptable salt or isomer thereof, wherein $R^8$ is $C_1$-$C_6$ alkyl, and $R^1$, $R^2$, $R^3$, $R^5$, $R^6$, and $R^7$ are hydrogen.

28. The compound of any one of embodiments 16-27, or a pharmaceutically acceptable salt or isomer thereof, wherein each $R^9$ is independently selected from the group consisting of acetyl, phenyl, benzyl, and benzoyl.

29. The compound of embodiment 16, or a pharmaceutically acceptable salt or isomer thereof, wherein:

$R^1$, $R^2$, $R^5$, $R^6$, $R^7$, and $R^8$ are independently selected from the group consisting of hydrogen, $C_1$-$C_6$ alkyl, $C_2$-$C_6$ alkenyl, $C_2$-$C_6$ alkynyl, 2- to 6-membered heteroalkyl, $C_3$-$C_6$ cycloalkyl, 3- to 6-membered heterocycloalkyl, $C_6$-$C_{14}$ aryl, 5- to 6-membered heteroaryl, hydroxyl, $-(L^1)_nN(R^a)_2$, $-(L^1)_nC(=O)R^c$, $-(L)_nC(=O)OR^c$, and $-(L^1)_nC(=O)NR^dR^e$, wherein each subscript n is independently 0 or 1;

at least one of $R^1$, $R^2$, $R^5$, $R^6$, $R^7$, and $R^8$ is other than hydrogen;

$R^3$ is hydrogen;

$R^4$ is selected from the group consisting of $C_1$-$C_6$ alkyl, $-(L^1)_nN(R^a)_2$, $-(L^1)_nC(=O)R^b$, $-(L^1)_nC(=O)OR^c$, and $-(L^1)_nC(=O)NR^dR^e$, wherein each subscript n is independently 0 or 1;

each $R^9$ is independently selected from the group consisting of acetyl, phenyl, benzyl, and benzoyl; and each $L^1$ is $C_1$-$C_6$ alkylene.

30. The compound of embodiment 16, or a pharmaceutically acceptable salt or isomer thereof, which is:

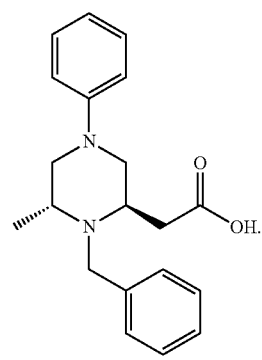

31. A pharmaceutical composition comprising a compound of any one of embodiments 1-30, or a pharmaceutically acceptable salt or isomer thereof, and a pharmaceutically acceptable excipient.

32. A method for promoting neurogenesis, the method comprising contacting a neuron or neuronal cell with a compound of any one of embodiments 1-30, or a pharmaceutically acceptable salt or isomer thereof, or a composition according to embodiment 31, in an amount sufficient to promote neurogenesis.

33. A method for treating a disease or condition associated with nuclear receptor TLX, the method comprising administering to a subject in need thereof a therapeutically effective amount of a compound according to any one of embodiments 1-30, or a pharmaceutically acceptable salt or isomer thereof, or a therapeutically effective amount of a composition according to embodiment 31.

34. The method of embodiment 33, wherein the disease or condition is selected from the group consisting of a neurological disorder, a metabolic disorder, and cancer.

35. The method of embodiment 33, wherein the disease or condition is a neurological disorder.

36. The method of embodiment 34 or embodiment 35, wherein the neurological disorder is selected from the group consisting of major depressive disorder, depression, schizophrenia, Alzheimer's disease, Parkinson's disease, multiple sclerosis, cognitive impairment, irradiation induced cognition, epilepsy, Angelman syndrome, stroke, diabetes induced neuropathy. Down's syndrome, autism, essential tremor, fronto-temporal dementia, progressive supranuclear palsy, amyotrophic lateral sclerosis. Huntington's disease, age associated memory impairment, chronic traumatic encephalopathy, cerebrovascular disease, Lewy Body disease, and multiple system atrophy.

Although the foregoing has been described in some detail by way of illustration and example for purposes of clarity and understanding, one of skill in the art will appreciate that certain changes and modifications can be practiced within the scope of the appended claims. In addition, each reference provided herein is incorporated by reference in its entirety to the same extent as if each reference was individually incorporated by reference.

What is claimed is:

1. A compound according to Formula II:

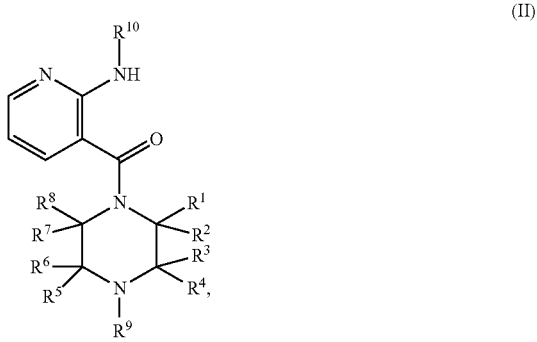

(II)

or a pharmaceutically acceptable salt or isomer thereof, wherein:

$R^1$, $R^2$, $R^3$, $R^4$, $R^5$, $R^6$, and $R^7$ are independently selected from the group consisting of hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, ($C_6$-$C_{14}$ aryl)-($C_1$-$C_6$ alkyl), 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;

$R^8$ is selected from the group consisting of ($C_6$-$C_{14}$ aryl)-($C_1$-$C_6$ alkyl), hydrogen, halogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;

at least one of $R^1$, $R^2$, $R^3$, $R^4$, $R^5$, $R^6$, $R^7$, and $R^8$ is other than hydrogen;

$R^9$ is selected from the group consisting of ($C_6$-$C_{14}$ aryl)-($C_1$-$C_6$ alkyl), hydrogen, $C_1$-$C_{12}$ alkyl, 2- to 12-membered heteroalkyl, $C_3$-$C_8$ cycloalkyl, 3- to 8-membered heterocycloalkyl, $C_6$-$C_{14}$ aryl, 5- to 12-membered heteroaryl, hydroxyl, -$(L^1)_n$N$(R^a)_2$, -$(L^1)_n$NR$^a$C(=O)R$^b$, -$(L^1)_n$NR$^a$S(=O)$_2$R$^b$, -$(L^1)_n$NR$^a$C(=O)OR$^c$, -$(L^1)_n$NR$^a$C(=O)NR$^d$R$^e$, -$(L^1)_n$NR$^a$C(=S)NR$^d$R$^e$, -$(L^1)_n$OC(=O)R$^b$, -$(L^1)_n$OC(=O)OR$^c$, -$(L^1)_n$OC(=O)NR$^d$R$^e$, -$(L^1)_n$C(=O)R$^b$, -$(L^1)_n$C(=O)OR$^c$, -$(L^1)_n$C(=O)NR$^d$R$^e$, -$(L^1)_n$C(=S)NR$^d$R$^e$, -$(L^1)_n$S(=O)$_2$R$^a$, and -$(L^1)_n$S(=O)$_2$NR$^d$R$^e$, wherein each subscript n is independently 0 or 1;

each $R^a$, $R^b$, $R^c$, $R^d$, and $R^e$ is independently selected from the group consisting of hydrogen, $C_1$-$C_{12}$ alkyl, $C_2$-$C_{12}$ alkenyl, $C_2$-$C_{12}$ alkynyl, 2- to 12-membered heteroalkyl, $C_3$-$C_8$ cycloalkyl, 3- to 8-membered heterocycloalkyl, $C_6$-$C_{14}$ aryl, and 5- to 12-membered heteroaryl;

each aryl, heteroaryl, cycloalkyl in $R^1$-$R^9$ is unsubstituted or is optionally and independently substituted with 1-5 substitutents independently selected from the group consisting of $C_1$-$C_{12}$ alkyl, $C_1$-$C_{12}$ alkoxy, —C(=O)R$^b$, and —C(=O)OR$^c$;

each $L^1$ is independently selected from the group consisting of $C_1$-$C_{12}$ alkylene and 2- to 12-membered heteroalkylene; and $R^{10}$ is selected from the group consisting of $C_5$-$C_{12}$ alkyl, $C_1$-$C_4$ alkyl, and $C_3$-$C_8$ cycloalkyl.

2. The compound of claim 1, or a pharmaceutically acceptable salt or isomer thereof, having a structure Formula IIa:

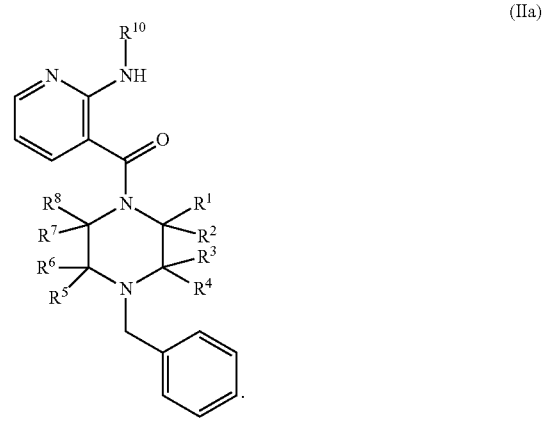

(IIa)

3. The compound of claim 1, or a pharmaceutically acceptable salt or isomer thereof, wherein $R^8$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^6$, and $R^7$ are hydrogen.

4. The compound of claim 1, or a pharmaceutically acceptable salt or isomer thereof, wherein $R^1$ is ($C_6$-$C_{14}$ aryl)-($C_1$-$C_6$ alkyl) or $C_1$-$C_6$ alkyl, and $R^2$, $R^3$, $R^4$, $R^5$, $R^6$, $R^7$, and $R^8$ are hydrogen.

5. The compound of claim 1, or a pharmaceutically acceptable salt or isomer thereof, wherein $R^2$ is ($C_6$-$C_{14}$ aryl)-($C_1$-$C_6$ alkyl) or $C_1$-$C_6$ alkyl, and $R^1$, $R^3$, $R^4$, $R^5$, $R^6$, $R^7$, and $R^8$ are hydrogen.

6. The compound of claim 1, or a pharmaceutically acceptable salt or isomer thereof, wherein $R^3$ is ($C_6$-$C_{14}$ aryl)-($C_1$-$C_6$ alkyl) or $C_1$-$C_6$ alkyl, and $R^1$, $R^2$, $R^4$, $R^5$, $R^6$, $R^7$, and $R^8$ are hydrogen.

7. The compound of claim 1, or a pharmaceutically acceptable salt or isomer thereof, wherein $R^4$ is ($C_6$-$C_{14}$ aryl)-($C_1$-$C_6$ alkyl) or $C_1$-$C_6$ alkyl, and $R^1$, $R^2$, $R^3$, $R^5$, $R^6$, $R^7$, and $R^8$ are hydrogen.

8. The compound of claim 1, or a pharmaceutically acceptable salt or isomer thereof, wherein $R^5$ is ($C_6$-$C_{14}$ aryl)-($C_1$-$C_6$ alkyl) or $C_1$-$C_6$ alkyl, and $R^1$, $R^2$, $R^3$, $R^4$, $R^6$, $R^7$, and $R^8$ are hydrogen.

9. The compound of claim 1, or a pharmaceutically acceptable salt or isomer thereof, wherein $R^6$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^7$, and $R^8$ are hydrogen.

10. The compound of claim 1, or a pharmaceutically acceptable salt or isomer thereof, wherein $R^7$ is ($C_6$-$C_{14}$ aryl)-($C_1$-$C_6$ alkyl) or $C_1$-$C_6$ alkyl, and $R^1$, $R^2$, $R^3$, $R^4$, $R^5$, $R^6$, and $R^8$ are hydrogen.

11. The compound of claim 1, or a pharmaceutically acceptable salt or isomer thereof, wherein:

$R^2$ is selected from the group consisting of $C_1$-$C_6$ alkyl, -($L^1$)$_n$N($R^a$)$_2$, -($L^1$)$_n$C(=O)$R^b$, -($L^1$)$_n$C(=O)O$R^c$, and -($L^1$)$_n$C(=O)N$R^d R^e$, $R^6$ is $C_1$-$C_6$ alkyl; and $R^1$, $R^3$, $R^4$, $R^5$, $R^7$, and $R^8$ are hydrogen.

12. The compound of claim 1, or a pharmaceutically acceptable salt or isomer thereof, wherein:

$R^4$ is selected from the group consisting of $C_1$-$C_6$ alkyl, -($L^1$)$_n$N($R^a$)$_2$, -($L^1$)$_n$C(=O)$R^b$, -($L^1$)$_n$C(=O)O$R^c$, and -($L^1$)$_n$C(=O)N$R^d R^e$;

$R^6$ is $C_1$-$C_6$ alkyl; and $R^1$, $R^2$, $R^3$, $R^5$, $R^7$, and $R^8$ are hydrogen.

13. The compound of claim 1, or a pharmaceutically acceptable salt or isomer thereof, wherein:

$R^7$ is selected from the group consisting of $C_1$-$C_6$ alkyl, -($L^1$)$_n$N($R^a$)$_2$, -($L^1$)$_n$C(=O)$R^b$, -($L^1$)$_n$C(=O)O$R^c$, and -($L^1$)$_n$C(=O)N$R^d R^e$, $R^6$ is $C_1$-$C_6$ alkyl; and $R^1$, $R^2$, $R^3$, $R^4$, $R^5$, and $R^8$ are hydrogen.

14. The compound of claim 1, which is selected from the group consisting of:

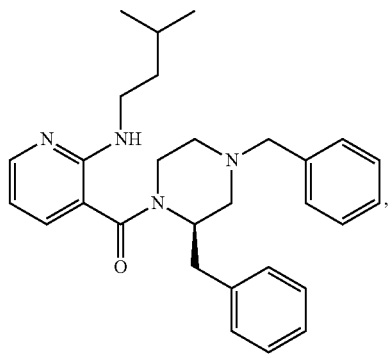

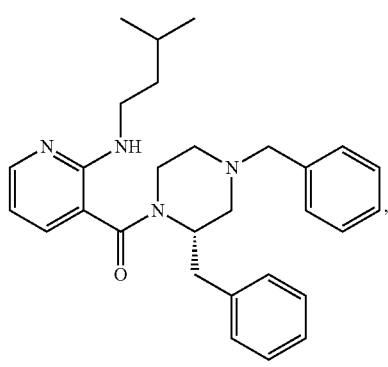

and pharmaceutically acceptable salts or isomers thereof.

15. The compound of claim 1, which is selected from the group consisting of:

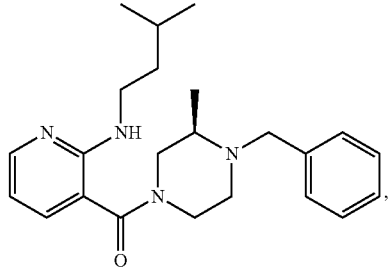

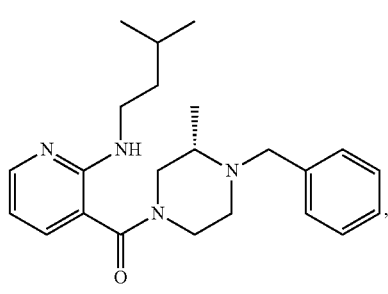

-continued
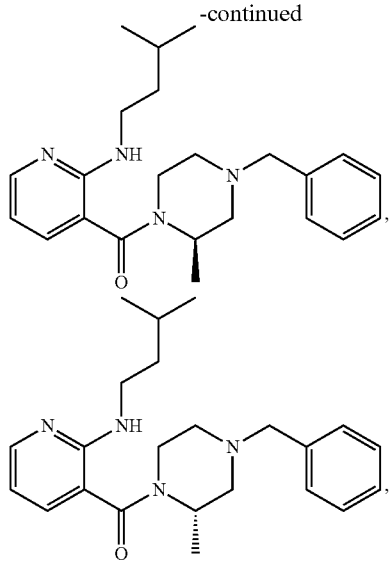
and pharmaceutically acceptable salts or isomers thereof.
16. A pharmaceutical composition comprising a compound according to claim 1, or a pharmaceutically acceptable salt or isomer thereof, and a pharmaceutically acceptable excipient.
* * * * *